US011079895B2

(12) United States Patent
Hong et al.

(10) Patent No.: US 11,079,895 B2
(45) Date of Patent: Aug. 3, 2021

(54) METHOD AND APPARATUS FOR PROVIDING USER INTERFACE

(71) Applicant: Samsung Electronics Co., Ltd., Suwon-si (KR)

(72) Inventors: Dohy Hong, Seoul (KR); Kyungwhoon Cheun, Seoul (KR); Jisung Oh, Seoul (KR); Kiseok Lee, Yongin-si (KR); Dongjoo Choi, Pyeongtaek-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 510 days.

(21) Appl. No.: 14/883,940

(22) Filed: Oct. 15, 2015

(65) Prior Publication Data

US 2016/0110056 A1   Apr. 21, 2016

(30) Foreign Application Priority Data

Oct. 15, 2014  (KR) ........................ 10-2014-0139288
Dec. 12, 2014  (KR) ........................ 10-2014-0179749
Jan. 9, 2015   (KR) ........................ 10-2015-0003681

(51) Int. Cl.
*G06F 3/0481*   (2013.01)
*G06F 3/0484*   (2013.01)
*G06F 3/0488*   (2013.01)

(52) U.S. Cl.
CPC ...... *G06F 3/04812* (2013.01); *G06F 3/04842* (2013.01); *G06F 3/04883* (2013.01)

(58) Field of Classification Search
CPC .................................................. G06F 3/04812
See application file for complete search history.

(56) References Cited

U.S. PATENT DOCUMENTS 8,106,883 B2   1/2012  Ahn
8,631,344 B2   1/2014  Hama et al.
(Continued)

FOREIGN PATENT DOCUMENTS

CN   101587390 A   11/2009
CN   102819394 A   12/2012
(Continued)

OTHER PUBLICATIONS

Chinese Office Action with English translation dated Sep. 30, 2019; Chinese Appln. No. 201580055979.5.
(Continued)

*Primary Examiner* — Sherrod L Keaton
(74) *Attorney, Agent, or Firm* — Jefferson IP Law, LLP

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. A method of providing a user interface (UI) by an electronic device is provided. The method includes displaying a control UI, receiving a first drag input via the displayed control UI, and, when a direction of the first drag input corresponds to a first direction, displaying a cursor UI at a preset location. According to an embodiment of the present disclosure, a UI through which an electronic device can easily receive a user input may be provided.

14 Claims, 44 Drawing Sheets

(56) References Cited

U.S. PATENT DOCUMENTS

| | | | |
|---|---|---|---|
| 9,874,977 B1* | 1/2018 | Soyannwo | G06F 3/042 |
| 2006/0161870 A1* | 7/2006 | Hotelling | G06F 3/0412 |
| | | | 715/863 |
| 2010/0194686 A1 | 8/2010 | Shim | |
| 2011/0148774 A1* | 6/2011 | Pihlaja | G06F 3/04883 |
| | | | 345/173 |
| 2011/0169749 A1 | 7/2011 | Ganey et al. | |
| 2011/0231789 A1* | 9/2011 | Bukurak | G06F 3/0485 |
| | | | 715/773 |
| 2011/0302515 A1 | 12/2011 | Kim | |
| 2012/0044164 A1* | 2/2012 | Kim | G06F 3/04842 |
| | | | 345/173 |
| 2012/0098754 A1* | 4/2012 | Kim | H04N 1/0035 |
| | | | 345/173 |
| 2012/0127642 A1 | 5/2012 | Borgward | |
| 2013/0002573 A1* | 1/2013 | Baba | G06F 3/03547 |
| | | | 345/173 |
| 2013/0036388 A1 | 2/2013 | Kirkpatrick | |
| 2013/0241829 A1 | 9/2013 | Kim | |
| 2014/0071049 A1 | 3/2014 | Min | |
| 2014/0085188 A1 | 3/2014 | Kim et al. | |
| 2014/0104170 A1 | 4/2014 | Huh et al. | |
| 2014/0143728 A1 | 5/2014 | Coleman, Jr. et al. | |
| 2014/0160073 A1* | 6/2014 | Matsuki | G06F 3/04886 |
| | | | 345/174 |
| 2014/0184503 A1* | 7/2014 | Jang | G06F 3/04817 |
| | | | 345/158 |
| 2014/0306897 A1* | 10/2014 | Cueto | G06F 3/04883 |
| | | | 345/173 |
| 2014/0313130 A1* | 10/2014 | Yamano | G06F 3/0488 |
| | | | 345/157 |
| 2014/0327614 A1 | 11/2014 | Park | |
| 2015/0205522 A1 | 7/2015 | Zeng | |
| 2015/0234566 A1* | 8/2015 | Kanda | G06F 3/04812 |
| | | | 345/157 |
| 2016/0210012 A1 | 7/2016 | Han et al. | |
| 2016/0274761 A1* | 9/2016 | Alonso Ruiz | G06F 3/04886 |

FOREIGN PATENT DOCUMENTS

| | | |
|---|---|---|
| CN | 103019588 A | 4/2013 |
| CN | 103309604 A | 9/2013 |
| CN | 103412725 A | 11/2013 |
| CN | 103988159 A | 8/2014 |
| CN | 104793774 A | 7/2015 |
| EP | 2 278 490 A1 | 1/2011 |
| EP | 2 799 971 A2 | 11/2014 |
| FR | 2 898 197 A1 | 9/2007 |
| JP | 2014/089522 A | 5/2014 |
| KR | 10-2014-0100791 A | 8/2014 |
| KR | 10-2014-0110262 A | 9/2014 |
| WO | 2009/017312 A1 | 2/2009 |

OTHER PUBLICATIONS

Chinese Office Action dated Mar. 19, 2020, issued in Chinese Patent Application No. 201580055979.5.

Korean Office Action dated Jan. 8, 2020, issued in Korean Intellectual Property Application No. 10-2015-003681.

* cited by examiner

METHOD AND APPARATUS FOR PROVIDING USER INTERFACE

CROSS-REFERENCE TO RELATED APPLICATION(S)

This application claims the benefit under 35 U.S.C. § 119(a) of a Korean patent application filed on Oct. 15, 2014 in the Korean Intellectual Property Office and assigned Serial number 10-2014-0139288, of a Korean patent application filed on Dec. 12, 2014 in the Korean Intellectual Property Office and assigned Serial number 10-2014-0179749, and of a Korean patent application filed on Jan. 9, 2015 in the Korean Intellectual Property Office and assigned Serial number 10-2015-0003681, the entire disclosure of each of which is hereby incorporated by reference.

TECHNICAL FIELD

The present disclosure relates to a method and an apparatus for providing a user interface. More particularly, the present disclosure relates to a method and an apparatus for providing a user interface for an electronic device that can be controlled by one hand.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

A touch screen can be used as main input source of an electronic device, particularly, a mobile device. As described above, according to a screen size of the electronic device, undesired contents may be mistakenly selected in a small screen, and it is inconvenient for a user to perform an input by using another hand to select an item displayed at a particular location in the mobile electronic device when a larger screen is used.

More specifically, an intuitive input type of the electronic device may include a screen for touching a visible item to select the item. However, the touch screen may cause inconvenience due to the size thereof. When the screen is small, it is difficult to accurately select desired contents in the screen. In contrast, when the screen is large, it is difficult to make a one hand input of characters and numbers through a screen keyboard. Further, since contents are distributed on the screen, it is difficult to select contents by fingers of the hand supporting the mobile device.

The enlarging of the screen and selecting the contents when the screen is small requires an additional operation to enlarge the screen, thereby wasting time and generating movement of the hand. Further, there is reduction in visible content due to the enlargement of the screen. A method of reducing a control window and providing the reduced control window to a user when the screen is large includes a complex setting process. Although the method is useful for inputting characters and numbers, the method has a problem in that frequent movements of the hand are required to select contents on the screen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for easily selecting an item displayed in an electronic device. More specifically, an aspect of the present disclosure is to provide a method and an apparatus for displaying a control user interface (UI) for a user input in an electronic device and selecting an item displayed in the electronic device according to an input corresponding to the displayed control UI.

Another aspect of the present disclosure is to provide a method and an apparatus for selecting, based on an input received in a particular area of a touch screen, an item displayed in another area in an electronic device.

Another aspect of the present disclosure is to provide a method and an apparatus for a user item displayed in a particular area in an electronic device based on at least one of a touch input, a drag input, and a press input.

In accordance with an aspect of the present disclosure, a method of providing a UI by an electronic device is provided. The method includes displaying a control UI, receiving a first drag via the displayed control UI, and when a direction of the first drag input corresponds to a first direction, displaying a cursor UI at a preset location.

In accordance with another aspect of the present disclosure, an electronic device for providing a UI is provided. The electronic device includes a display unit, a touch screen configured to receive a touch input at a location corresponding to the display unit, and a controller configured to display a control UI on the display unit, receive a first drag input via the displayed control UI through the touch screen, and, when a direction of the first drag input corresponds to a first direction, display a cursor UI at a preset location on the display unit.

In accordance with another aspect of the present disclosure, a method of providing a UI by an electronic device is provided. The method includes receiving a first input for displaying a cursor, displaying the cursor at a location corresponding to the first input, and moving the displayed cursor in response to the first input or a second input.

In accordance with another aspect of the present disclosure, an electronic device for providing a UI is provided. The electronic device includes a display unit, a touch screen configured to receive a touch input at a location corresponding to the display unit, and a controller configured to receive a first input for displaying the cursor through the touch screen, display the cursor at a location corresponding to the first input on the display unit, and move the displayed cursor in response to the first input or a second input for moving the cursor.

According to an embodiment of the present disclosure, a UI through which an electronic device can easily receive a user input may be provided. More specifically, in a limited input state including a one hand control, a user can easily make an input for selecting a particular item displayed on a display unit and, accordingly, user convenience can be improved.

Further, an embodiment of the present disclosure provides a method and an apparatus for selecting an item displaying another area based on a user input made on a touch screen or a touch input unit. Accordingly, the user can select the item located in the other area based on an input made in a particular area by a hand grasping the electronic device, thereby improving user convenience.

In addition, according to an embodiment of the present disclosure, an optimal environment to easily receive a user input by the electronic device is implemented and thus user convenience can be improved and usability, convenience, accessibility, and competitiveness of the electronic device can be improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
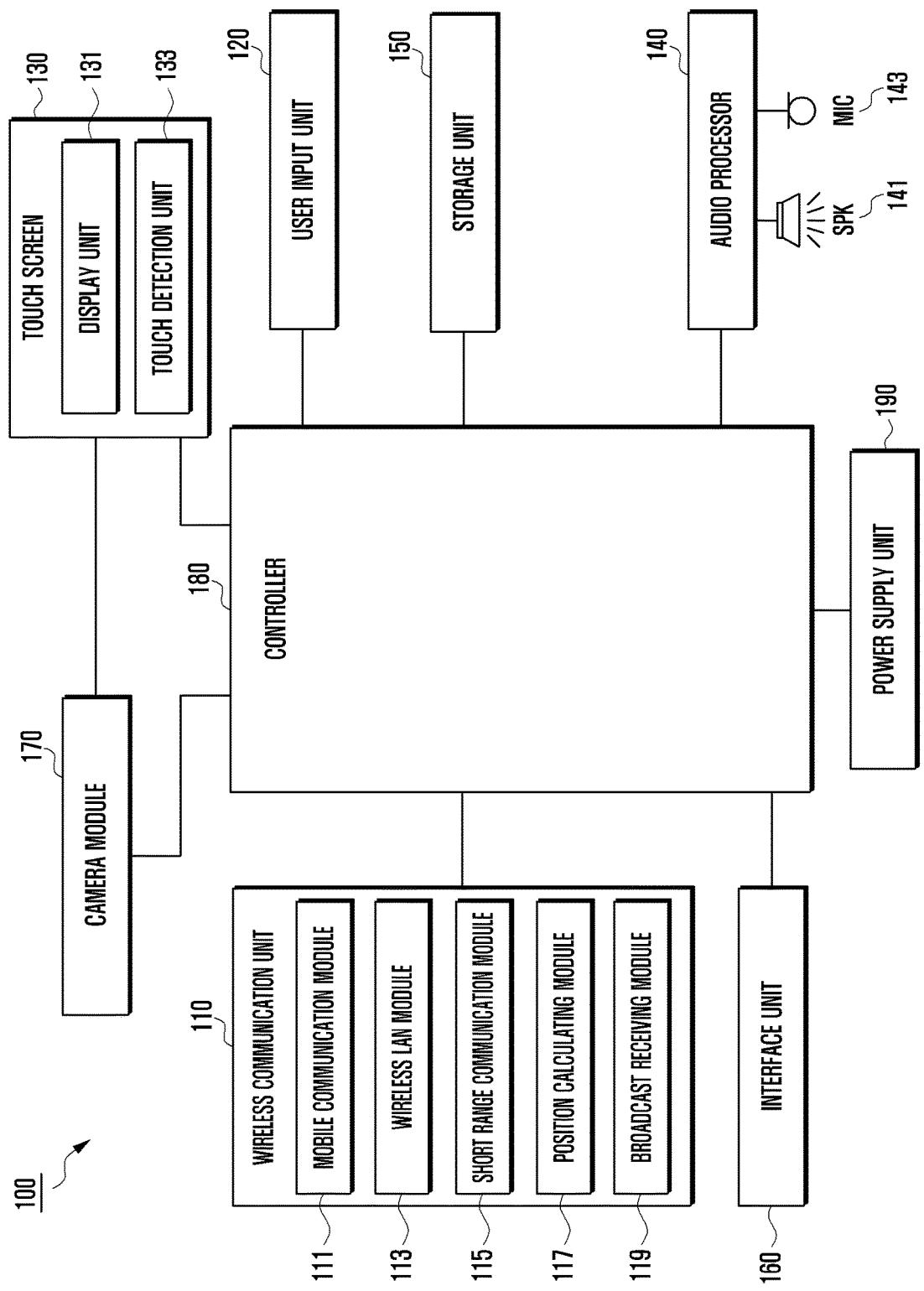
FIG. 1 is a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a field programmable gate array (FPGA) or an application specific integrated circuit (ASIC), which performs a predetermined function. However, the "unit" or "module" is not limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more central processing units (CPUs) within a device or a security multimedia card.

In the various embodiments of the present disclosure, an electronic device may include all devices using one or more of an application processor (AP), a graphic processing unit (GPU), and a CPU, such as all information and communication devices, multimedia devices, wearable devices, and application devices thereof, which support functions according to the various embodiments of the present disclosure. As an example, the electronic device according to various embodiments of the present disclosure may include an electronic device that can display an item, receive a user input, and select an item corresponding to the received user input. According to an embodiment of the present disclosure, the electronic device may be implemented by all types of devices and various devices capable of supporting functions according to embodiments of the present disclosure, such as a smart phone, a tablet personal computer (PC), a mobile communication terminal, a video phone, an e-book reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, and a wearable device (e.g., a head-mounted-device (HMD) such as electronic glasses, electronic clothes, an electronic bracelet, an electronic necklace, an electronic appcessory, an electronic tattoo, or a smart watch). Further, the electronic device according to various embodiments of the present disclosure may be a smart home appliance having a lock screen function. For example, the smart home appliance may include at least one of a television (TV), a digital versatile disc (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

The electronic device according to various embodiments of the present disclosure may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

Further, the electronic device according to various embodiments of the present disclosure may include at least one of a part of furniture or a building/structure, an electronic board, an electronic signature receiving device, a projector, and various types of measuring instruments (e.g., a water meter, an electric meter, a gas meter, and a radio wave meter), which have a function capable of displaying an item and selecting an item according to a user input.

Further, the electronic device according to various embodiments of the present disclosure may be a flexible device.

It will be apparent to those skilled in the art that the electronic device according to various embodiments of the present disclosure may be a combination of one or more of the aforementioned various devices, and is not limited to the aforementioned devices.

A method and an apparatus for providing a user interface (UI) according to an embodiment of the present disclosure may include a method of selecting an item displayed in another area based on a user input received in a particular area and an apparatus using the same. For example, a method of selecting an item displayed in an area of the electronic device including a touch screen based on an input received through a control UI displayed in another area, and an apparatus using the same may be provided.

FIG. 1 is a block diagram of an electronic device according to an embodiment of the present disclosure.

Referring to FIG. 1, the electronic device 100 according to various embodiments of the present disclosure may include a wireless communication unit 110, a user input unit 120, a touch screen 130, an audio processor 140, a storage unit 150, an interface unit 160, a camera module 170, a controller 180, and a power supply unit 190. In various embodiments of the present disclosure, the components of the electronic device 100 illustrated in FIG. 1 may not be necessary, and the electronic device 100 may omit components.

The wireless communication unit 110 may include one or more modules enabling wireless communication between the electronic device 100 and a wireless communication system or between the electronic device 100 and another electronic device. For example, the wireless communication unit 110 may include a mobile communication module 111, a wireless local area network (LAN) module 113, a short range communication module 115, a position calculating module 117, and a broadcast receiving module 119.

The mobile communication module 111 may transmit/receive a wireless signal to/from at least one of a base station, an external electronic device, and various servers (for example, an integration server, a provider server, a content server, an Internet server, and a cloud server) via a mobile communication network. The wireless signal may include a voice call signal, video call signal, and data in various forms according to the transmission and reception of text/multimedia messages.

The mobile communication module 111 may transmit and receive data (for example, logs, contents, messages, mail, images, dynamic images, weather information, position information, time information, and the like). According to an embodiment of the present disclosure, the mobile communication module 111 may be connected to at least one of another electronic device and a server through a network (for example, mobile communication network), so as to acquire (receive) various types of data. The mobile communication module 111 may transmit various types of data required for operations of the electronic device 100 to the outside (for example, a server, another electronic device, or the like) in response to a user request.

The wireless LAN module 113 may be a module for establishing a wireless internet access and a wireless LAN link with other electronic devices. The wireless LAN module 113 may be installed inside or outside the electronic device 100. Use may be made of wireless Internet technologies, such as wireless LAN standards (e.g., 802.11n, etc.), wireless broadband (WiBro), world interoperability for microwave access (WiMax), high speed downlink packet access (HSDPA), millimeter wave (mmWave), and the like.

The wireless LAN module 113 may transmit/receive data selected by a user to/from the outside. According to an embodiment of the present disclosure, the wireless LAN module 113 may acquire (receive) data from another electronic device or a server through a network (for example, wireless Internet network). The wireless LAN module 113 may transmit data to the outside (for example, a server) or receive the data from the outside in response to a user request. The wireless LAN module 113 may transmit or receive various types of data corresponding to user's selection to/from another electronic device when a wireless LAN link with the other electronic device is formed. The wireless LAN module 113 may always remain in a turned-on state or may be selectively turned on according to a setting of the electronic device 100 or a user input.

The short-range communication module 115 may be for performing short-range communication. Bluetooth®, Bluetooth low energy (BLE), radio frequency identification (RFID), infrared data association (IrDA), ultra wideband (UWB), ZigBee®, near field communication (NFC), or the like may be used as a short range communication technology.

The short range communication module 115 may receive data. According to an embodiment of the present disclosure, the short range communication module 115 may acquire data from another electronic device through a network (for example, short range communication network). The short range communication module 115 may transmit or receive data corresponding to user's selection to/from another electronic device when short range communication with the other electronic device is connected. The short range communication module 115 may always remain in a turned-on state or may be selectively turned on according to a setting of the electronic device 100 or a user input.

The position calculating module 117 is a module for obtaining a position of the electronic device 100, and may include a GPS module as a representative example. The position calculating module 117 may calculate three dimensional information on a current position according to latitude, longitude, and altitude by calculating information on a distance away from three or more base stations and time information, and then applying trigonometry to the calculated information. Alternatively, the position calculating module 117 may calculate position information by continuously receiving position information on the electronic device 100 from three or more satellites. The position information on the electronic device 100 may be obtained by various methods.

The broadcast receiving module 119 may receive a broadcast signal (for example, a TV broadcast signal, a radio broadcast signal, a data broadcast signal, and the like) and/or broadcast related information (for example, information associated with a broadcast channel, a broadcast program, or a broadcast service provider) from an external broadcast management server through a broadcast channel (for example, a satellite broadcast channel, a terrestrial broadcast channel, or the like).

The user input unit 120 may generate input data for controlling the electronic device 100. The user input unit 120 may include at least one input means for detecting user inputs. For example, the user input unit 120 may include a keypad, a dome switch, a button, a touch pad (resistive type/capacitive type), a jog and shuttle, and a sensor. According to various embodiments of the present disclosure, the button may receive a user input for executing a preset function and may be implemented in at least one type of a button type and a touch pad type. Further, the button may include at least one type of a soft type provided in areas of the touch screen 130 and a physical type provided in areas other than the touch screen 130. Further, the user input unit 120 may include a button for distinguishing between a touch input and a press input. The press input may include an input received by applying a physical force to the button, and the touch input may include an input contacting the button. According to an embodiment of the present disclosure, the press input may include the touch input. The press input is determined as the touch input when a pressure applied to the button is equal to or smaller than a particular boundary value, and the press input is determined as the press input when the pressure is larger than the particular value.

According to various embodiments of the present disclosure, the sensor may include a voice recognition sensor, a finger scan sensor, an infrared (IR) sensor, an acceleration sensor, a gyro sensor, a terrestrial magnetism sensor, an illumination sensor, a color sensor, an image sensor, a temperature sensor, a proximity sensor, a motion recognition sensor, a heart rate monitor (HRM) sensor, an iris scan sensor, an electroencephalogram (EEG) sensor, an electrocardiography (ECG) sensor, or a pressure sensor.

Some parts of the user input unit 120 may be implemented in a button form at an outer region of the electronic device 100, or some or entire parts of the user input unit 120 may also be implemented as a touch panel. The user input unit 120 may receive a user input for initiating the electronic device 100 and generating an input signal according to the user input. For example, the user input unit 120 may receive various user inputs for displaying or selecting an item, executing a particular application, inputting (making or inserting) data, changing a position of the electronic device 100, displaying contents, connecting a network, and transmitting or receiving data, and may generate an input signal according to the user input.

The touch screen 130 is an input/output means for simultaneously performing input and output (i.e., display) functions and may include a display unit 131 and a touch detection unit 133. In various embodiments of the present disclosure, the touch screen 130 may display various screens including visual information according to the operation of the electronic device 100 through the display unit 131. The various screens may include, for example, an item display screen, a lock screen, a fingerprint recognition screen, a messenger screen, a call screen, a game screen, a video reproduction screen, a gallery screen, a webpage screen, a home screen, or a network connection screen. The touch screen 130 may detect an event (for example, a touch event, a hovering event, or an air gesture event) based on at least one of touch, hovering, and air gesture input from a user through the touch detection unit 133 while a particular screen is displayed through the display unit 131, and transmit an input signal according to the event to the controller 180.

The display unit 131 may display (output) various pieces of information processed by the electronic device 100. For example, the display unit 131 may display a UI or graphical UI (GUI) related to an operation for displaying and selecting an item by the electronic device 100. Further, the display unit 131 may display a UI or a GUI related to a phone call when the electronic device 100 is in a phone call mode. Hereinafter, the UI may be include the GUI. The display unit 131 may display at least one item and a control UI for selecting the item. According to an input corresponding to the control UI, an item located in an area different from that in which the control UI is located may be selected. Further, an item located in an area different from that in which the user input unit 120 is located may be selected based on an input received by the user input unit 120 without the separately displaying of the control UI. When the electronic device 100 is in a video call mode or photography mode, the display unit 131 may display a captured and/or received image and a UI and GUI related to operating the corresponding mode. The display unit 131 may display data or contents related to the use of the electronic device 100 or other electronic devices or information on other electronic device connected to the network. The display unit 131 may display various application execution screens corresponding to executed applications.

The display unit 131 may display a landscape mode and a portrait mode depending on an orientation of the electronic device 100 (or a direction in which the electronic device 100 is placed), display switching between the landscape and portrait modes. The display unit 131 may include at least one of a liquid crystal display (LCD), a thin film transistor-LCD (TFT-LCD), a light emitting diode (LED), an organic LED (OLED), an active matrix OLED (AMOLED), a flexible display, a bended display, and a three-dimensional display (3D). Some of the displays may be implemented as a transparent display of a transparent or photo-transparent type.

The touch detection unit 133 may be located on the display unit 131 and may detect a user input which contacts or is in proximity to the surface of the touch screen 130. The user input may include a touch event or a proximity event input based on at least one of a single-touch, a multi-touch, a hovering, and an air gesture. For example, the user input may be made in the type of a tap, drag, sweep, flick, swipe, drag and drop, drawing gesture (for example, writing), and the like. The touch detection unit 133 may detect a user input (for example, a touch event or a proximity event) on the surface of the touch screen 130, generate a signal corresponding to the detected user input, and transfer the generated signal to the controller 180. The controller 180 may control execution of a function corresponding to an area where the user input (for example, the touch event or the proximity event) is generated by the signal transmitted from the touch detection unit 133.

The touch detection unit 133 may receive a user input for initiating the operation related to the use of the electronic device 100 and generate an input signal according to the user input.

The touch detection unit 133 may be configured to convert a change in pressure applied to a specific portion of the display unit 131 or a change in capacity generated at a specific portion of the display unit 131 into an electrical input signal. The touch detection unit 133 may detect a position and an area of the surface of the display unit 131 which the input means (for example, a user's finger, an electronic pen, or the like) contacts or is in proximity to. Further, the touch detection unit 133 may be implemented to detect pressure when the touch is made according to the applied touch type. When there is a touch or proximity input for the touch detection unit 133, a signal (signals) corresponding to the input may be transferred to a touch controller (not shown). The touch controller (not shown) may process the signal and then transmit corresponding data to the controller 180. Accordingly, the controller 180 may identify the touched area of the touch screen 130 where the touch or proximity input is made, and execute a function corresponding to the touch or proximity input.

The audio processor 140 may transmit, to a speaker (SPK) 141, an audio signal input from the controller 180, and may transfer an audio signal such as a voice input from a microphone (MIC) 143 to the controller 180. The audio processor 140 may convert voice/sound data into an audible sound to output the audible sound through the SPK 141 and convert an audio signal, such as a voice, received from the MIC 143 into a digital signal to transfer the digital signal to the controller 180. The audio processor 140 may output an audio signal corresponding to a user input according to audio processing information (for example, an effect sound, a music file or the like).

The SPK 141 may output audio data received from the wireless communication unit 110 or stored in the storage unit 150. The SPK 141 may output sound signals related to various operations (functions) performed by the electronic device 141.

The MIC 143 may receive an external sound signal and convert the sound signal into electrical voice data. In the phone call mode, the voice data processed through the MIC 143 may be converted into a format that can be transmitted through the mobile communication module 111. Various noise reduction algorithms may be implemented in the MIC 143 to remove noise generated in the external sound signal.

The storage unit 150 may store one or more programs executed by the controller 180 and temporarily store input/output data. The input/output data may include, for example, logs, contents, messenger data (for example, conversation data), contact information (for example, landline or mobile phone numbers), messages, media files (for example, audio, video, and image files).

The storage unit 150 may store various programs and data related to displaying an item of the electronic device 100. For example, the storage unit 150 may store information related to one or more items including information acquired from the inside or outside, and store one or more programs for selecting items in response to a user interaction and data processed according to the programs.

The storage unit 150 may also store use frequency (for example, application use frequency, content use frequency or the like), importance, and priority according to the operation of the electronic device 100. The storage unit 150 may store data related to various patterns of vibrations and sounds to output in response to a touch input or a proximity input on the touch screen 130. The storage unit 150 may store an operating system (OS) of the electronic device 100, a program related to an input and display control operation using the touch screen 130, a program related to a control operation of various operations (functions) of the electronic device 100, and various pieces of data generated by the operations of the programs.

The storage unit 150 may include at least one type of storage medium of a flash memory type, a hard disk type, a micro type, a card type (for example, a secure digital (SD) card, an extreme digital (XD) card, or the like), a dynamic random access memory (DRAM), a static RAM (SRAM), a read-only memory (ROM), a programmable ROM (PROM), an electrically erasable PROM (EEPROM), a magnetic RAM (MRAM), a magnetic disk, and an optical disk type memory. The electronic device 100 may also operate in relation to a storage function that stores content on an external device such as on the Internet.

The interface unit 160 may serve as an interface between the electronic device 100 and all external devices connected to the electronic device 100. The interface unit 160 may receive data from an external device or receive power and transmit the data or power to each component within the electronic device or allow data within the electronic device 100 to be transmitted to the external device. For example, the interface unit 160 may include a wired/wireless headset port, an external charger port, a wired/wireless data port, a memory card port, a port for connecting a device including an identification module, an audio input/output port, a video input/output port, an earphone port, and the like.

The camera module 170 supports a photography function of the electronic device 100. The camera module 170 may capture an image (a still image or a dynamic image) of a subject. The camera module 170 may photograph a predetermined subject and may transfer the photographed data to the display unit 131 and the controller 180. The camera module 170 may include an image sensor (or a camera sensor) (not shown) for converting an input photo signal into an electric signal and an image signal processor (not shown) for converting the electric signal input from the image sensor into digital image data. The image sensor may include a sensor using a scheme such as a charge-coupled device (CCD) or a complementary metal-oxide-semiconductor (CMOS). The camera module 170 may support an image processing function for supporting various photographing options (for example, zooming, a screen ratio, and an effect (for example, sketch, mono, sepia, vintage, mosaic, and a picture frame)) in accordance with user's settings.

The controller 180 may control a general operation of the electronic device 100. For example, the controller 180 may perform a control related to voice communication, data communication, video communication, and the like. According to an embodiment of the present disclosure, the controller 180 may control an operation related to displaying an item and selecting an item according to a user input.

For example, the controller 180 may display at least one item on the display unit 131 and select the displayed item based on a user input. More specifically, the controller 180 may display a control UI for selecting the item and select the displayed item based on a user input made according to the control UI. Further, the controller 180 may select the displayed item based on an input made on the user input unit 120.

According to an embodiment of the present disclosure, the controller 180 may be implemented by one or more processors by executing one or more programs stored in the storage unit 150. For example, the controller 180 may control the display unit 131 to include at least one of an item and a control UI and may control the electronic device 100 to select the item based on an input received through at least one of the touch detection unit 133 and the user input unit 120.

The controller 180 may control various operations related to a general function of the electronic device 100 in addition to the aforementioned functions. For example, when a specific application is executed, the controller 180 may control an operation and a screen display for the specific application. Further, the controller 180 may receive input signals corresponding to various touch event inputs or proximity event inputs supported by a touch-based or proximity-based input interface (for example, the touch screen 130) and may control operations according to the received input signals. Moreover, the controller 180 may also control transmission/reception of data based on wired communication or wireless communication.

The power supply unit 190 may receive external power and internal power and supply power required for operating each component. According to an embodiment of the present disclosure, the power supply unit 190 may supply or block (on/off) power to the display unit 131.

The various embodiments of the present disclosure may be implemented in a recording medium, which can be read through a computer or a similar device, by using software, hardware, or a combination thereof. According to one implementation, the various embodiments of the present disclosure may be implemented using at least one of ASICs, digital signal processors (DSPs), digital signal processing devices (DSPDs), programmable logic devices (PLDs), FPGAs, processors, controllers, micro-controllers, micro-processors, and electrical units for performing other functions.

Other embodiments of the present disclosure may include a computer-readable recording medium having a program recorded therein to execute an operation for selecting contents for a lock screen in response to turn-off or turn-on of the display unit 131, an operation for changing the lock screen based on the selected contents, an operation for receiving a user interaction based on at least one button (for example, at least some of a power button, a volume button, and a home button), and an operation for displaying the changed lock screen when the display unit 131 is turned on.

Aspects of the present disclosure may also be implemented as separate software modules. Each of the software modules may perform one or more functions and operations described in the present disclosure.

In the following description, the item included in the display unit may be include text, an image, music, a dynamic image, an icon, link, an app, or a webpage, and may be generated based on information such as a message, a feed, news, a picture, or stock gathered or received internally (for example, the storage unit 150) or externally (for example, an external server or another electronic device). Further, according to an embodiment of the present disclosure, the user input may include a touch input, a tap input, a press input, a drag input, and a hold input made through the touch detection unit 133 or the user input unit 120. According to an embodiment of the present disclosure, the touch input may be a drag input, a hold input, and a tap input.

Figure 2:
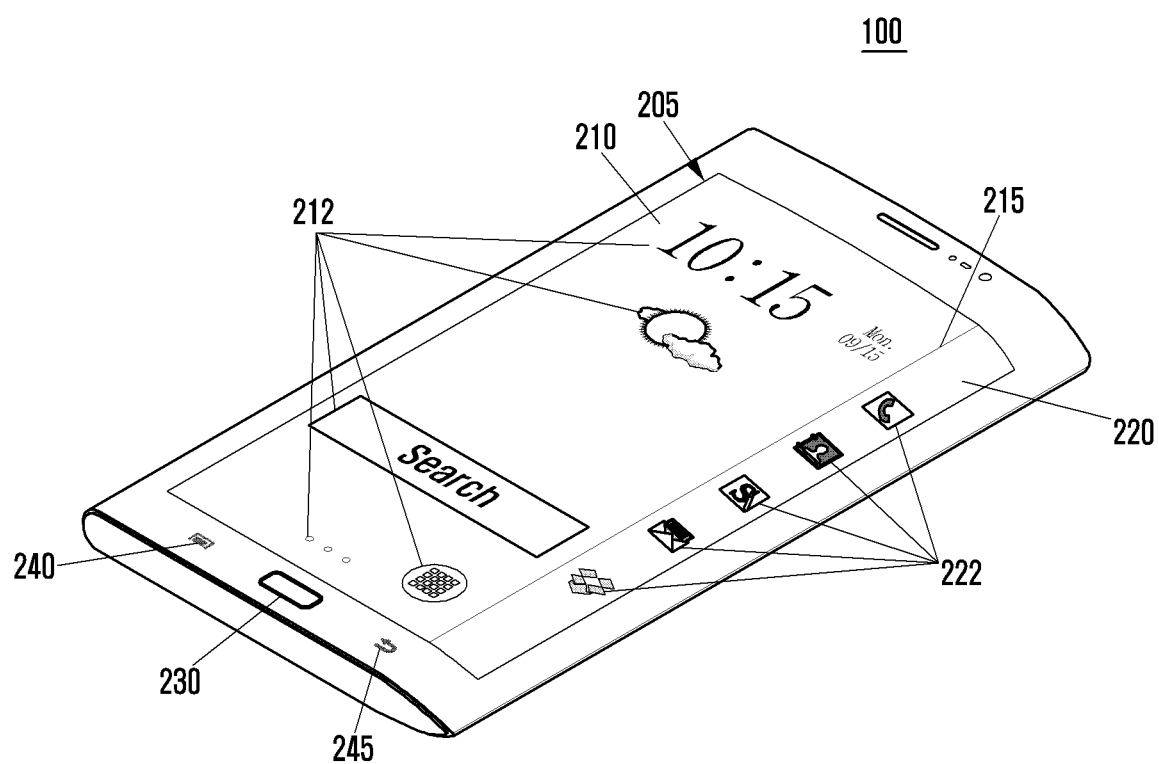
FIG. 2 is a perspective view of the electronic device according to an embodiment of the present disclosure.

FIG. 2 is a perspective view of an electronic device according to an embodiment of the present disclosure.

Referring to FIG. 2, the electronic device 100 may include a display unit 205 which can display a UI related to the operation of the electronic device 100. According to an embodiment of the present disclosure, the display unit 205 may include a plurality of areas and, for example, may include a first display unit 210 and a second display unit 220. The first display unit 210 and the second display unit 220 may be formed to be connected to each other on different planes according to an embodiment of the present disclosure. Further, according to an embodiment of the present disclosure, the planes of the first display unit 210 and the second display unit 220 may be formed to cross each other, and the second display unit 220 may be formed to be curved from one side of the first display unit 210.

The first display unit 210 may include one or more items 212. According to an embodiment of the present disclosure, the item may include an element which can be selected by the user or show particular information.

The second display unit 220 may include one or more items 222. Throughout the embodiments of the present disclosure, an input for displaying a control UI or a cursor may be received through the second display unit 220 and, accordingly, an operation for displaying the control UI or the cursor on the first display unit 210 may be performed.

According to an embodiment of the present disclosure, items displayed on the display units may be items equal to each other or different from each other. When the items are different from each other, the items displayed in the areas may be distinguished according to characteristics thereof to be displayed on the respective display units.

According to an embodiment of the present disclosure, the electronic device 100 may include one or more input units 230, 240, and 245. The input units 230, 240, and 245 may detect at least one of the user's touch input and press input. More specifically, the first input unit 230 may distinguishably detect the touch input and the press input. The second input unit 240 and the third input unit 245 may detect the touch input. When an input made on each input unit 230, 240, or 245 is detected, the electronic device 100 may perform an operation corresponding to each input. More specifically, based on at least one of the touch input and the press input received by at least one of the first input unit to the third input unit 230, 240, and 245, the item selection disclosed in an embodiment of the present disclosure may be performed. For example, one or more items displayed on the screen may be sequentially selected according to the touch input received by the first input unit 230.

FIGS. 3A, 3B, 3C, 3D, 3E, 3F, 3G, 3H, 3I, 3J, and 3K illustrate a UI provided by the electronic device according to various embodiments of the present disclosure.

Referring to FIGS. 3A, 3B, 3C, 3D, 3E, 3F, 3G, 3H, 3I, 3J, and 3J, the electronic device 100 may display one or more items 301 to 305 on the display unit 205. The display unit 205 may include a touch screen formed in a corresponding location, and the touch screen may receive an input corresponding to an element displayed on the display unit 205.

The electronic device 100 according to an embodiment of the present disclosure may include one or more input units such as a first input unit 230, which can receive the touch input and the press input, and a second input unit 240 and a third input unit 245 which can receive the touch input according to an embodiment of the present disclosure.

Figure 3A:
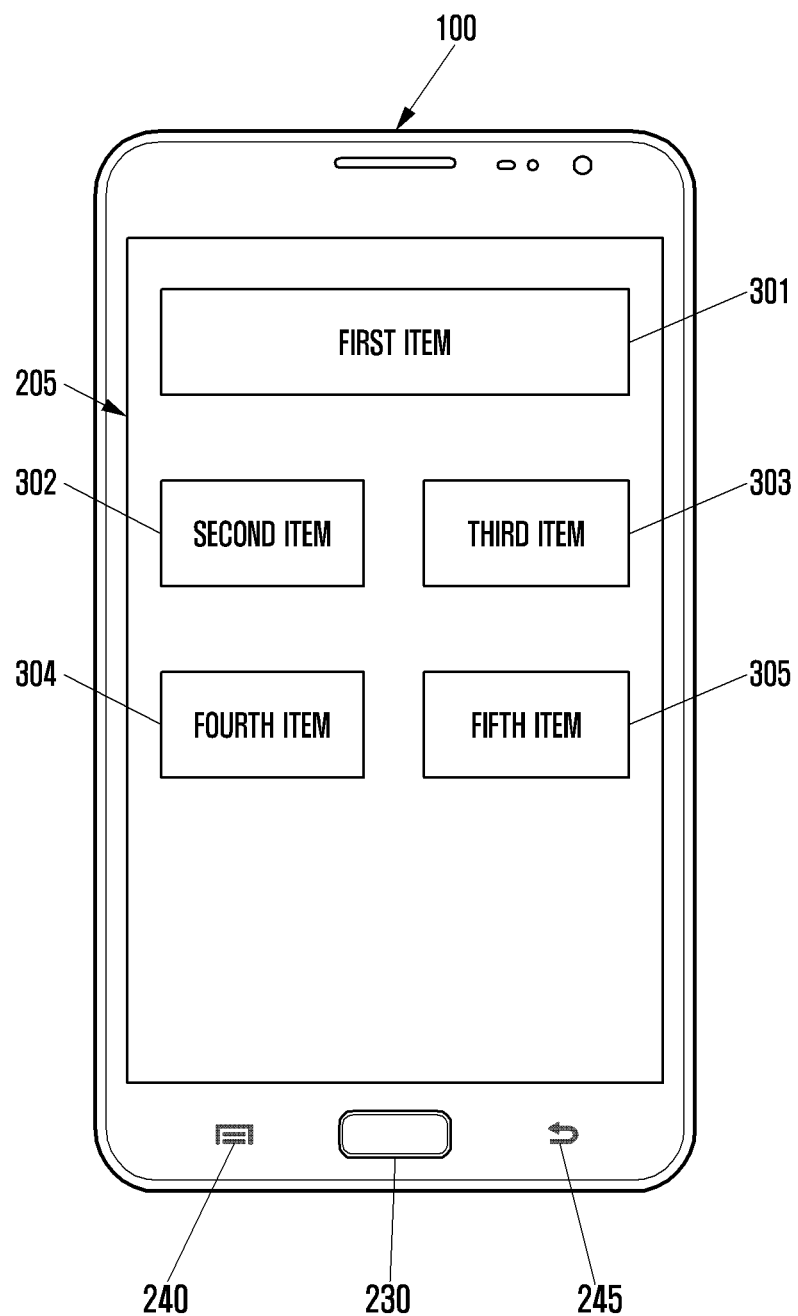
FIGS. 3A, 3B, 3C, 3D, 3E, 3F, 3G, 3H, 3I, 3J, and 3K illustrate a user interface (UI) provided by the electronic device according to various embodiments of the present disclosure.
Figure 3B:
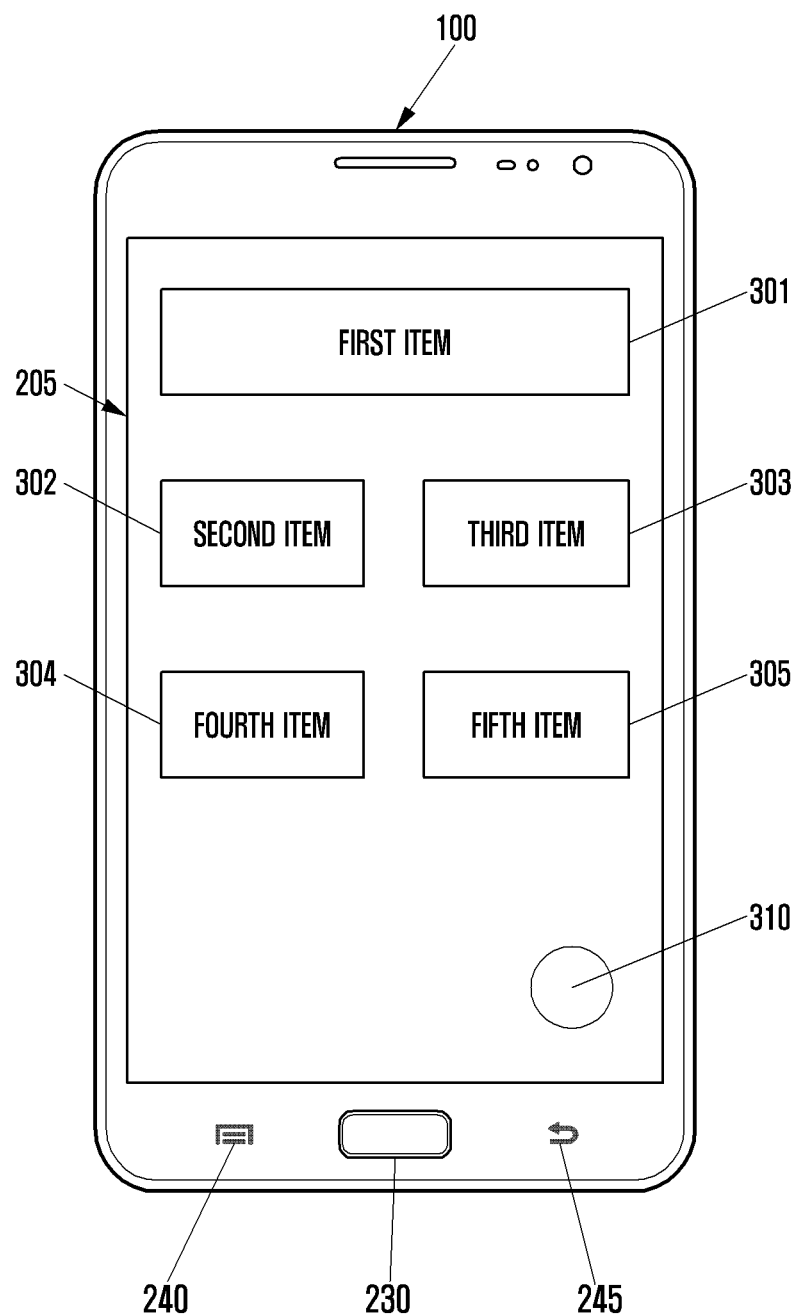

Referring to FIGS. 3A and 3B, a first item 301, a second item 302, a third item 303, a fourth item 304, and a fifth item 305 may be displayed on the electronic device 100. According to an embodiment of the present disclosure, the electronic device 100 may display a control UI 310 for selecting an item based on a control user input. An input for displaying the control UI 310 may include an input of activating a setting for displaying the control UI on a separate menu screen and a particular input received by at least one of the touch screen and the input unit. More specifically, the input may include at least one of a tap input successively made at least two times on the touch screen in a particular area of the display unit 205, a hold input lasting for at least a particular time, an input of selecting a particular icon for displaying the control UI 310, and a touch input and a press input made on the input unit 230 at least one time. Further, the input may include a tap input and a press input successively made at least two times on the first input unit 230. Moreover, the input may include a tap input and a press input lasting longer than a particular time. Furthermore, the input may include a tap input successively made at least two times on the second input 240 and the third input unit 245. In addition, the input may include a tap input lasting longer than a particular time on the second input 240 and the third input unit 245. According to an embodiment of the present disclosure, a one hand control mode may occur when the control UI 310 is displayed and at least one item may be selected through a user input received based on the control UI 310. According to an embodiment of the present disclosure, the one hand control mode may start according to a separate user's setting. More specifically, when the electronic device 100 operates in the one hand control mode according to the user's setting, the control UI 310 may be displayed. More specifically, when the electronic device 100 executes an application in the one hand control mode, the control UI 310 may be directly displayed in a predetermined location and items may be sequentially selected based on the displayed control UI 310.

Further, according to an embodiment of the present disclosure, the control UI 310 may be displayed in a location corresponding to the input for displaying the control UI 310. A form of the control UI 310 may vary depending on an embodiment and a detailed example thereof will be described below.

Figure 3C:
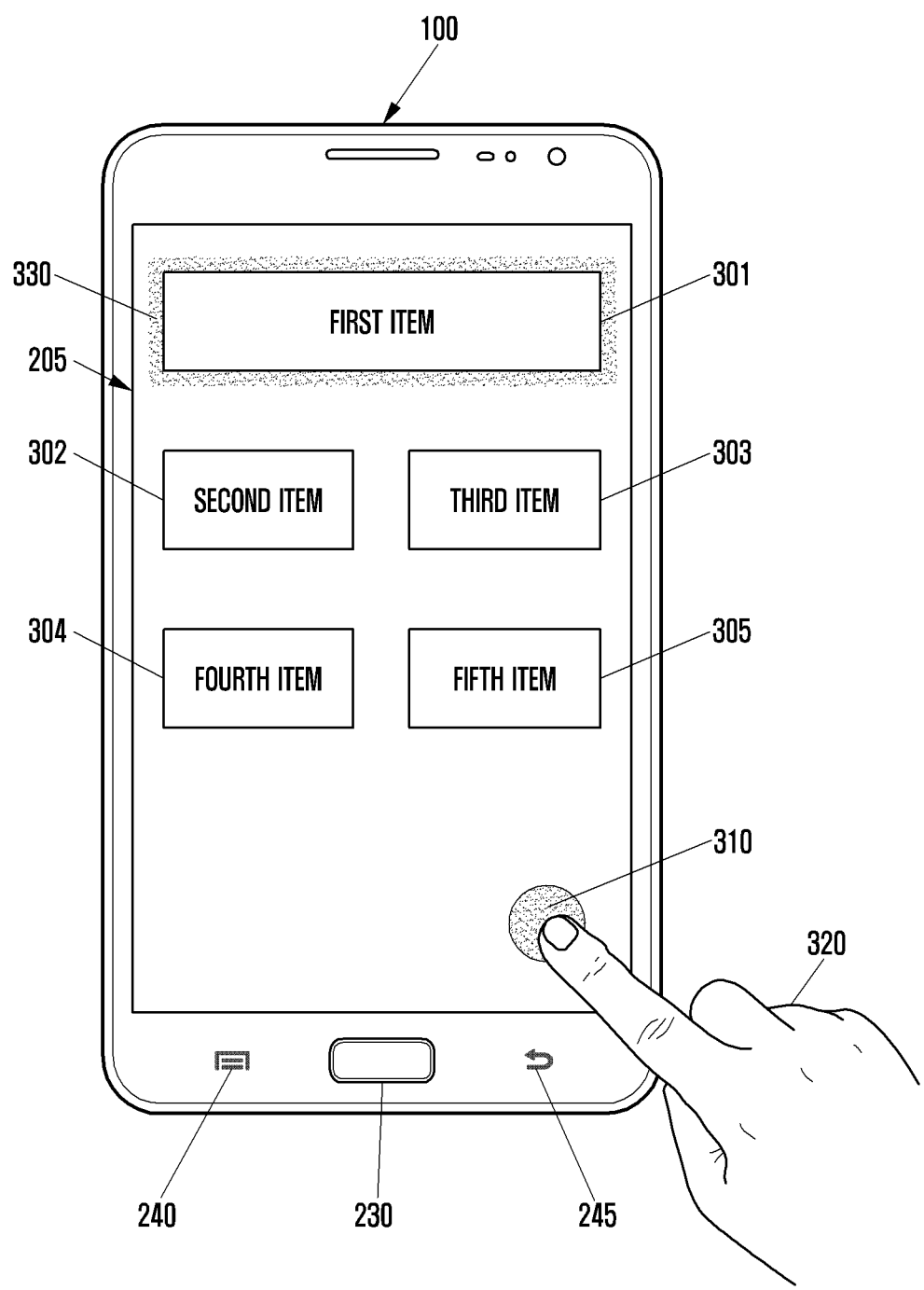
Figure 3D:
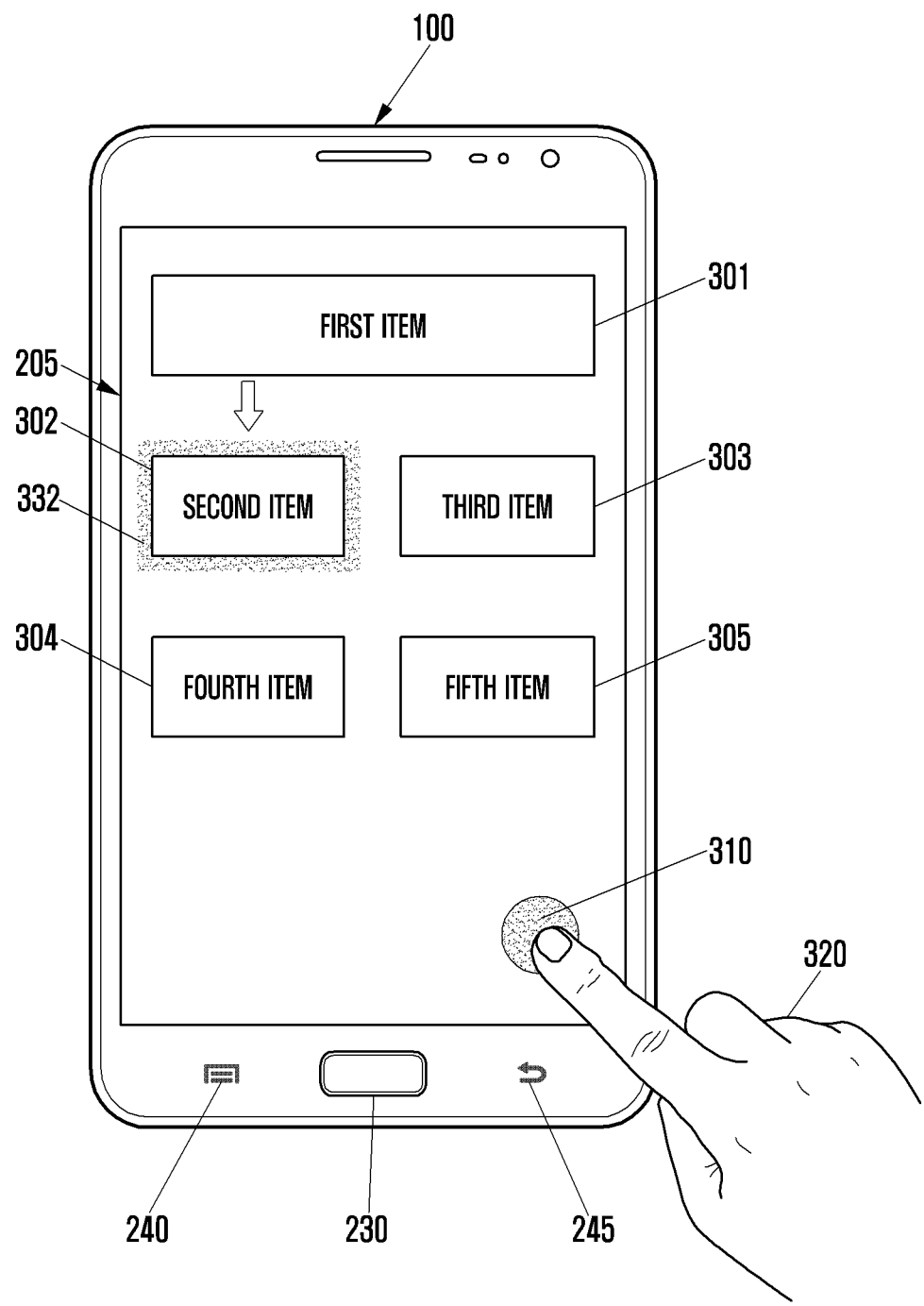

Referring to FIGS. 3B, 3C, and 3D, the control UI 310 is displayed and, when a user input 320 in the displayed control UI 310 is received, at least one of the displayed items may be selected. According to an embodiment of the present disclosure, an operation of selecting an item and an operation of displaying a focus area 330 corresponding to the selected item may be included. Since the focus area 330 corresponding to the item to be selected is displayed, the user may easily determine whether the corresponding item is selected or not. According to an embodiment of the present disclosure, an order of the items selected according to the user input 320 may be determined based on a preset order, and the preset order may be determined based on at least one of locations of the items displayed on the display unit 205 and use frequency of the items. More specifically, among a plurality of displayed items, an item located on the top may be selected first. Among items having the horizontally same location, an item located on the left side may be first selected. However, such an order is not fixed and may be changed and applied according to at least one of the arrangement of the items and applications types for displaying the items. The selection order may vary depending on a user's setting.

The first item 301 may be selected according to the user input 320. More specifically, the first item 301 may be selected when an input for selecting an item is initially received by the control UI 310, and the second item 302 may be selected when an input for selecting an item is additionally received. When the second item 302 is selected, a corresponding focus area 332 may be displayed. For example, the first item 301 and the second item 302 may be sequentially selected based on a touch input made on the control UI 310 and, when an item selection input is additionally received, the third item 303 may be selected. According to the repetitive selection inputs, the items displayed on the display unit 205 may be sequentially selected. According to an embodiment of the present disclosure, when a touch or press input is received by the first input unit 230 instead of the control UI 310, the items may be sequentially selected. According to an embodiment of the present disclosure, an arrow in FIG. 3D is for helping with understanding but may be omitted, and may be provided by a UI indicating an item to be selected according to the next tap after the first item 301 is selected. The item selection input may be used as an item execution input.

Figure 3E:
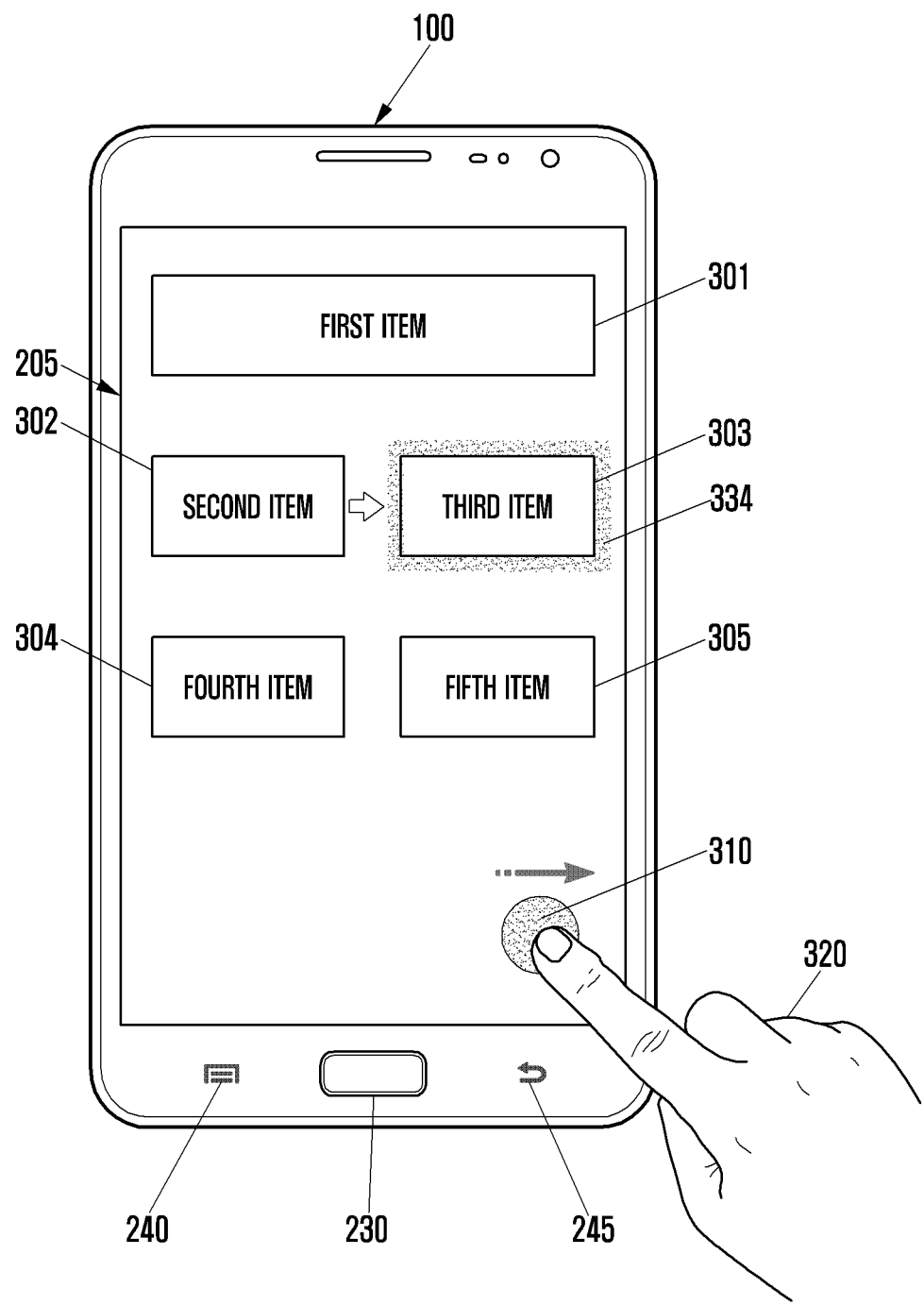

Referring to FIGS. 3D and 3E, the second item 302 may be selected and, accordingly, the focus area 332 may be displayed. At this time, when an input of moving a control 310 in a particular direction is received, another item corresponding to the input of moving the control 310 may be selected based on the movement direction. More specifically, when the second item 302 is selected in FIG. 3D and an input of dragging the control UI 310 in a right direction is received in FIG. 3E, the third item 303 may be selected. Referring to FIG. 3C, when an input of moving the control UI 310 in a lower right direction after the first item 301 is selected, the third item 303 and the fifth item 305 may be sequentially selected. That is, when the input of moving the control UI 310 is received, the item may be selected based on the input movement direction.

Figure 3F:
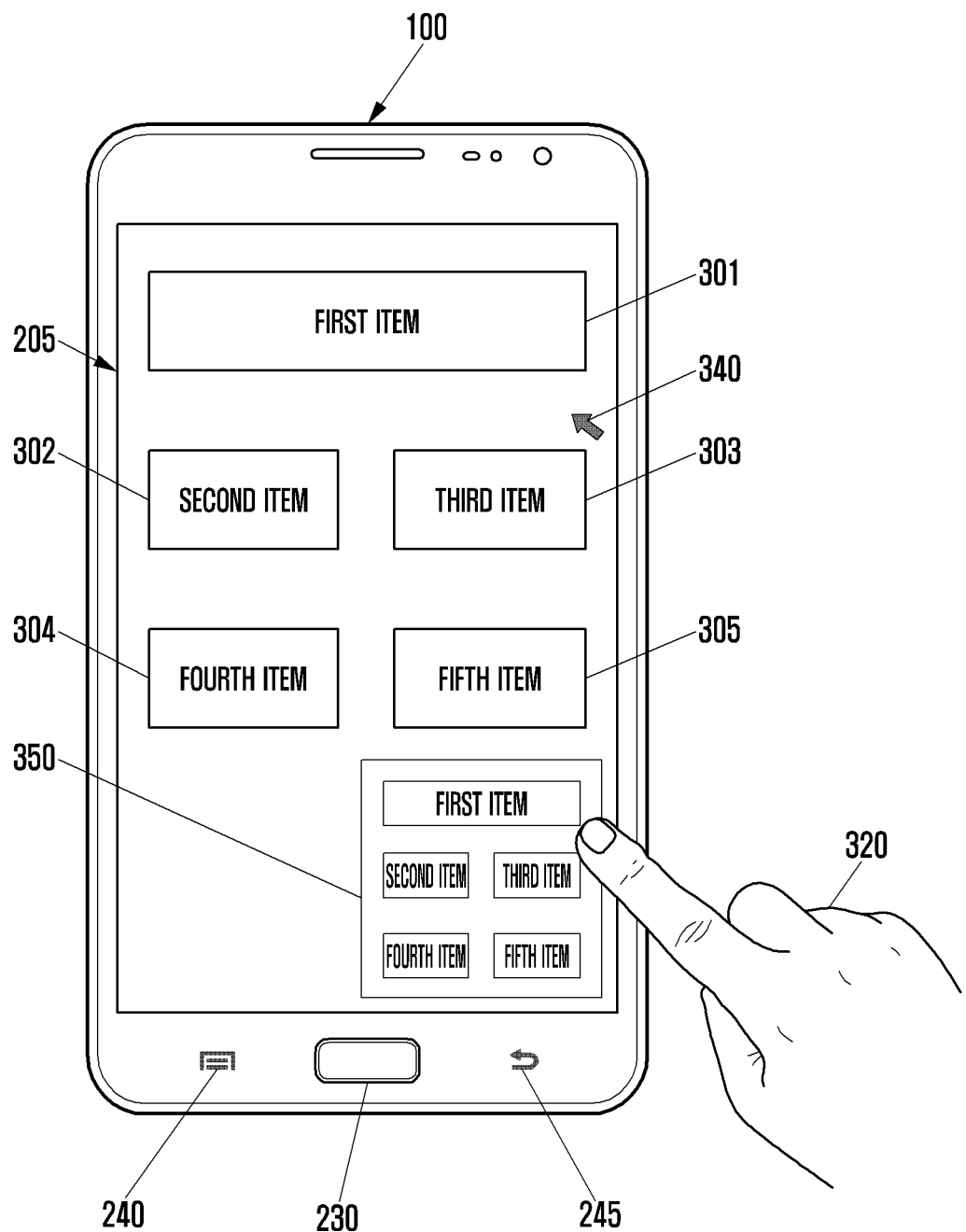

Referring to FIG. 3F, a cursor 340 may be displayed on the display unit 205 in response to the user input 320. According to an embodiment of the present disclosure, the cursor 340 may move in response to the user input 320 and at least one item corresponding to the moved location may be selected. According to an embodiment of the present disclosure, a guide UI 350 may be selectively displayed in accordance with a location where the user input 320 is received. The guide UI 350 may have a form reduced from an entire screen displayed on the display unit 205 and may selectively display only an item selectable from the entire screen. According to an embodiment, the cursor 340 may move in response to the user input and, more particularly, the cursor 340 may move in proportion to a movement distance on the guide UI 350. As described above, the guide UI 350 may be included in the one hand control mode.

According to an embodiment of the present disclosure, at least one of the cursor 340 and the guide UI 350 may be displayed based on at least one of a tap operation, a hold operation, and a hold operation after at least one tap. When the cursor 340 moves to a location corresponding to a particular item, the item may be selected and the item may be also selected according to a separate selection input. The separate selection input may include a tap input.

Figure 3G:
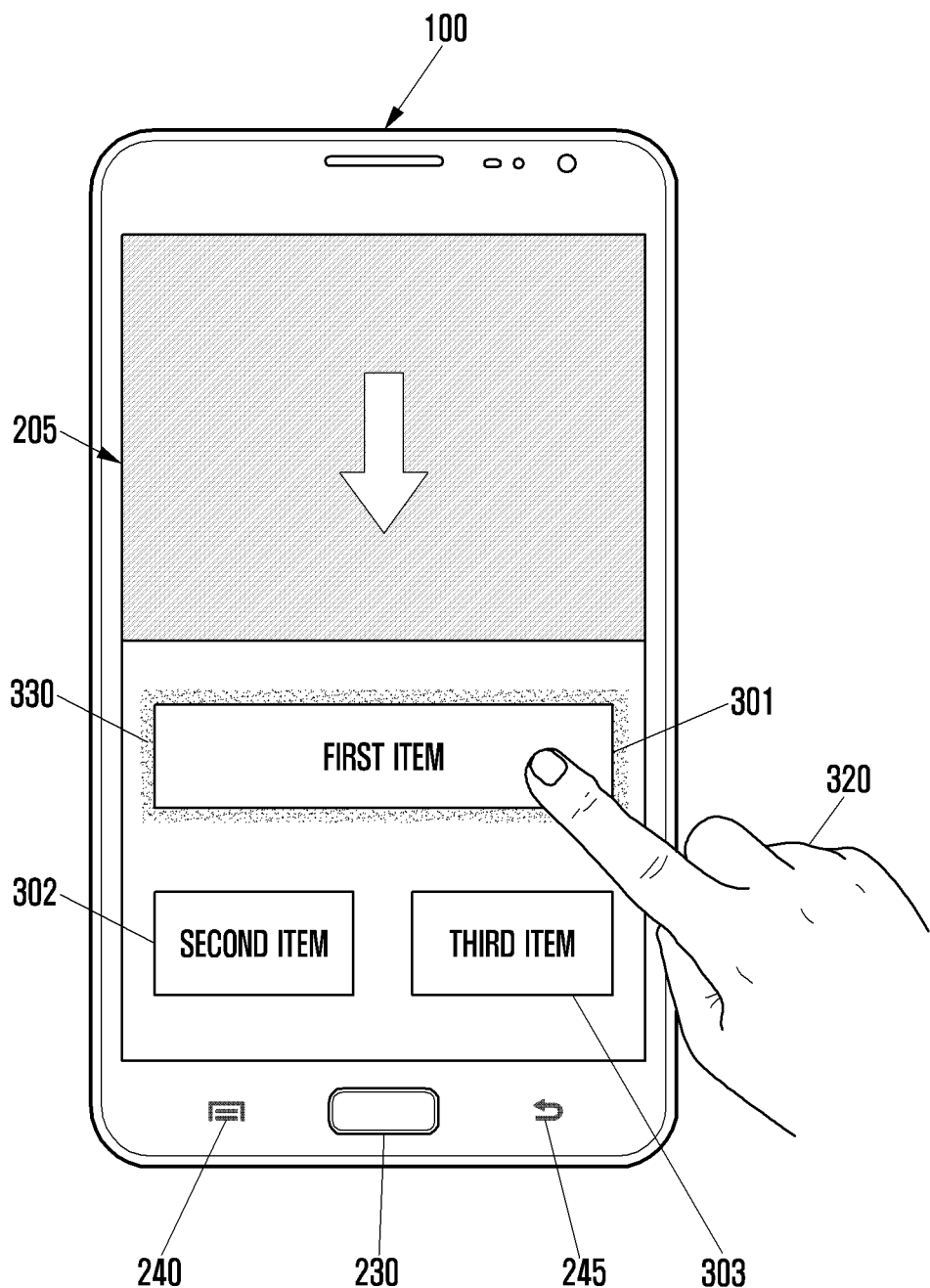

Referring to FIGS. 3C and 3G, when a drag in a particular direction is performed when the first item 301 is selected, the screen displayed on the display unit 205 may be moved and displayed in the drag direction. More specifically, when a drag input in a bottom direction is received by the control UI 310 when the first item 301 is selected, the screen displayed on the display unit 205 may be moved downwardly, and the entire screen displayed on the display unit 205 may be moved downwardly to move the selected item 301 near the location where the control UI 310 is originally displayed. The user may select an item through a touch input on the moved screen. As described above, by moving the entire screen downwardly, the user may provide an input near the selected item.

Figure 3H:
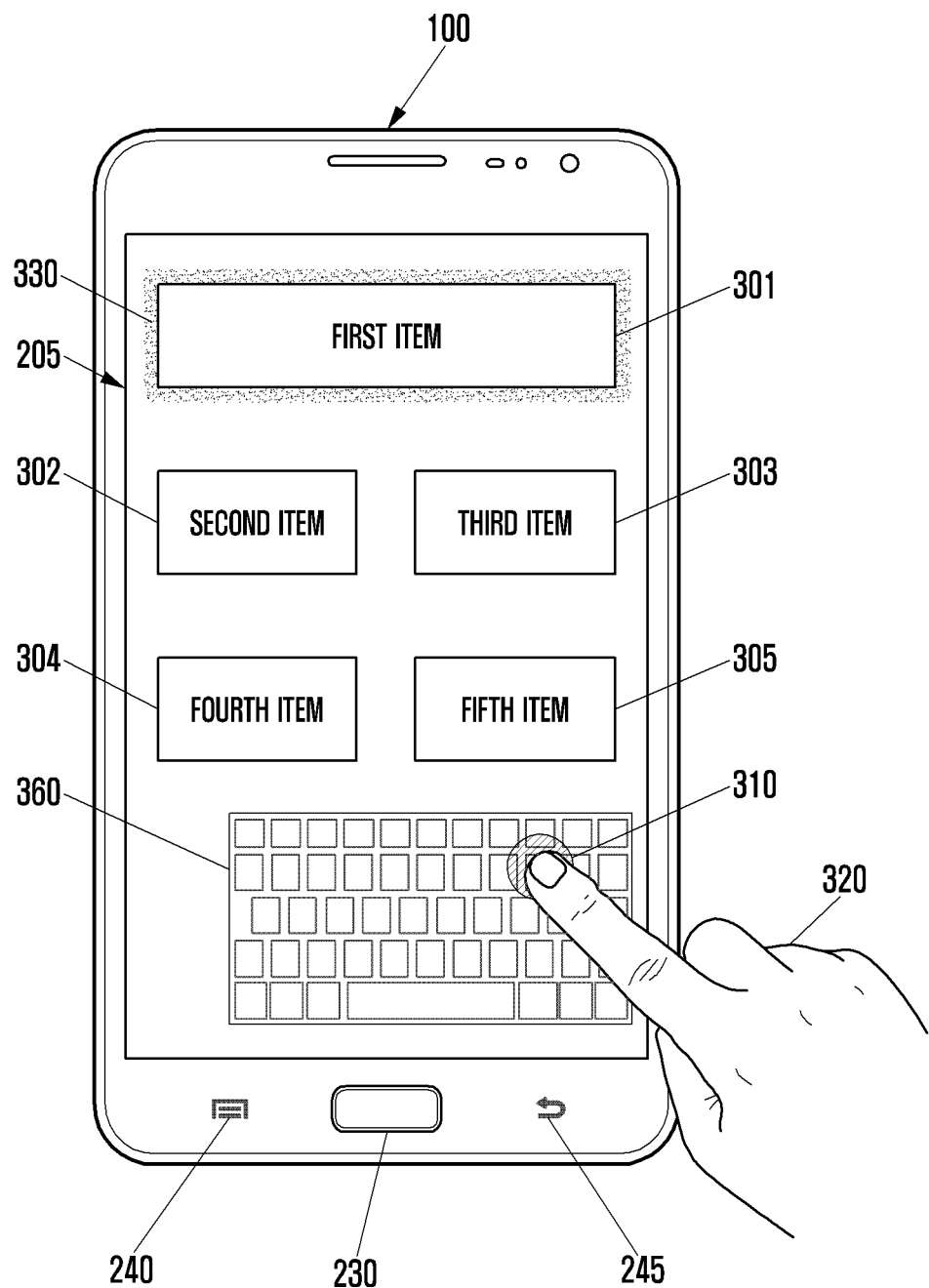

Referring to FIGS. 3C, 3D, and 3H, when the first item 301 is selected and the first item 301 corresponds to a field (e.g., a search field, a text box, or the like) requiring an additional input, an input UI 360 corresponding to the selected first item 301 may be displayed and the user may input additional information corresponding to the first item 301 through the input UI 360. According to an embodiment of the present disclosure, the input UI 360 may be a keypad through which at least one of characters and numbers can be input. Further, according to an embodiment of the present disclosure, the input UI 360 may be displayed in a location corresponding to the location where the control UI 310 is displayed. More specifically, when the control UI 310 is located on a lower right portion of the screen and the first item 301 is selected, the input UI 360 may be located on the lower right portion of the screen. According to an embodiment of the present disclosure, when the control UI 310 is located on a lower left portion and the first item 301 is selected, the input UI 360 may be displayed on the lower left portion. When an input of selecting another item is additionally made on the control UI 310 and the next selected second item 302 corresponds to an item which does not require an additional input, the focus area 332 of the second item 302 may be displayed and the input UI 360 may not be displayed. As described above, the input UI 360 may be selectively displayed according to characteristics of the sequentially selected items. Further, when an item requiring an additional input is selected, the input UI 360 may be automatically displayed without a separate input. When an application is executed while an input for activating the one hand control mode is received or while the terminal operates in the one hand control mode and a first selected item corresponds to an item which requires an additional input, the input UI 360 may be displayed in response to the execution of the application.

Figure 3I:
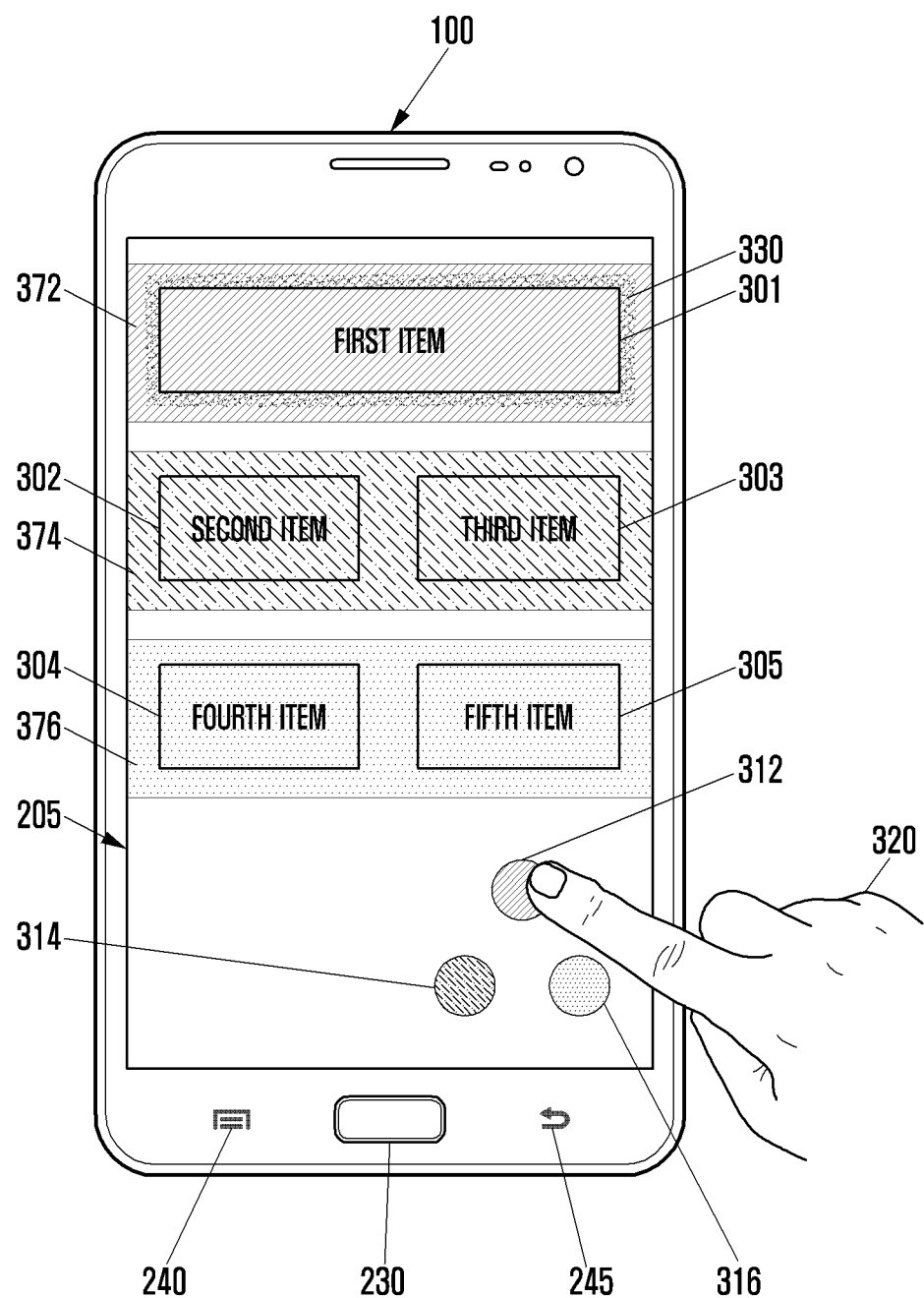

Referring to FIG. 3I, according to an embodiment of the present disclosure, control UIs 312, 314, and 316 may be displayed and each control UI may select at least one item from a plurality of items. More specifically, the first item 301 may be selected when the first control UI 312 receives a selection input, the second item 302 and the third item 303 may be sequentially selected when the second control UI 314 receives a selection input, and the fourth item 304 and the fifth item 305 may be sequentially selected when the third UI 316 receives a selection input. According to an embodiment of the present disclosure, to display items corresponding to the control UIs 312, 314, and 316, respectively, auxiliary UIs 372, 374, and 376 may be displayed. More specifically, each auxiliary UI may be configured in a form corresponding to each control UI.

Figure 3J:
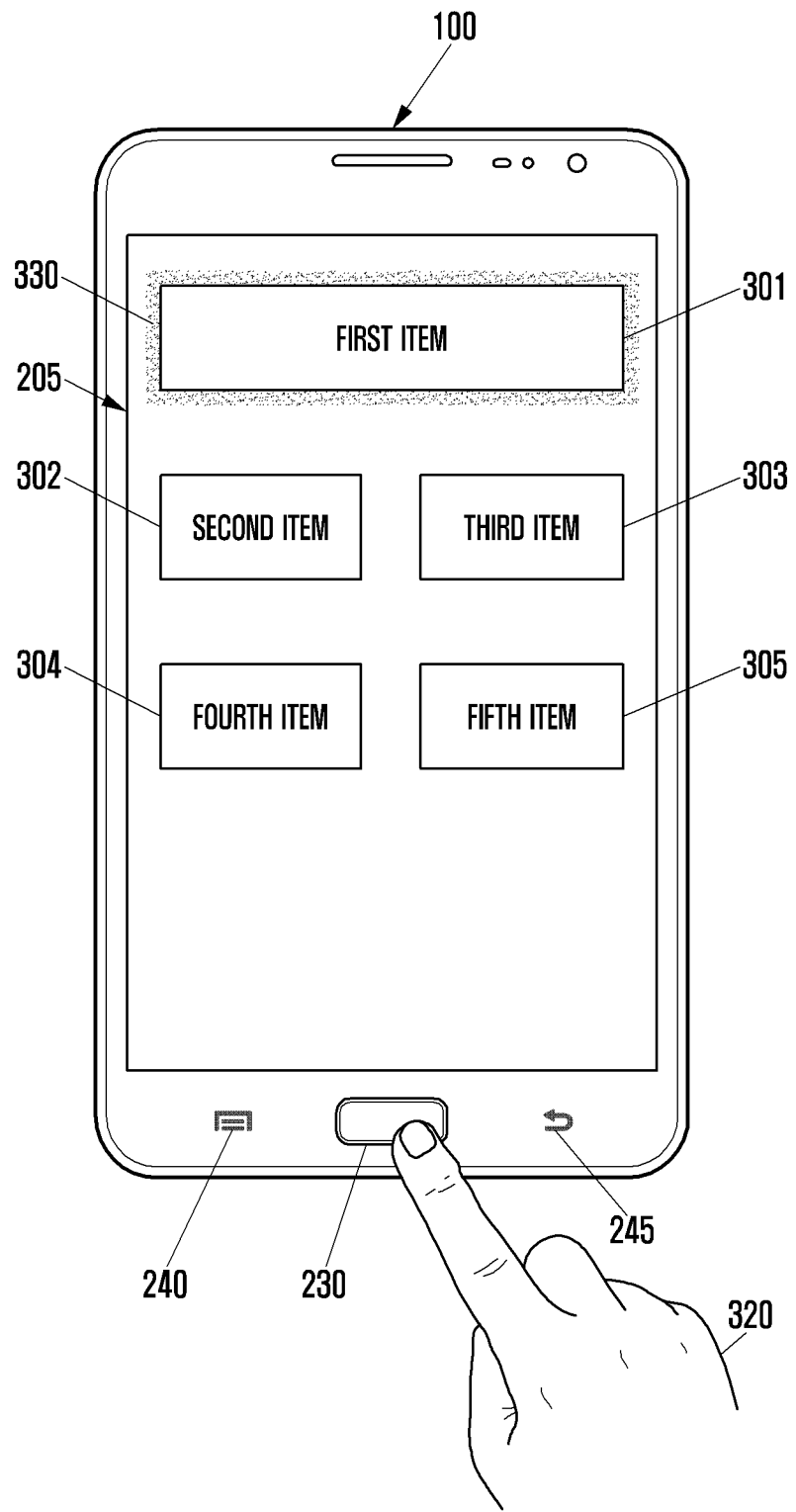

Referring to FIG. 3J, a selection mode may start based on an input received by at least one of the input units 230, 240, and 245 and each item may be selected. According to an embodiment of the present disclosure, the selection mode may include an operation for selecting, based on a separate input, an item outside of the input location. The input received by each input unit 230, 240, or 245 may include at least one of a touch input, press input, hold input, and tap input. According to a first embodiment of the present disclosure, the selection mode may start based on at least one press input received by the first input unit 230. In the selection mode, the focus may be moved based on the tap input or the touch input received by the first input unit 230 and an item may be selected by a separate selection input. Further, items may be sequentially selected based on a tap input made through the first input unit 230 by considering the focus input and the selection input as one input, and a UI corresponding to the item selection may be displayed according to the selected item. A UI corresponding to the item selection may perform an operation of displaying a keypad for a key input. According to an embodiment of the present disclosure, the selection mode may start or item selection may be performed based on the input received by the second input unit 240 or the third input unit 245.

Figure 3K:
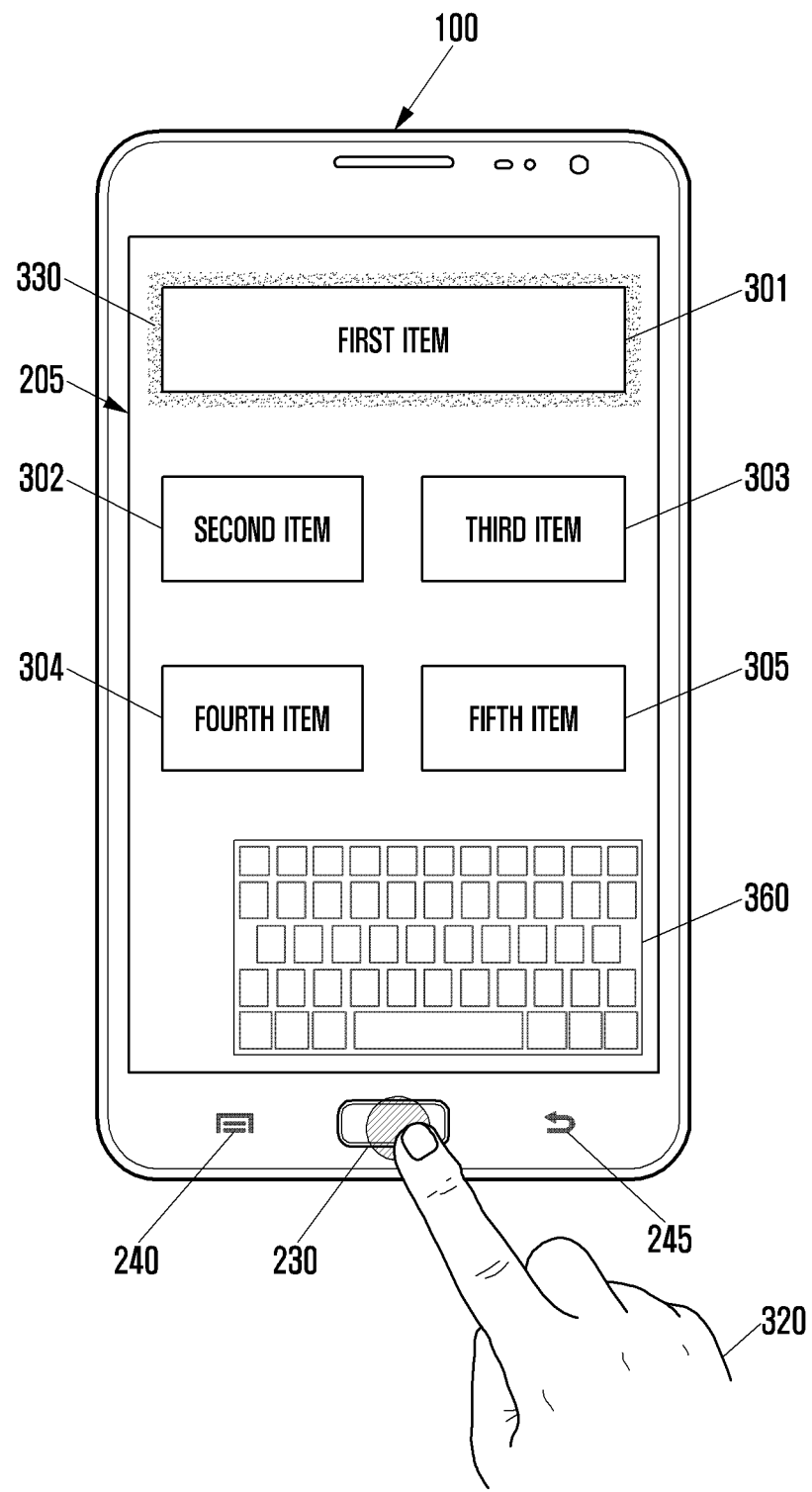

Referring to FIG. 3K, the selection mode may start based on an input received by at least one of the input units 230, 240, and 245 and each item may be selected. According to an embodiment of the present disclosure, the selection mode may include an operation for selecting, based on a separate input, an item outside of the input location. The input received by each input unit 230, 240, or 245 may include at least one of a touch input, press input, hold input, and tap input. When the selected first item 301 requires an additional input, an input UI 360 for receiving the additional input may be displayed. The input UI 360 may include a virtual keypad through which characters can be input.

FIGS. 4A, 4B, 4C, 4D, 4E, 4F, 4G, 4H, and 4I illustrate a method of providing a UI by the electronic device according to various embodiments of the present disclosure.

Referring to FIGS. 4A, 4B, 4C, 4D, 4E, 4F, 4G, 4H, and 4I, a selection mode according to an embodiment of the present disclosure may be implemented according to an application provided by the electronic device. Although it is described that at least one of focus movement and selection may be performed according to an input 452 based on a control UI 450, at least one of the focus movement and selection may be performed through the input unit provided by the electronic device. According to an embodiment of the present disclosure, a plurality of selectable items may be sequentially selected according to a received selection input and only some of the selectable items may be sequentially selected according to a user's setting or an application setting.

Figure 4A:
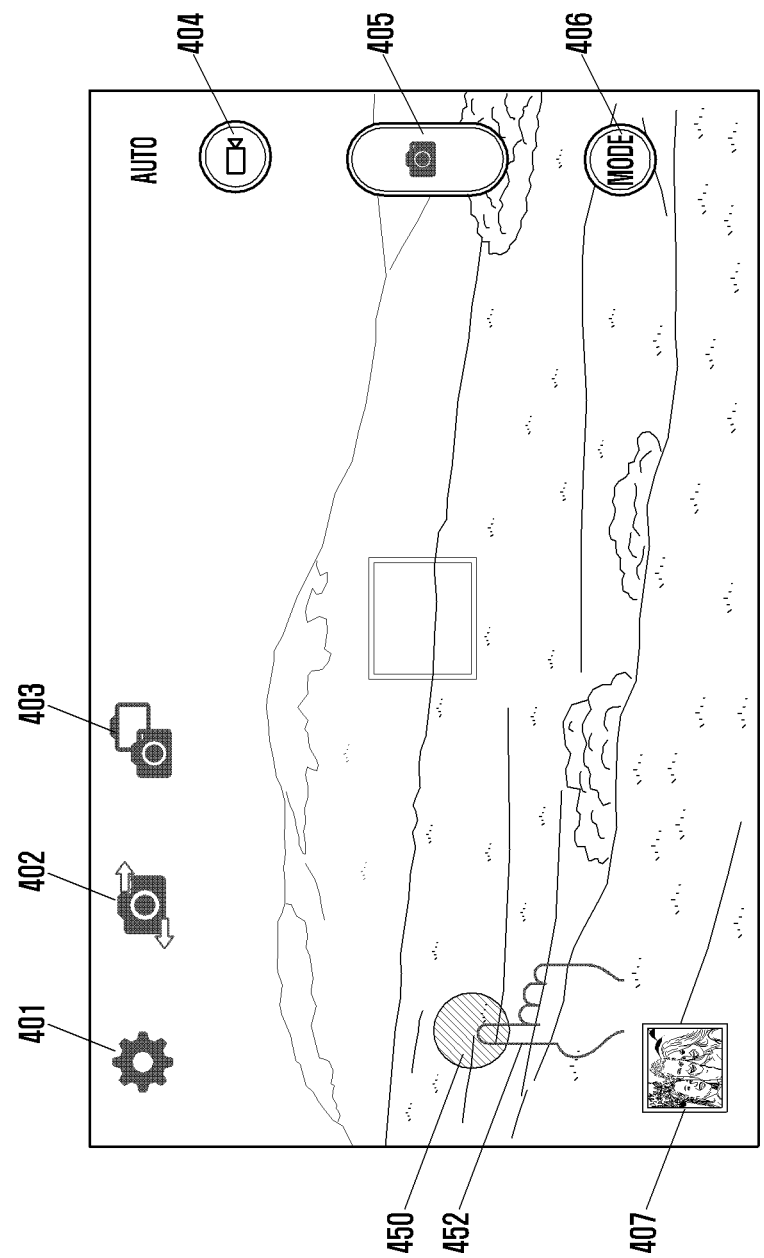
FIGS. 4A, 4B, 4C, 4D, 4E, 4F, 4G, 4H, and 4I illustrate a method of providing a UI by the electronic device according to various embodiments of the present disclosure.

Referring to first FIG. 4A, selectable items 401, 402, 403, 404, 405, 406, and 407 may be sequentially selected by a control UI 450 based on a user input 452. The selection order may be determined based on at least one of locations of the items arranged on the screen and use frequency of the items by the user.

Figure 4B:
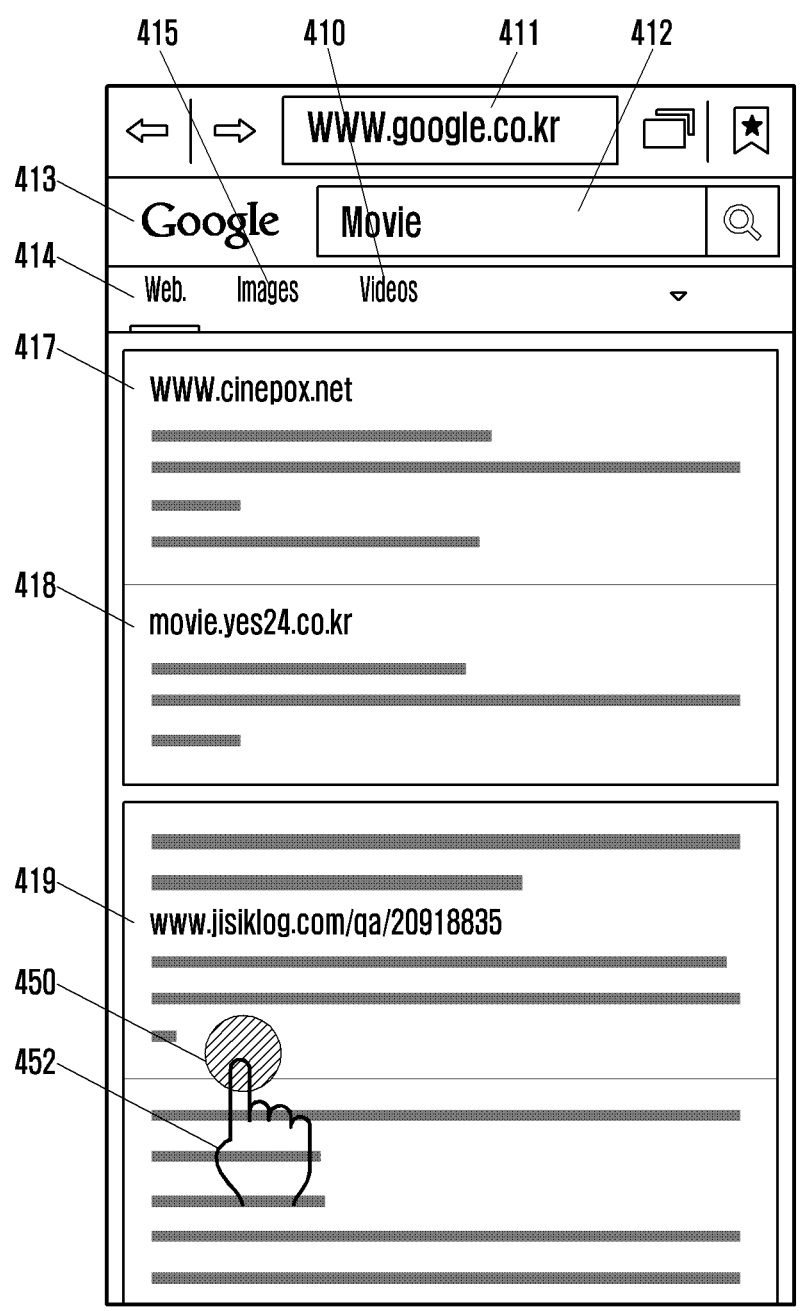

Referring to FIG. 4B, selectable items 410, 411, 412, 413, 414, 415, 416, 417, 418, and 419 may be sequentially selected by the control UI 450 based on the user input 452. The selection order may be determined based on at least one of locations of the items arranged on the screen and use frequency of the items by the user. When items 411 and 412, which allow a separate input, are selected, an input UI for selecting a user input may be additionally displayed and a detailed embodiment thereof will be described below.

Figure 4C:
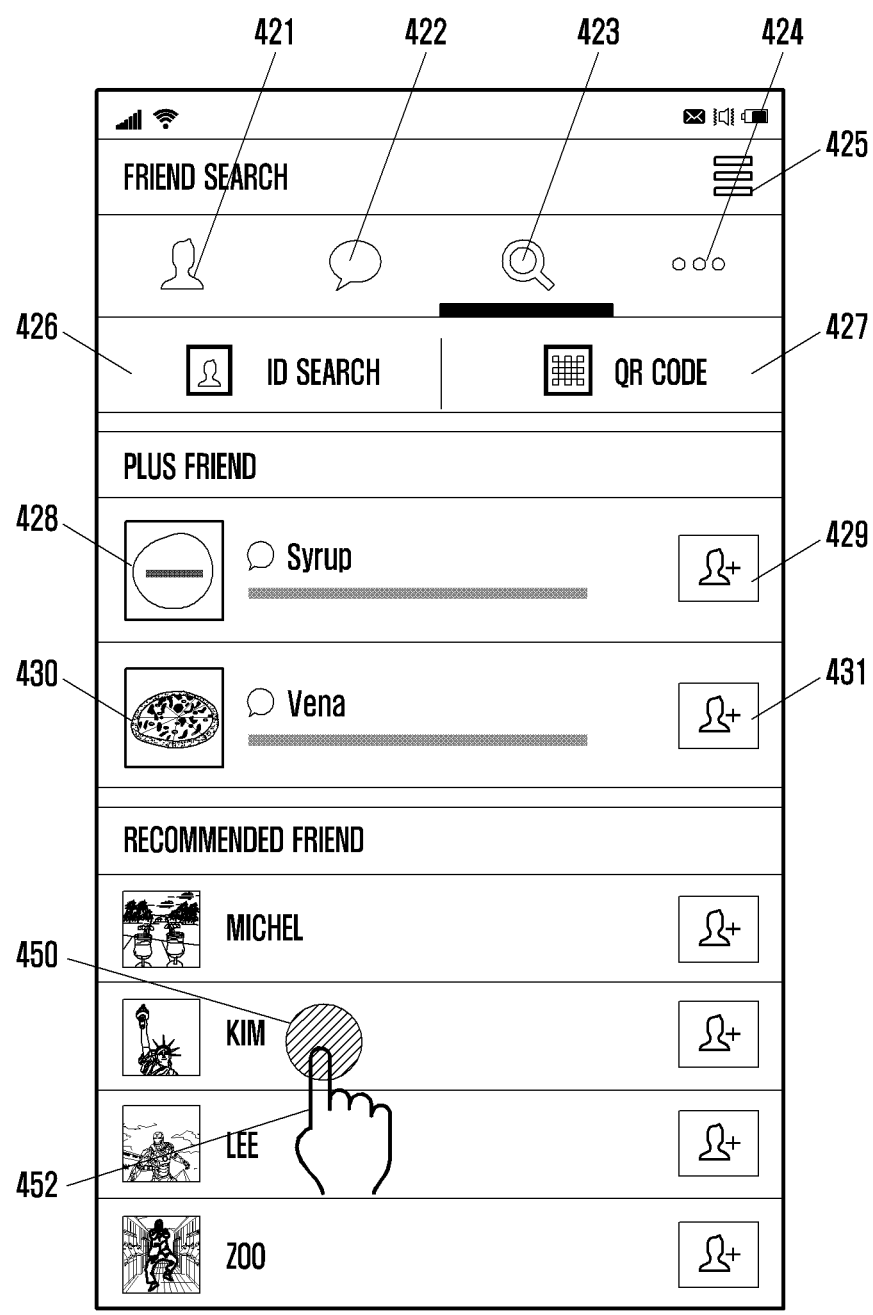

Referring to FIG. 4C, selectable items 421, 422, 423, 424, 425, 426, 427, 428, 429, 430, and 431 may be sequentially selected by the control UI 450 based on the user input 452. The selection order may be determined based on at least one of locations of the items arranged on the screen and use frequency of the items by the user.

Figure 4D:
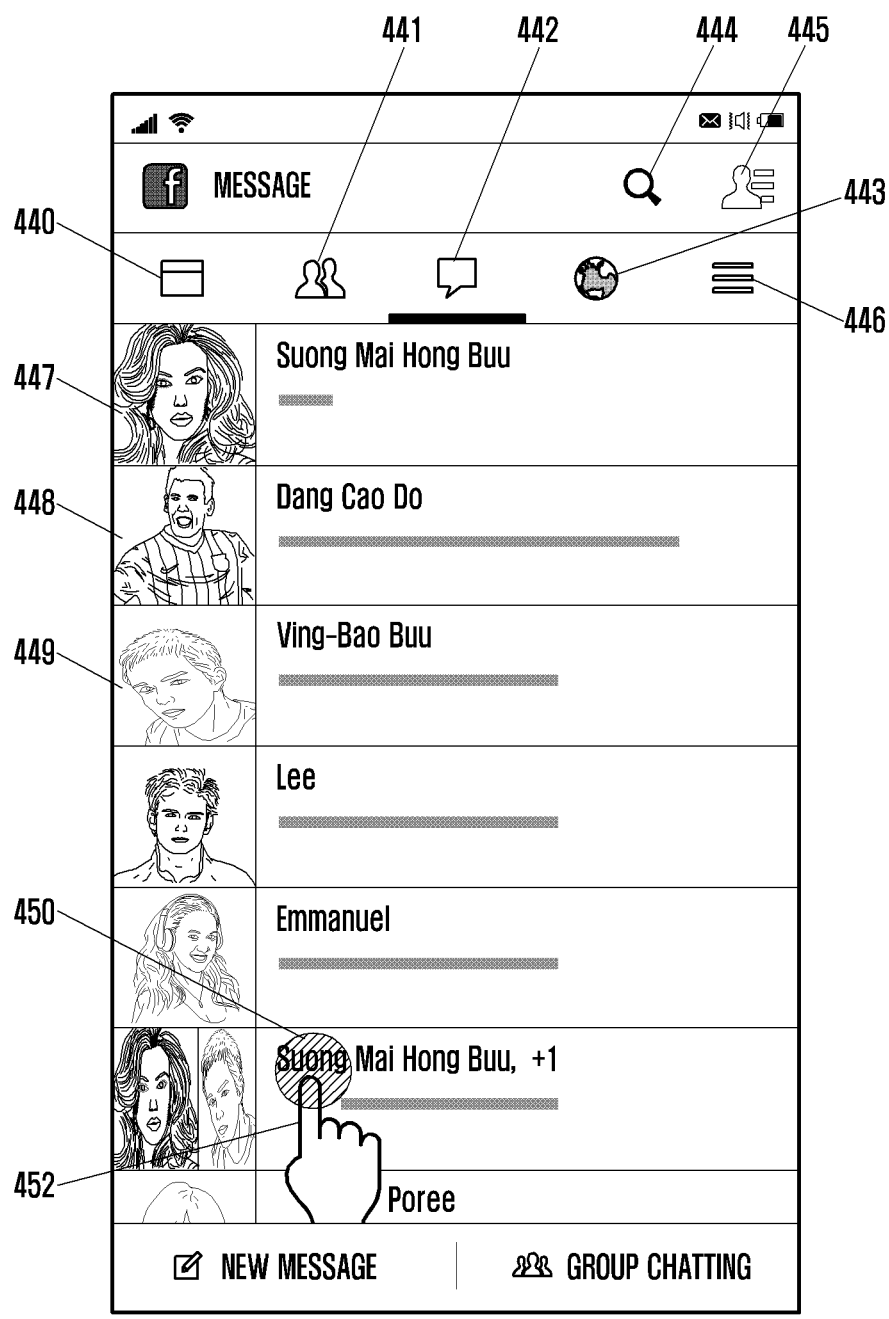

Referring to FIG. 4D, selectable items 440, 441, 442, 443, 444, 445, 446, 447, 448, and 449 may be sequentially selected by the control UI 450 based on the user input 452. The selection order may be determined based on at least one of locations of the items arranged on the screen and use frequency of the items by the user.

Figure 4E:
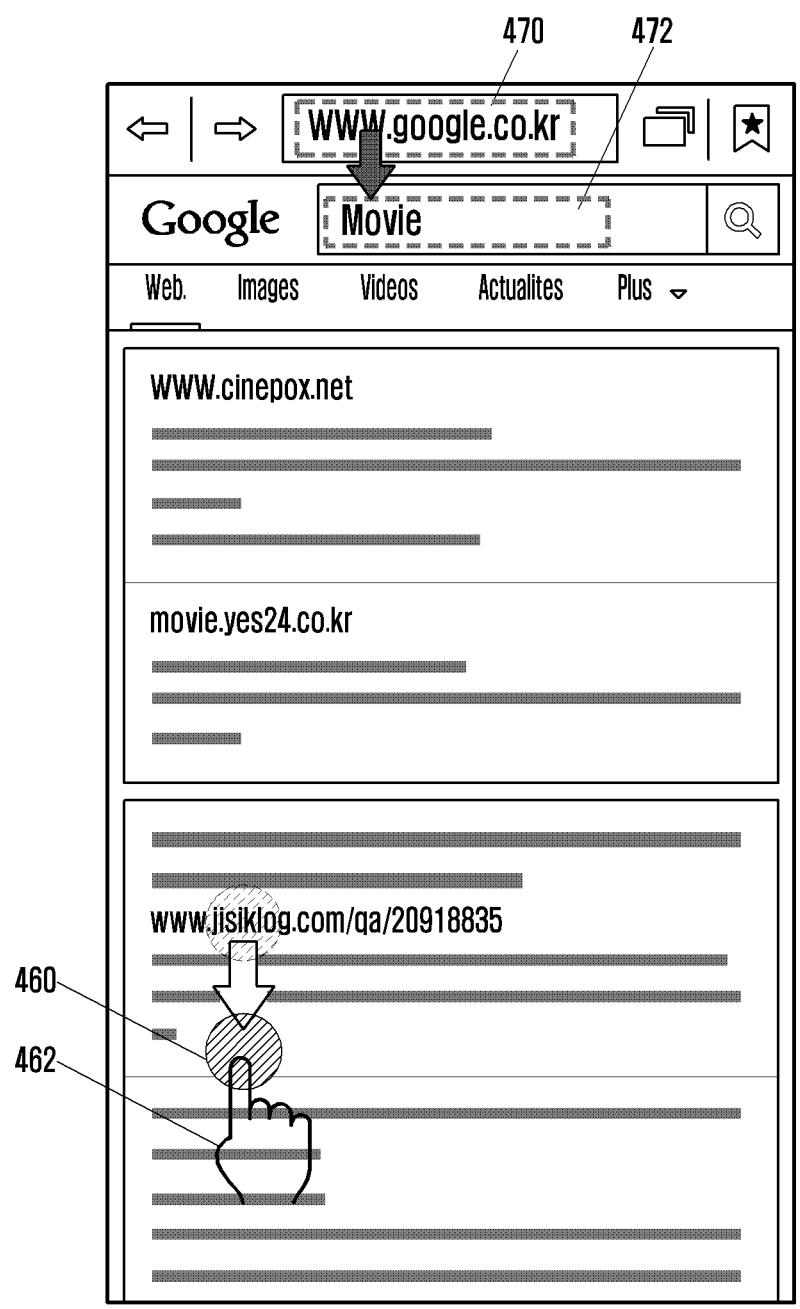

Referring to FIG. 4E, a selected item may be changed based on a user input 462 received via a control UI 460. More specifically, when a first item 470 is selected, if the user input 462 for moving the control UI 460 downwardly is received, a second item 472 located below the first item 470 may be selected. In this case, the selected item may receive a separate input and an input UI corresponding to the input of the item may be displayed.

Figure 4F:
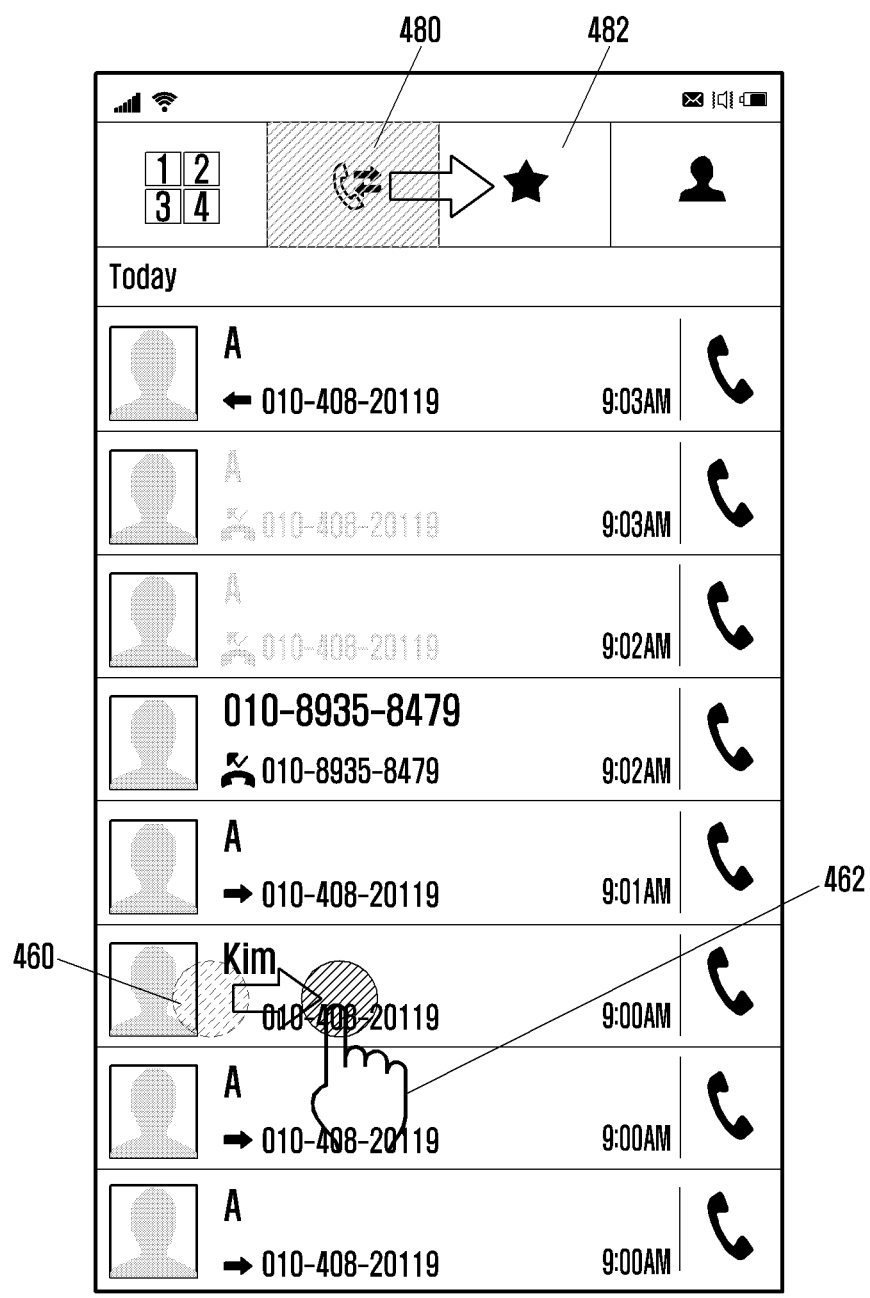

Referring to FIG. 4F, a selected item may be changed based on the user input 462 received via the control UI 460. More specifically, when a first item 480 is selected, if the user input 462 for moving the control UI 460 rightward is received, a second item 482, which is located to the right of the first item 480, may be selected.

Figure 4G:
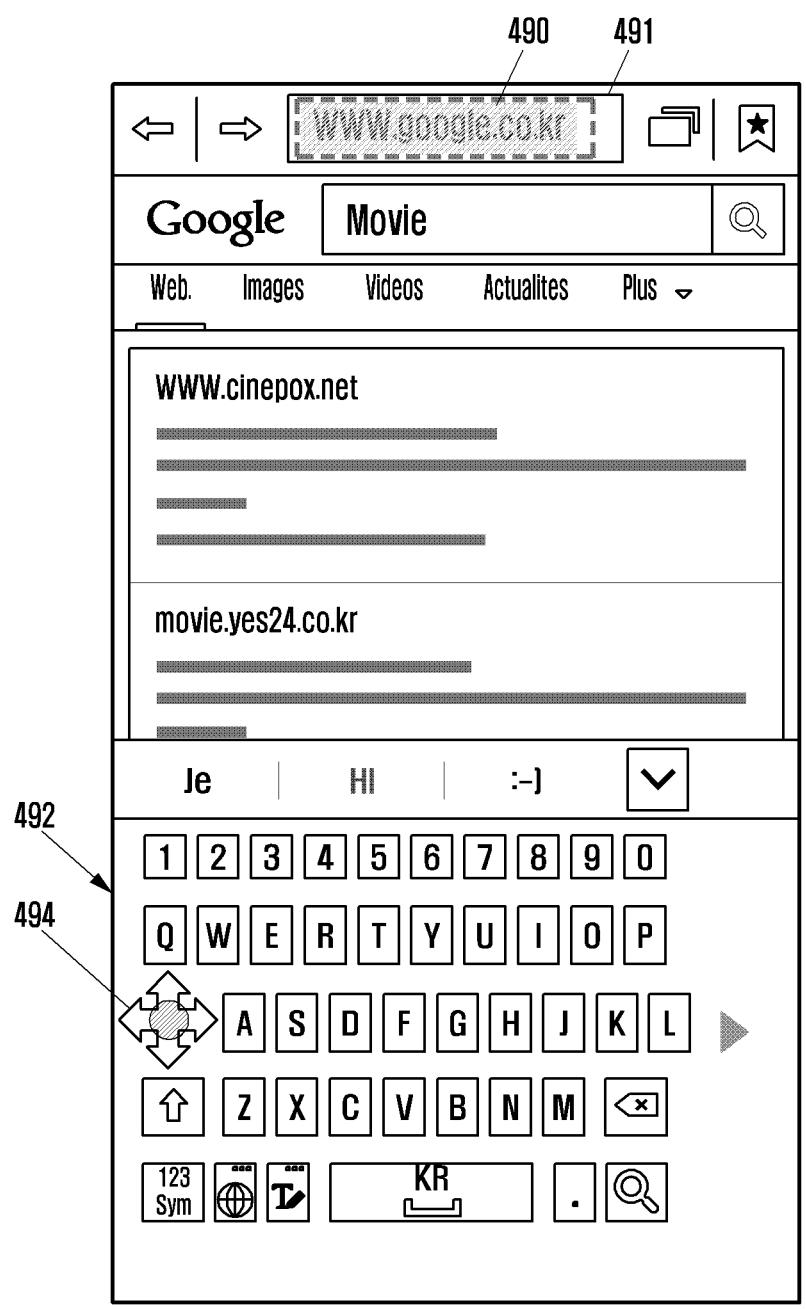
Figure 4H:
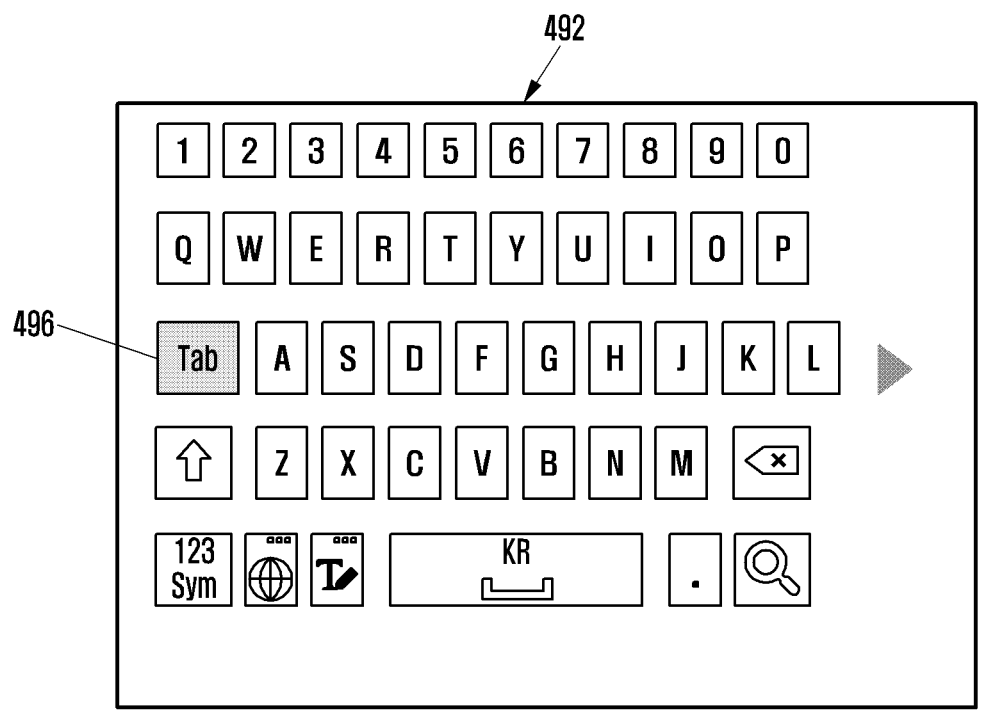
Figure 4I:
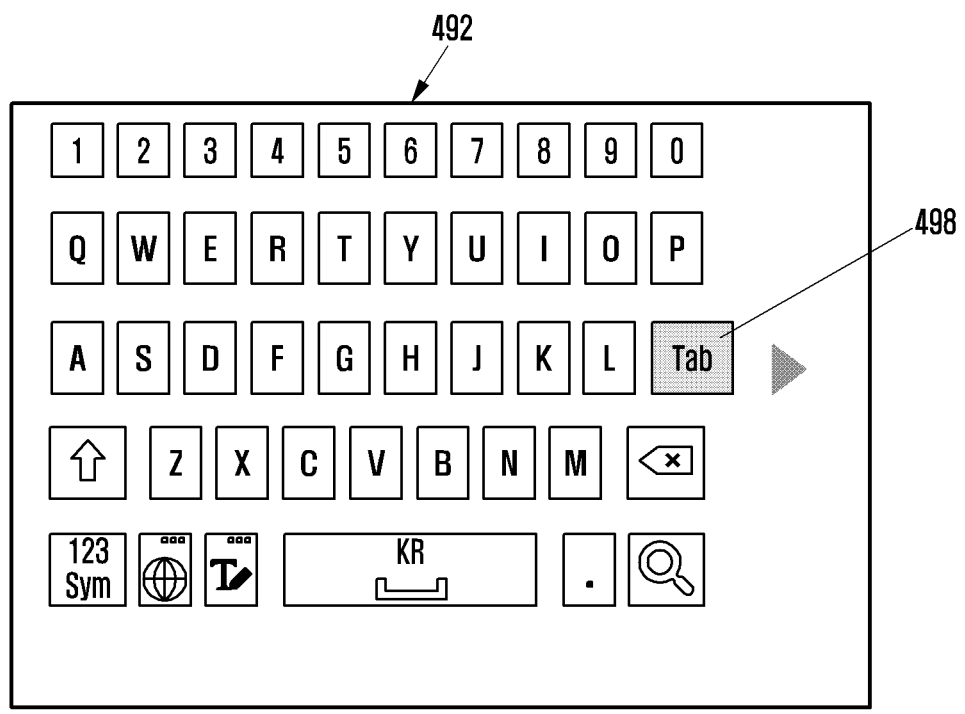

Referring to FIGS. 4G, 4H, and 4I, a focus 491 may be marked as a selected first item 490. When the first item 490 can receive a separate additional input, an input UI 492 for an additional information input may be displayed. A control UI 494 may be displayed in an area of the input UI 492 and an input for selecting another item may be received through the control UI 494. As illustrated in FIGS. 4H and 4I, the control UI may be displayed in place of a tab key 496 or 498, and a location of the tab key 496 or 498 may correspond to a location of an input for displaying the input UI 492.

Figure 5:
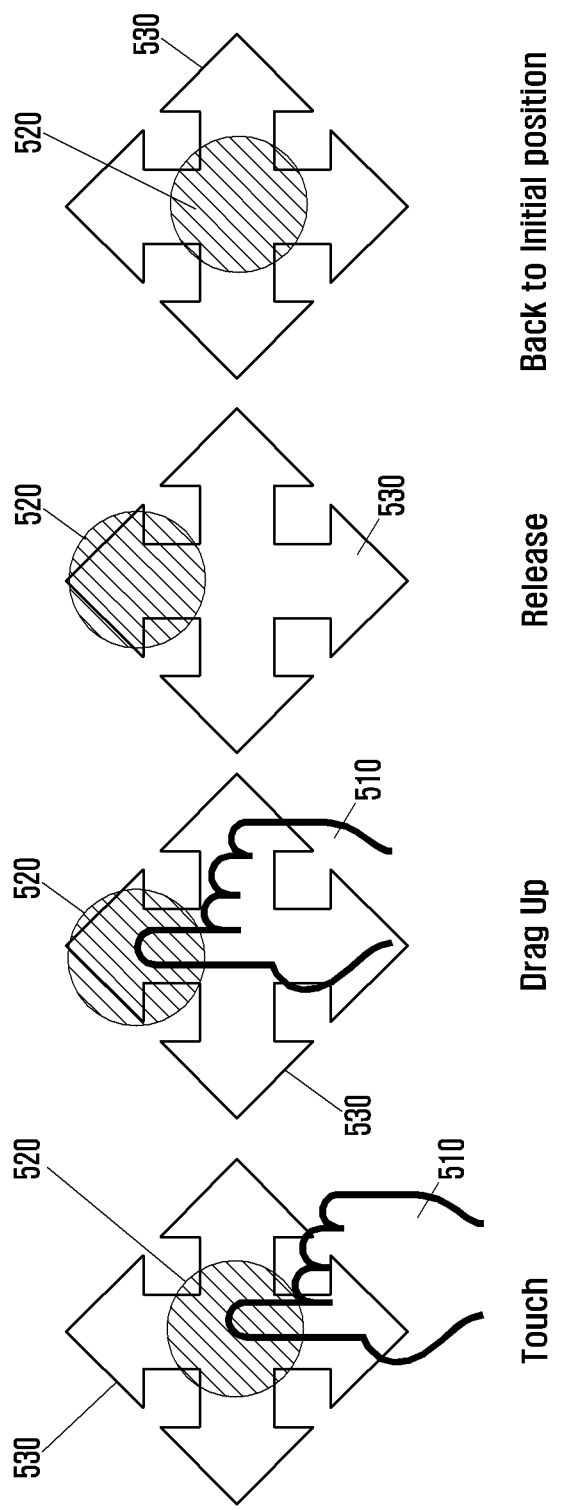
FIG. 5 illustrates a control UI according to an embodiment of the present disclosure.

FIG. 5 illustrates an example of a control UI according to an embodiment of the present disclosure.

Referring to FIG. 5, the control UI may include an input area 520 and a direction display area 530, and some display directions may be omitted according to an embodiment of the present disclosure. When a user touch input 510 is received in the direction display area 530, the user touch input 510 may be identified as a corresponding direction input.

When the input area 520 is touched and dragged, an item corresponding to a drag direction may be selected. When an input for the input area 520 is released, the input area may return to the original area and, accordingly, the focus may be moved or the selected item may be changed. According to an embodiment of the present disclosure, it is apparent that the input direction is not limited by a shape of the direction display area 530 and omnidirectional inputs may be all received.

Figure 6:
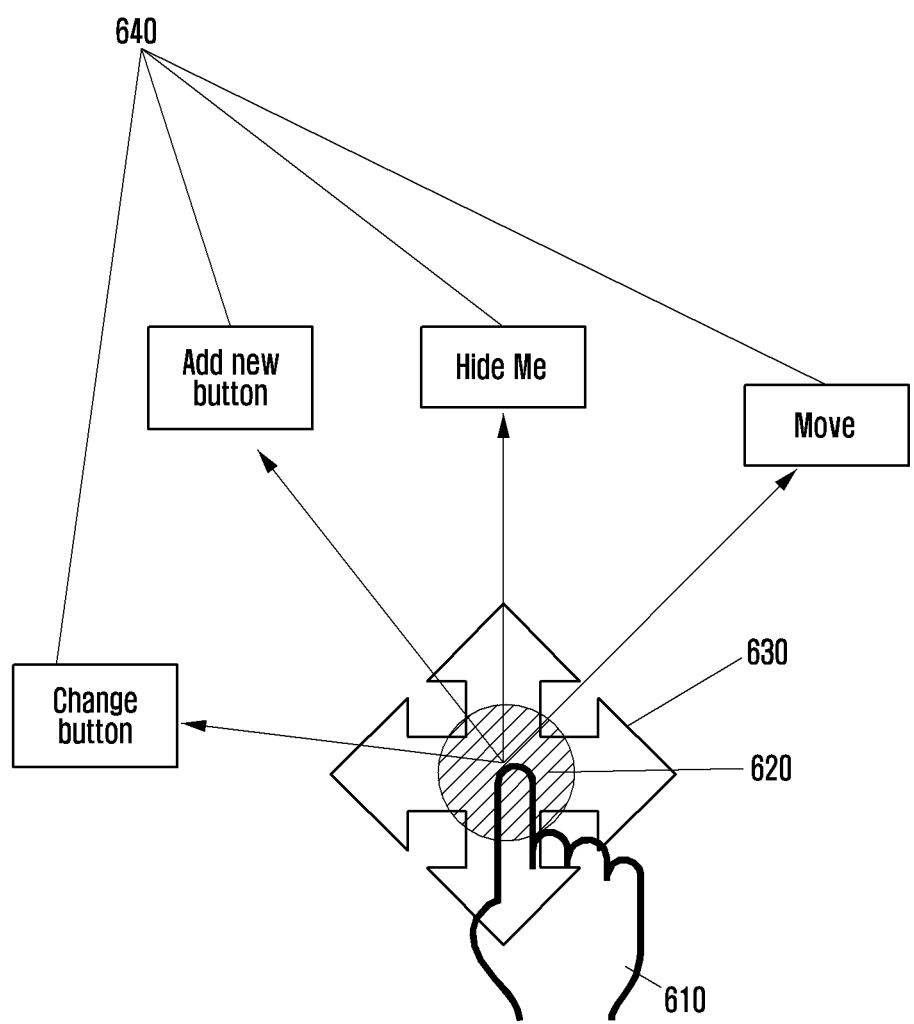
FIG. 6 illustrates an example of a control UI according to an embodiment of the present disclosure.

FIG. 6 illustrates another example of a control UI according to an embodiment of the present disclosure.

Referring to FIG. 6, the control UI may include an input area 620 and a direction display area 630, and some display directions may be omitted according to an embodiment of the present disclosure. When a particular input is received in the input area 620, a menu 640 for performing an operation related to the control UI may be displayed. Further, when an input corresponding to a menu location is additionally received, a corresponding operation may be performed. According to an embodiment of the present disclosure, the particular input may include a hold input received in the input area 620 and at least two tap inputs. Further, the displayed menu 640 may display at least one of a menu for displaying another control UI, a menu for displaying a new control UI, a menu for hiding the control UI, and a menu for moving the control UI. According to an embodiment of the present disclosure, even when the same input is received according to a setting, different selection inputs may be performed and, accordingly, the control UIs may be displayed in forms which can be distinguished by the user. The menu for displaying a new control UI may be used when an additional control UI is displayed as illustrated above with reference to FIG. 3I. According to an embodiment of the present disclosure, when the additional control UI is displayed, a direction in which the control UI is displayed may be changed and an interval between the additional control UIs may be controlled to prevent an incorrect input.

According to an embodiment of the present disclosure, the operation for controlling the control UI may include performing a drag in one direction by a particular distance range and then performing a drag in an opposite direction.

Figure 7:
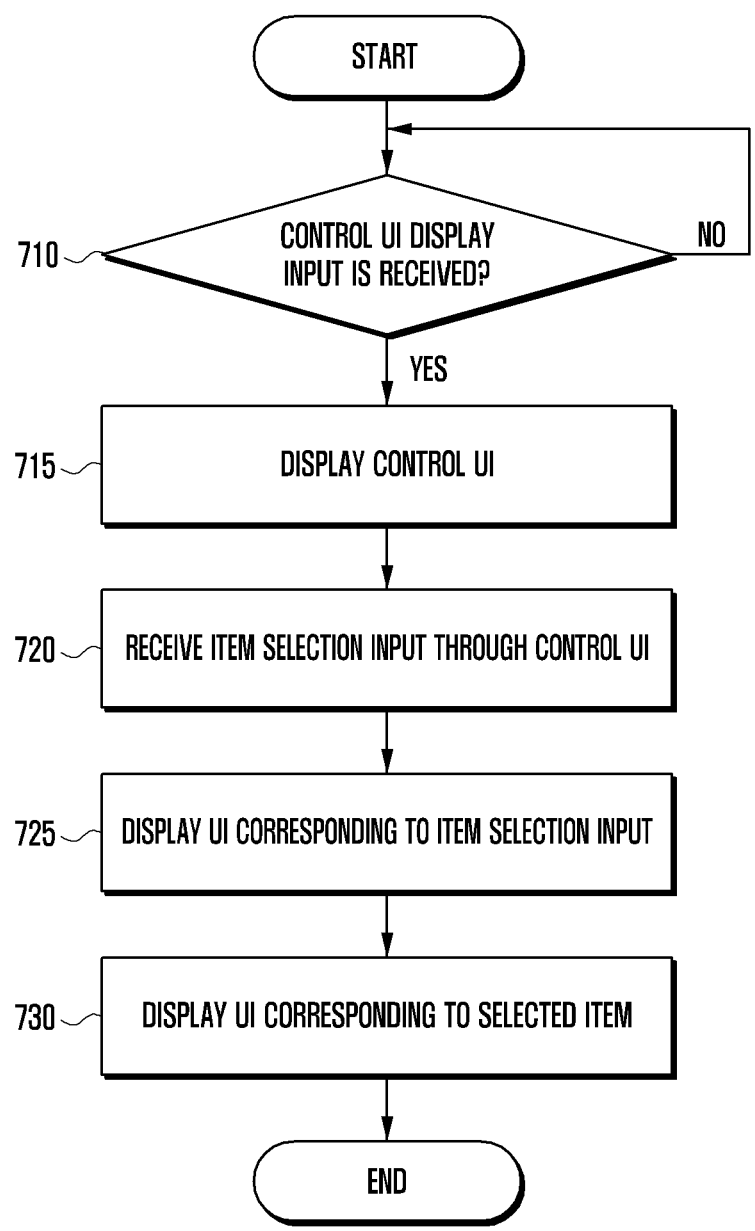
FIG. 7 is a flowchart of a method of providing a UI according to an embodiment of the present disclosure.

FIG. 7 is a flowchart of a method of providing a UI according to an embodiment of the present disclosure.

Referring to FIG. 7, the electronic device according to an embodiment of the present disclosure may perform an operation according to a user input.

In operation 710, the electronic device may determine whether an input for displaying a control UI is received. The input may include a mode selection input according to a particular menu, a touch input applied to the touch screen, and an input applied to the input unit of the electronic device.

When the control UI display input is received, the control UI may be displayed in operation 715. The control UI may include a UI for selecting an item at a location different from the displayed location.

In operation 720, the item selection input may be received through the control UI. The item selection input may include an input received by the control UI or the electronic device.

In operation 725, a UI corresponding to the selection input may be displayed. The UI corresponding to the selection input may vary depending on the type of the selected item. When the selected item requires an additional information input, a key input UI for the information input may be displayed. In a case of the focus movement input, the electronic device may display a focus UI on the selected item.

In operation 730, a UI corresponding to the selected item may be displayed. When the item executes a particular application, the electronic device may display a UI by which the corresponding application is executed. When the item corresponds to an item for performing a particular function, the electronic device may perform the corresponding function.

Figure 8:
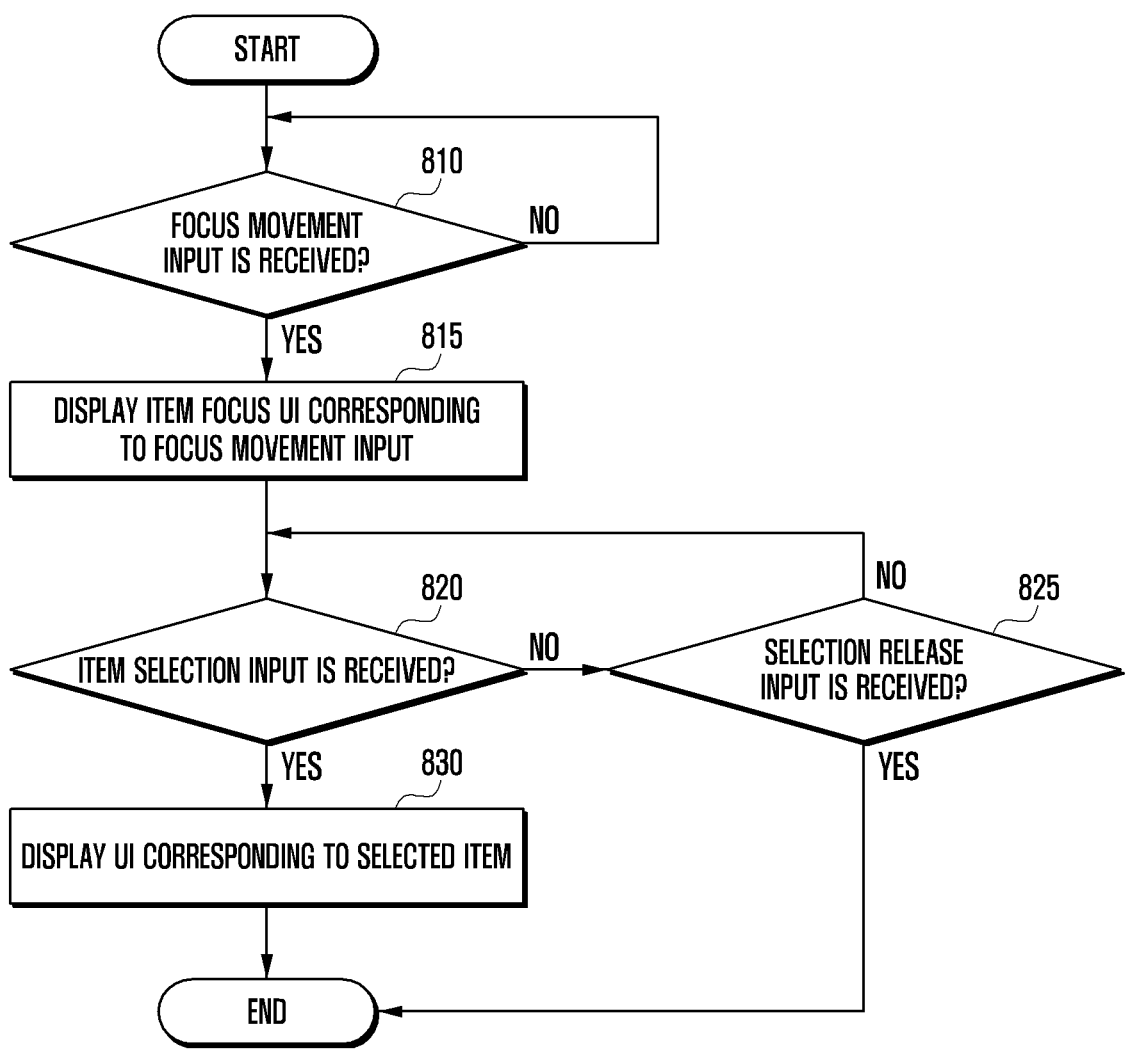
FIG. 8 is a flowchart of a method of providing a UI according to an embodiment of the present disclosure.

FIG. 8 is a flowchart of a method of providing a UI according to an embodiment of the present disclosure.

Referring to FIG. 8, the electronic device may display at least one item and receive an input for selecting an item. When a mode related to item selection is initiated, a focus UI may be displayed on one of the selectable items and the item on which the focus UI is displayed may be selected through a separate selection input.

More specifically, in a state where the focus UI is located on a particular item, it may be determined whether a focus movement input is received in operation 810. The focus movement input may include at least one of a touch input, a tap input, a press input, and a hold input received by the touch screen or the input unit.

In operation 815, the electronic device may display a focus UI corresponding to the focus movement input. More specifically, an item to which the focus is moved according to the focus movement input may be determined and the focus UI may be displayed at a location corresponding to the determined item. The focus UI indicates that the focus is located on the item and may include providing a UI for drawing dotted lines around the item, generating a particular area to surround the item, or changing a shape or color of the item. According to an embodiment of the present disclosure, the focus may be sequentially moved between one or more selectable items according to the focus movement input, and the focus may be moved to an item located in a particular direction. Further, by displaying the focus UI at a location corresponding to the item to which the focus has moved, the user may easily determine the item on which the focus is located.

In operation 820, the electronic device may determine whether an item selection input is received. The item selection input may include at least one of a touch input, a tap input, a press input, and a hold input received by at least one of the input unit and the touch screen of the electronic device. According to the selection input, the item on which the focus is located may be selected.

When the selection input is not received, the electronic device may determine whether a selection release input is received in operation 825. The selection release input may include at least one of a touch input and a release input of other areas except for the control UI. When the release input is received, the electronic device may remove the displayed focus UI and wait for receiving the mode selection input or the focus movement input again.

When the selection input is received, the electronic device may display a UI corresponding to the selected item in operation 830. When the selected item is an item for an additional information input, the electronic device may display an input UI for the information input. When the selected item is an item for performing a particular function, the electronic device may display a UI related to the particular function.

Figure 9:
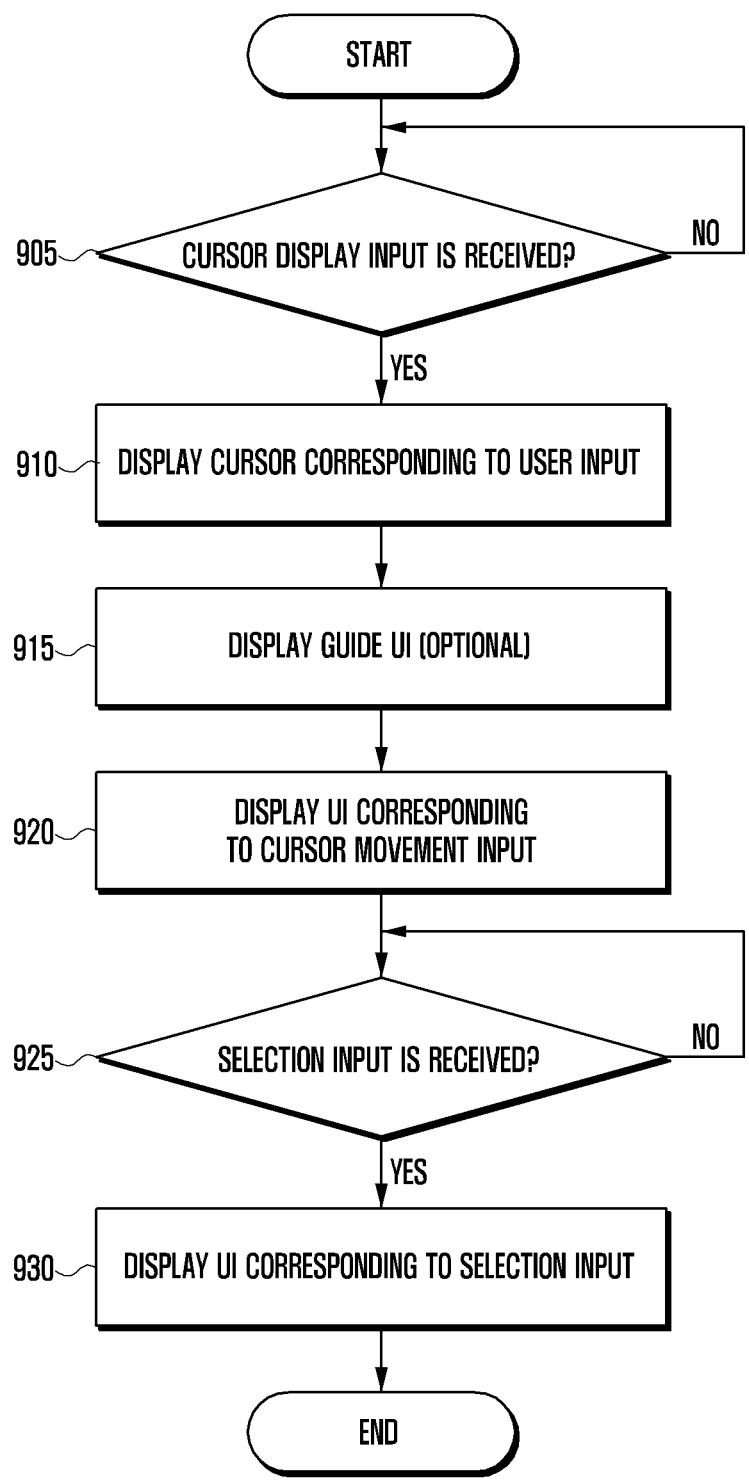
FIG. 9 is a flowchart of a method of providing a UI according to an embodiment of the present disclosure.

FIG. 9 is a flowchart of a method of providing a UI according to an embodiment of the present disclosure.

Referring to FIG. 9, a method of providing a UI according to an embodiment of the present disclosure may be applied to the embodiment of FIG. 3F according to the present disclosure and also applied to other embodiments.

In operation 905, the electronic device may determine whether a cursor display input is received. More specifically, the cursor display input may include at least one of a touch input, a tap input, a press input, and a hold input received by at least one of the touch screen and the input unit. Further, the cursor display input may include a hold input received with a predetermined time after at least one tap input is received by the touch screen.

In operation 910, a cursor UI corresponding to the input may be displayed. A location of the displayed cursor UI may vary depending on a user's setting. The cursor UI may be displayed at a location corresponding to the center of the screen or a location corresponding to a particular item, and the displayed cursor may move in response to a user input.

In operation 915, a guide UI may be displayed. The guide UI may be displayed near an area where the user input is received and display an image reduced from an image displayed on the display unit. When the user input is made on the guide UI, the cursor may move to a corresponding location. The guide UI may be selectively displayed. When the guide UI is not displayed, the cursor may move in response to the user input.

In operation 920, the electronic device may display a UI according to a cursor movement input. The cursor movement input may include a drag input and move the cursor according to the drag input. According to an embodiment of the present disclosure, the cursor may move in proportion to a movement distance of the drag. More specifically, the cursor may move farther than the drag input in inverse proportion to the percentage of the guide UI of the entire screen. When the moved cursor is located over a selectable item, a UI showing that the focus is located on the item may be displayed.

In operation 925, the electronic device may determine whether a selection input is received. When the selection input is not received, a UI corresponding to the cursor movement input may be displayed.

When the selection input is received, the user terminal may display a UI corresponding to the selection input in operation 930. According to an embodiment of the present disclosure, the selection input may include at least one of a touch input, a tap input, a press input, and a hold input received by at least one of the touch screen and the input unit. The UI corresponding to the selection input may include a UI including a keypad for an information input and a UI related to an operation corresponding to the selected item.

Figure 10:
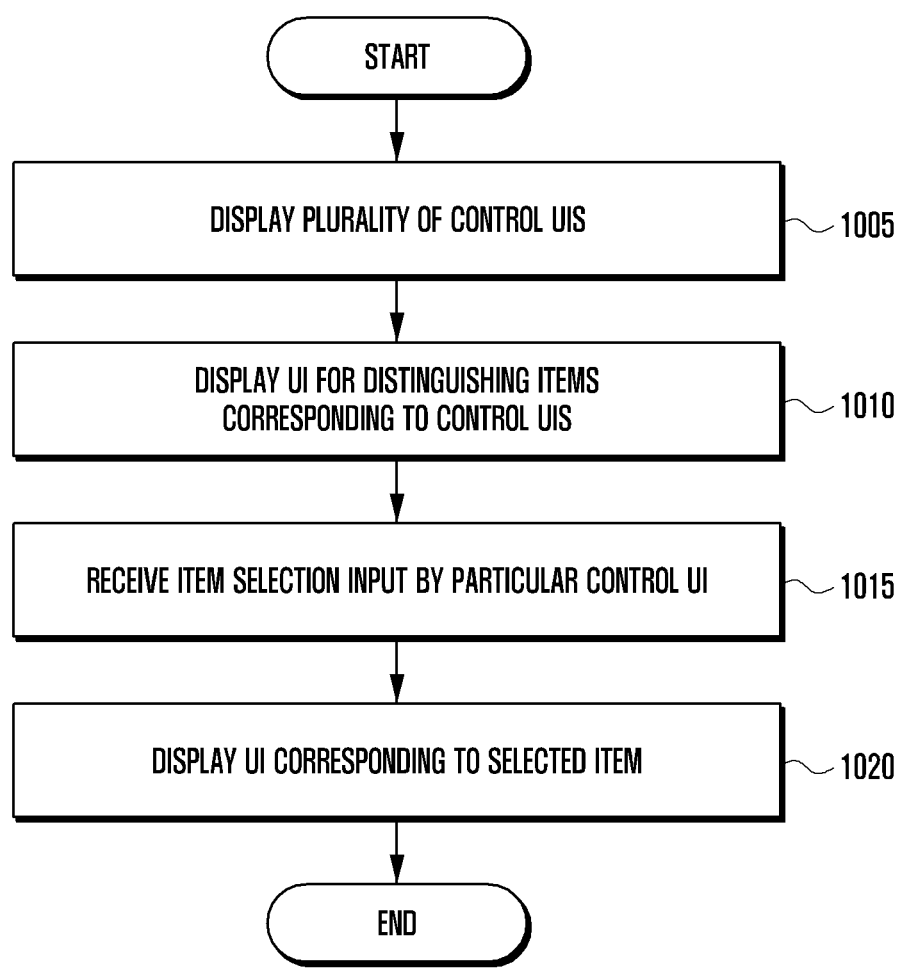
FIG. 10 is a flowchart of a method of providing a UI according to an embodiment of the present disclosure.

FIG. 10 is a flowchart of a method of providing a UI according to an embodiment of the present disclosure.

Referring to FIG. 10, a plurality of control UIs may be displayed as illustrated above with reference to FIG. 3I.

In operation 1005, the electronic device may display a plurality of control UIs. According to an embodiment of the present disclosure, the number of control UIs may be determined according to at least one of the item type, item arrangement, and a user's setting.

In operation 1010, the UIs may be displayed while items corresponding to respective control UIs are distinguished by different display characteristics. More specifically, when selectable items are distinguished according to a color, the colors of the control UIs may be different. Further, colors corresponding to respective control UIs may be overlappingly displayed in an area where items corresponding to the respective control UIs are displayed.

In operation 1015, through a particular control UI, an item selection input corresponding to the corresponding control UI may be received. The item selection input may include at least one of a touch input, a tap input, a press input, and a hold input received by at least one of the touch screen and the input unit.

In operation 1020, a UI corresponding to the selected item may be displayed. The UI corresponding to the selection input may include a UI including a keypad for an information input and a UI related to an operation corresponding to the selected item.

Figure 11:
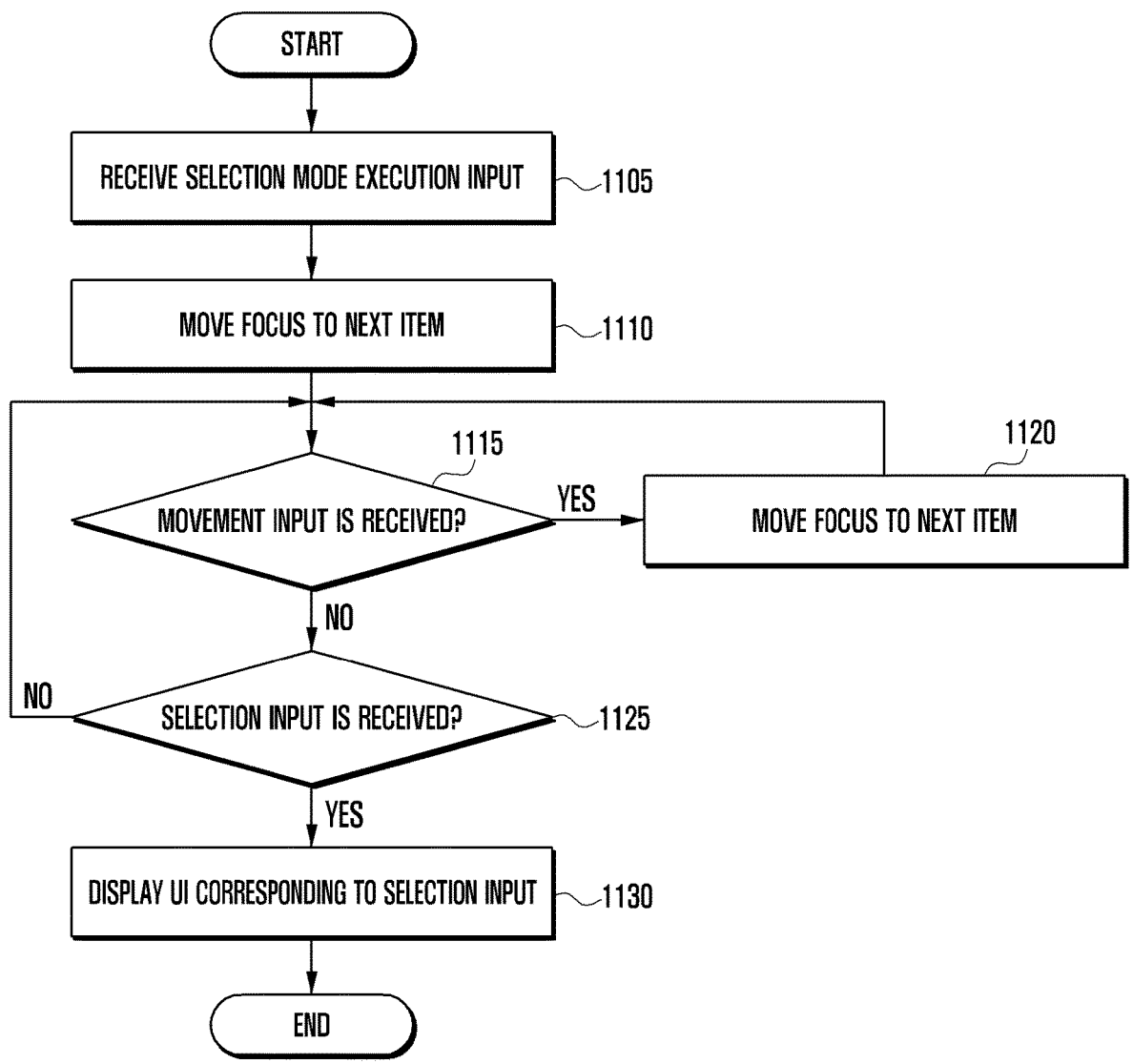
FIG. 11 is a flowchart of a method of providing a UI according to an embodiment of the present disclosure.

FIG. 11 is a flowchart of a method of providing a UI according to an embodiment of the present disclosure.

Referring to FIG. 11, a method of providing a UI may include at least one of the following operations.

In operation 1105, an input related to execution of a selection mode may be received. The selection mode may include a mode in which the user can select selectable items. More specifically, a user input is received at a location other than a location of the item displayed on the display unit and, accordingly, a mode for selecting to the corresponding item may be included. The selection mode may include a mode for a one hand control mode. The input related to the execution of the selection mode may execute the corresponding mode according to a menu selection input by the user. Further, the item selection input may include at least one of a touch input, a tap input, a press input, and a hold input received by at least one of the touch screen and the input unit.

In operation 1110, the electronic device may display a UI according to the execution of the selection mode. More specifically, the electronic device may display at least one of a control UI for receiving an input related to a selection mode operation, a focus UI indicating that the focus is located on a particular item, and a keyboard UI for an additional information input.

In operation 1115, the electronic device may determine whether a focus movement input is received. More specifically, the focus movement input may include one of a touch input, a tap input, a press input, a drag input, and a hold input received through at least one of the control UI and the input unit.

When the focus movement input is received, the electronic device may move the focus to a next item in response to the movement input in operation 1120. More specifically, the electronic device may sequentially move the focus to a next ordered item according to the tap input or move the focus to an item located in a corresponding direction according to the drag input.

When the movement input is not received, the electronic device may determine whether a selection input is received in operation 1125. The selection input may include one of a touch input, a tap input, a press input, a drag input, and a hold input received through at least one of the control UI and the input unit. When the selection input is not received, the electronic device may move to operation 1115.

When the selection input is received, the electronic device may display a UI corresponding to the selection input in operation 1130. The UI corresponding to the selection input may vary depending on the type of the selected item. When the selected item requires an additional information input, a key input UI for the information input may be displayed. In a case of the focus movement input, the electronic device may display a focus UI on the selected item.

FIGS. 12A, 12B, 12C, 12D, 12E, 12F, 12G, 12H, and 12I illustrate a method of providing a UI according to various embodiments of the present disclosure.

Referring to FIGS. 12A, 12B, 12C, 12D, 12E, 12F, 12G, 12H, and 12I, one or more items 1202, 1204, and 1206 may be displayed on a display unit 1200. The displayed items are examples for description of the embodiment of the present disclosure. Even when the items are not displayed, an operation corresponding to the embodiment of the present disclosure may be performed.

Figure 12A:
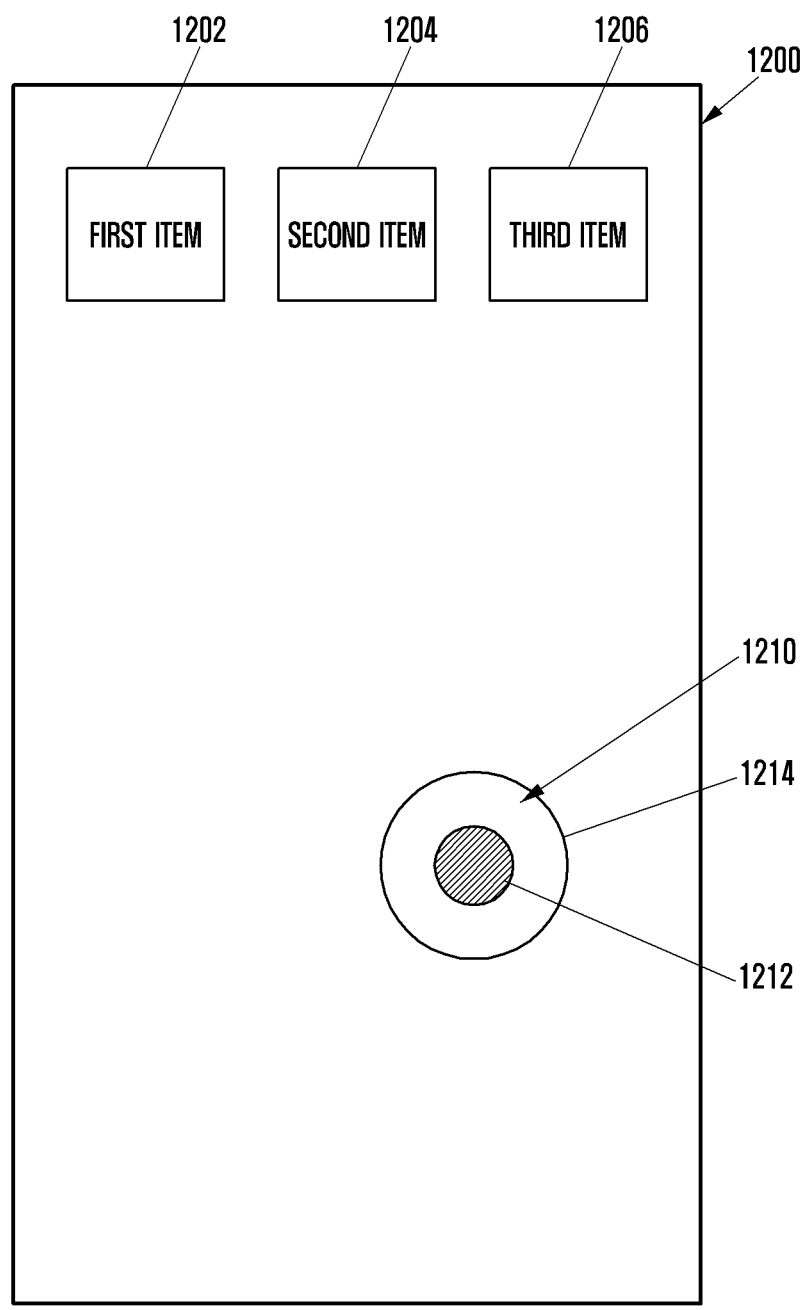
FIGS. 12A, 12B, 12C, 12D, 12E, 12F, 12G, 12H, and 12I illustrate a method of providing a UI according to various embodiments of the present disclosure.

Referring to FIG. 12A, a control UI 1210 may be displayed at a predetermined location of the display unit 1200. More specifically, the control UI 1210 may include a first UI 1212 and a second UI 1214. The first UI 1212 may indicate a reference location where a user input is received and may be moved according to a user input. The second UI 1214 may indicate a relative location according to a movement of the first UI 1212. More specifically, although the first UI 1212 moves according to a user input, the second UI 1214 may be fixed. According to an embodiment of the present disclosure, although it is described that the control UI 1210 includes the first UI 1212 and the second UI 1214, it is apparent that a similar implementation may be performed when the control UI 1210 includes only the first UI 1212.

Further, the control UI 1210 may be displayed for a preset time in a state where the display unit 1200 of the terminal is turned on. When an input corresponding to the control UI 1210 is received within the preset time, the control UI 1210 may be continuously displayed. More specifically, when the control UI 1210 is displayed for 5 seconds in the state where the display unit 1200 is turned on and the input corresponding to the control UI 1210 is received within 5 seconds, the electronic device may continuously display the control UI 1210. Otherwise, the electronic device may not display the control UI 1210. The input corresponding to the control UI 1210 may include a touch input corresponding to an area where the control UI 1210 is displayed. As described above, the control UI 1210 may be always displayed according to the user input.

Figure 12B:
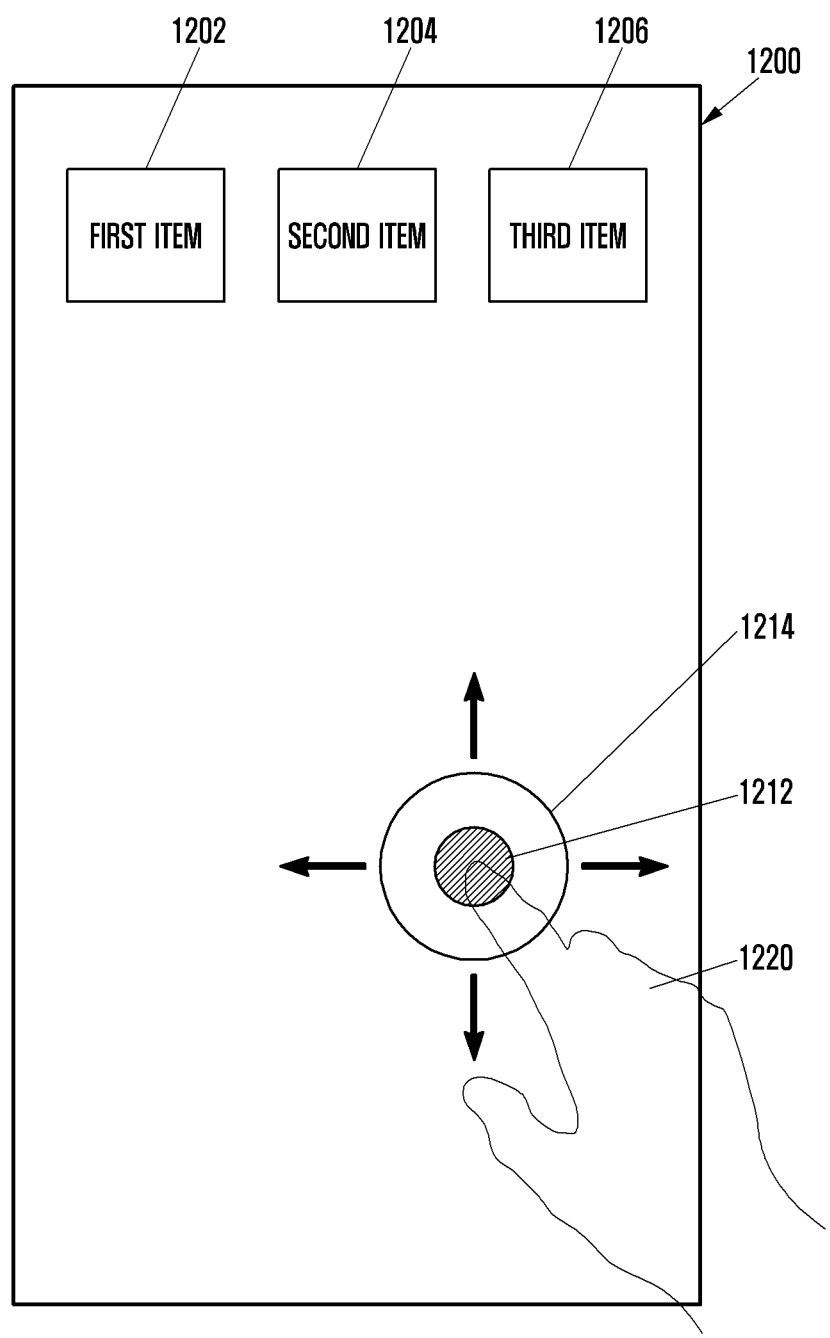

Referring to FIG. 12B, a user input 1220 may be received by the control UI 1210. More specifically, the user input 1220 may be received by the first UI 1212, and the corresponding terminal may perform a corresponding function based on an input of moving the first UI 1212 in a particular direction. More specifically, when the user makes an input of moving the first UI 1212 to the outside of the second UI 1214 by dragging the first UI 1212 while touching the first UI 1212, a corresponding function may be performed based on a direction of the drag. More specifically, the function corresponding to the drag direction may be preset, and the function may include at least one of an operation of displaying a cursor for item selection, an operation corresponding to a home key, an operation of returning to a previous operation, and an operation of returning to a next operation. Further, the function may correspond to at least one of functions input through other input means of the terminal, which may vary depending on a user's setting.

Figure 12C:
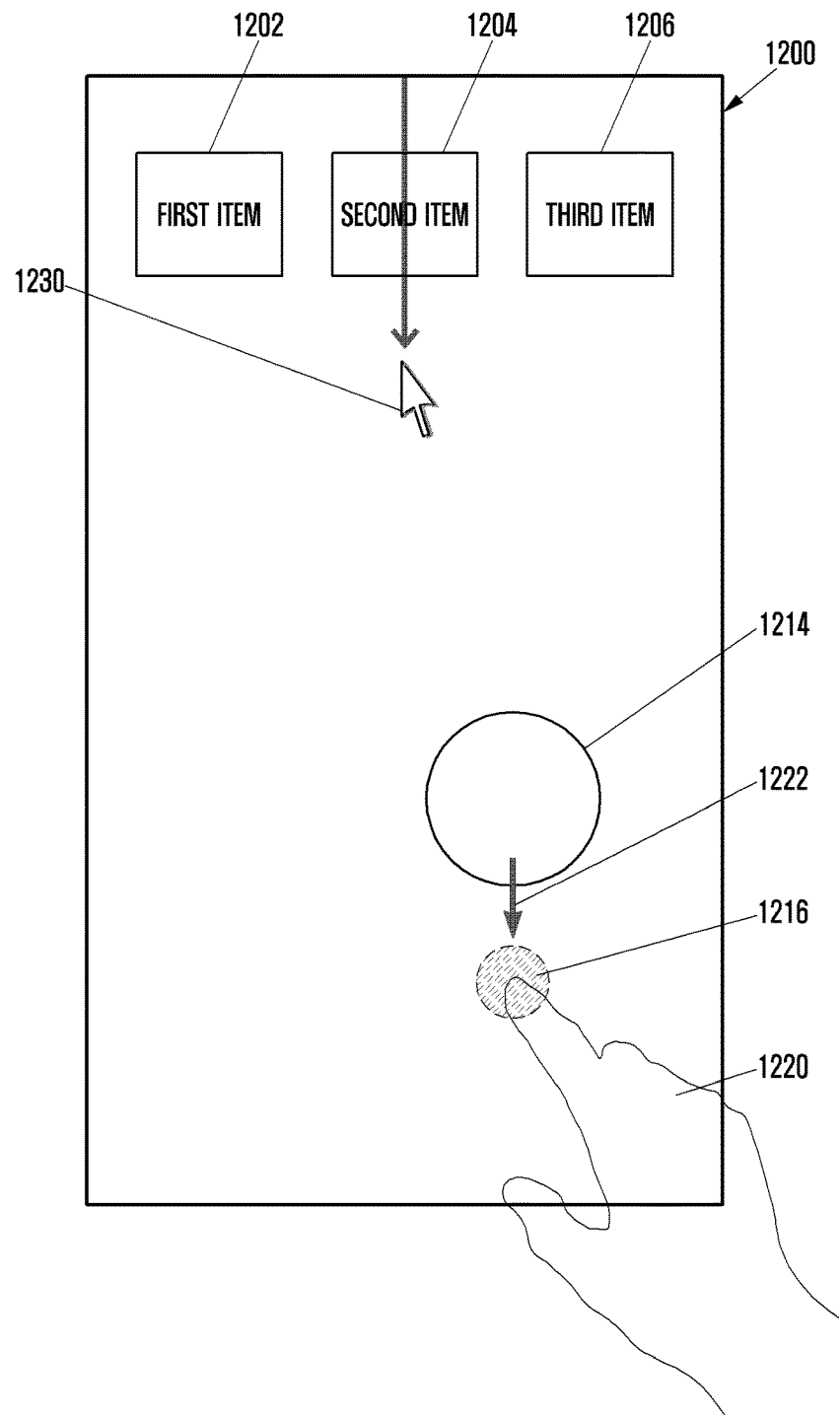

Referring to FIG. 12C, when a downward drag 1222 of the first UI is performed through the user input 1220, a cursor 1230 corresponding to the drag 1222 may be displayed. The drag direction may be variously changed, and a location where the cursor 1230 first appears may be differently applied according to an embodiment. The cursor 1230 may be displayed from the uppermost side of the display unit 1200 in response to the downward drag 1222, and may be moved and displayed according to the additionally made user input 1220. The first UI may be displayed in the form of a dotted line as indicated by reference numeral 1216 or may not be displayed. The second UI 1214 may be displayed even when an additional user input is made. The cursor 1230 may move in accordance with a movement direction of the first UI 1216 and, more specifically, move in proportion to a movement distance of the first UI.

Figure 12D:
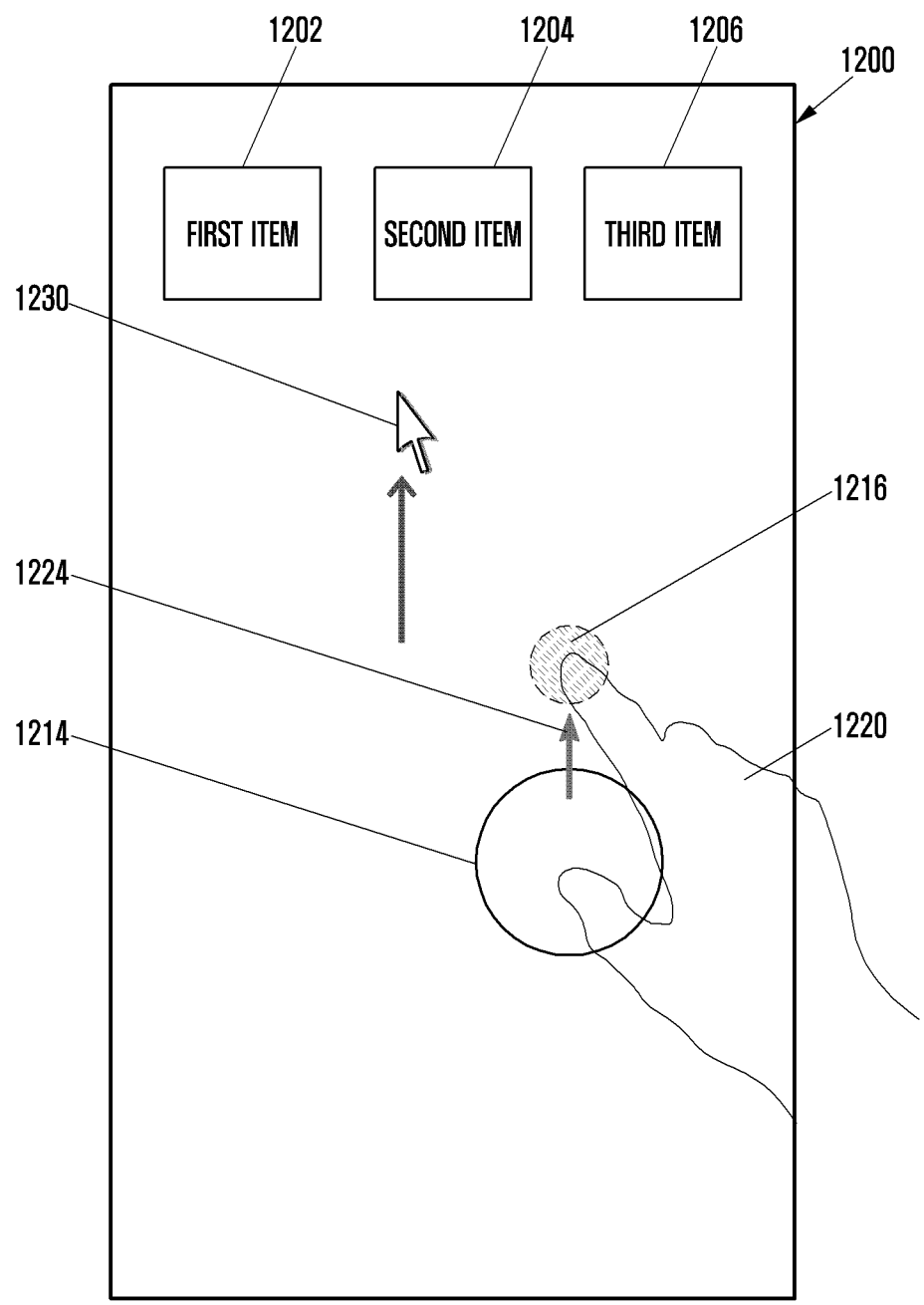

Referring to FIG. 12D, when an upward drag 1224 of the first UI is performed through the user input 1220, the cursor 1230 corresponding to the drag 1224 may be displayed. The drag direction may be variously changed, and a location where the cursor 1230 first appears may be differently applied according to an embodiment. The cursor 1230 may be displayed at the center of the display unit 1200 in response to the upward drag 1224, and may be moved and displayed according to the additionally made user input 1220. A location where the cursor first appears may be variously determined, but it is apparent that the cursor may appear at different initial locations or the same location according to the drag direction. The first UI may be displayed in the form of a dotted line as indicated by reference numeral 1216 or may not be displayed. The second UI 1214 may be displayed even when an additional user input is made. The cursor 1230 may move in accordance with a movement direction of the first UI 1216 and, more specifically, move in proportion to a movement distance of the first UI.

Figure 12E:
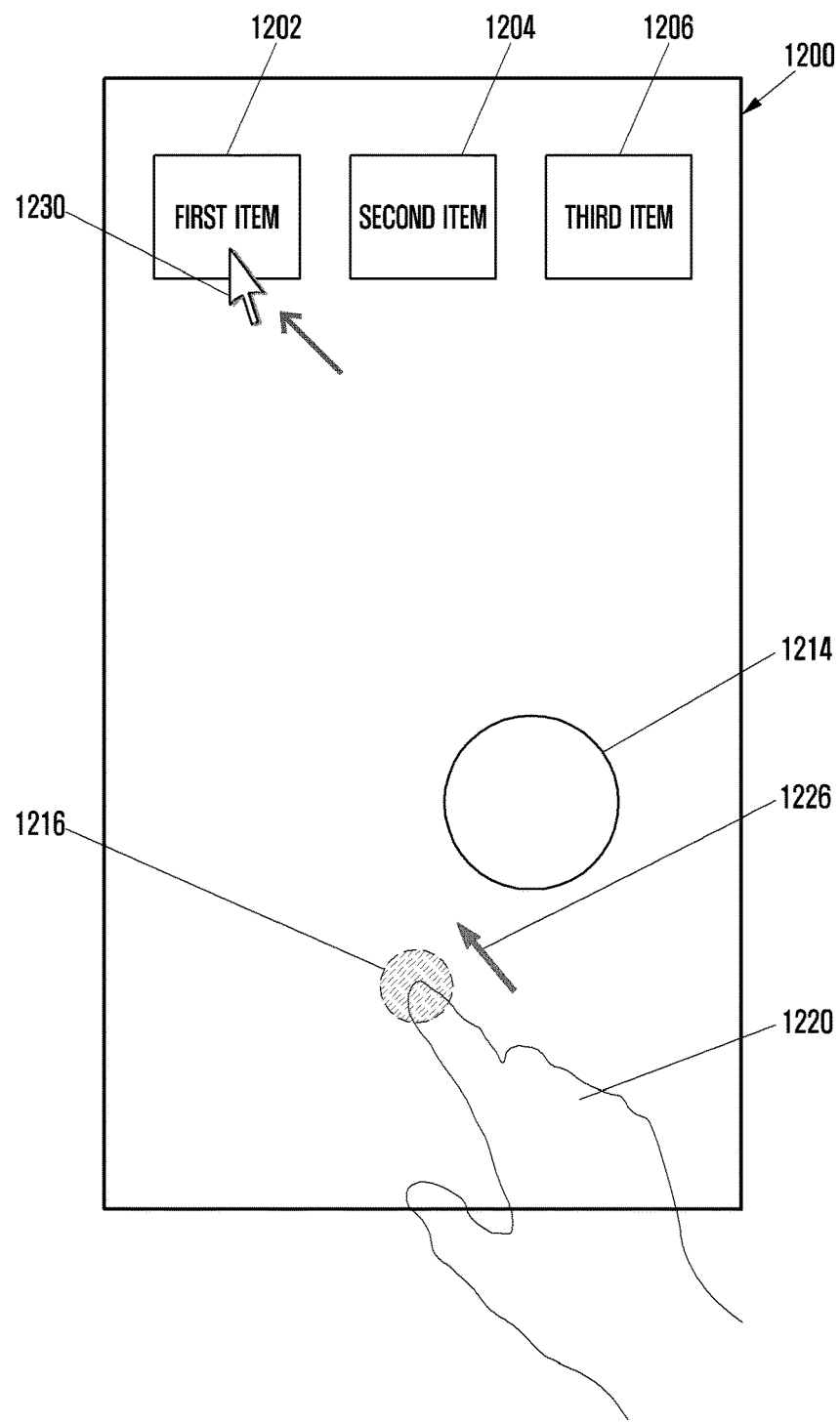

Referring to FIG. 12E, when the cursor 1230 is displayed, the cursor 1230 may move according to the user input 1220. More specifically, when a drag 1226 of the first UI 1216 is performed in a particular direction while the cursor is displayed, the cursor 1230 may move in response to the drag 1226. According to an embodiment of the present disclosure, a movement direction of the cursor 1230 may be determined according to the direction of the drag 1226, and a movement distance of the cursor 1230 may be determined based on a distance of the drag 1226. More specifically, in proportion to the distance of the drag 1226, the movement distance of the cursor 1230 may be determined.

Figure 12F:
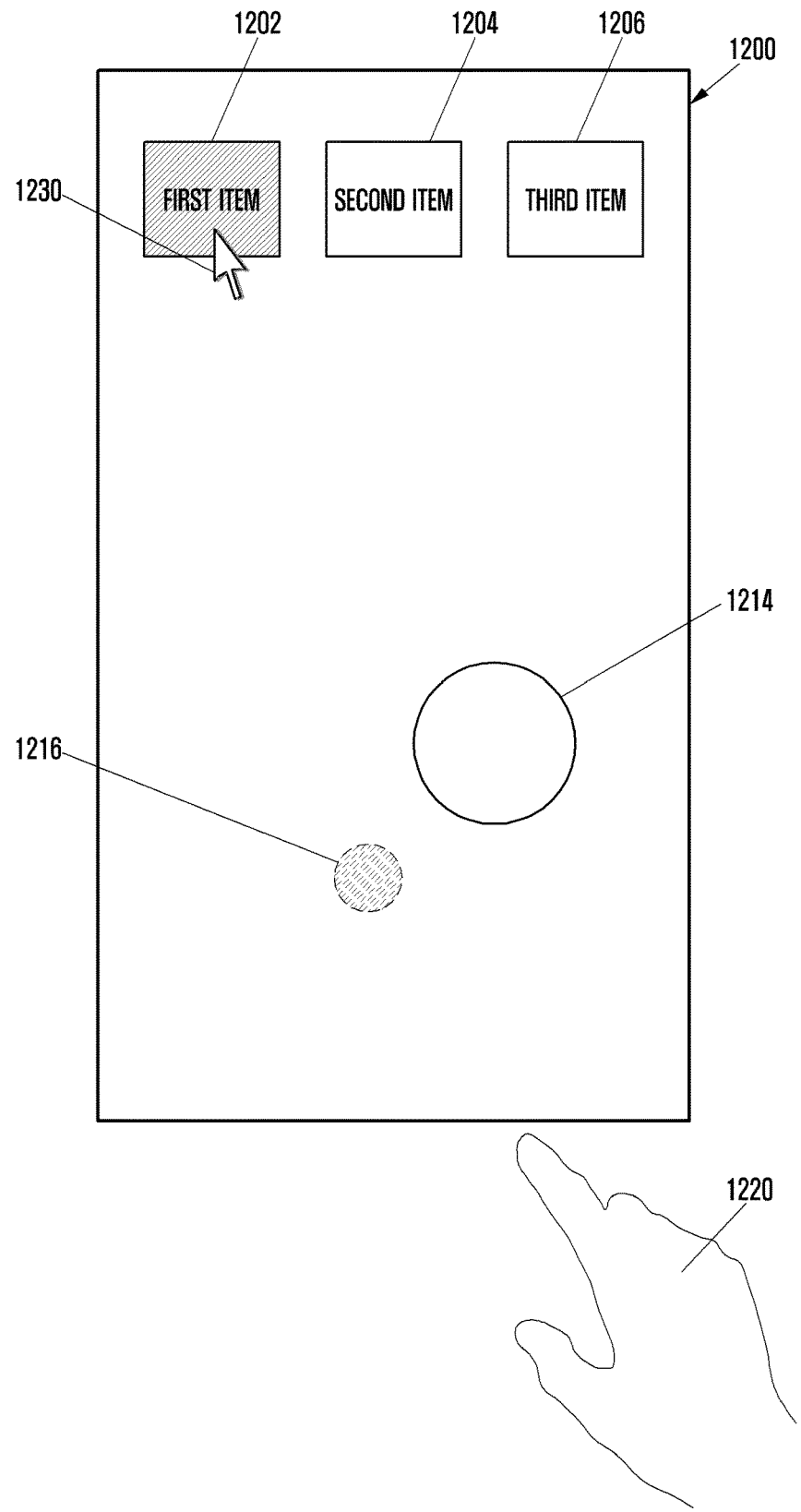

Referring to FIG. 12F, an item corresponding to the location of the cursor 1230 may be selected. More specifically, when the terminal receives a selection input in a state where the cursor 1230 is located on a first item 1202, the first item 1202 may be selected. The selection input may include an input of releasing the user input 1220 when the cursor 1230 is located on the first item 1202 or an additional touch input within a preset time after the user input 1220 is released. More specifically, when the cursor 1230 is located on the first item 1202 and the user input made on the first UI 1216 is released, the first item 1202 may be selected and an operation according to the selected first item 1202 may be performed. In addition, when a touch input is made within a preset time, an operation of selecting the first item 1202 may be performed. When the first item is selected, the control UI 1210 may be displayed as illustrated above with reference to FIG. 12A.

Figure 12G:
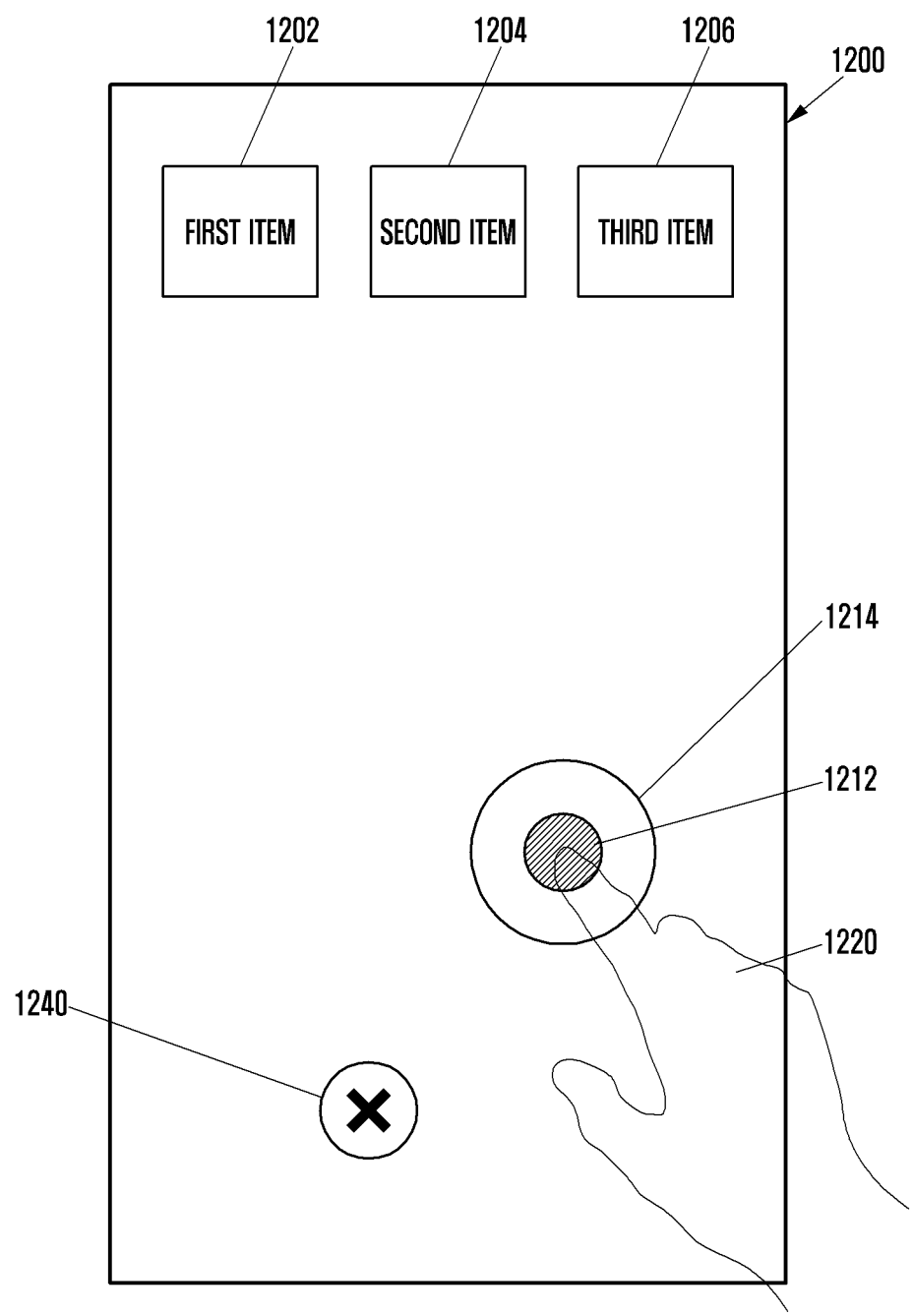

Referring to FIG. 12G, an operation of removing the control UI 1210 from the display is described. When a touch input on the control UI 1210 is held for a preset time or longer, a deletion UI 1240 may be displayed on the display unit 1200. When the user moves the control UI 1210 to a location corresponding to the deletion UI 1240, the control UI 1210 may be deleted.

Figure 12H:
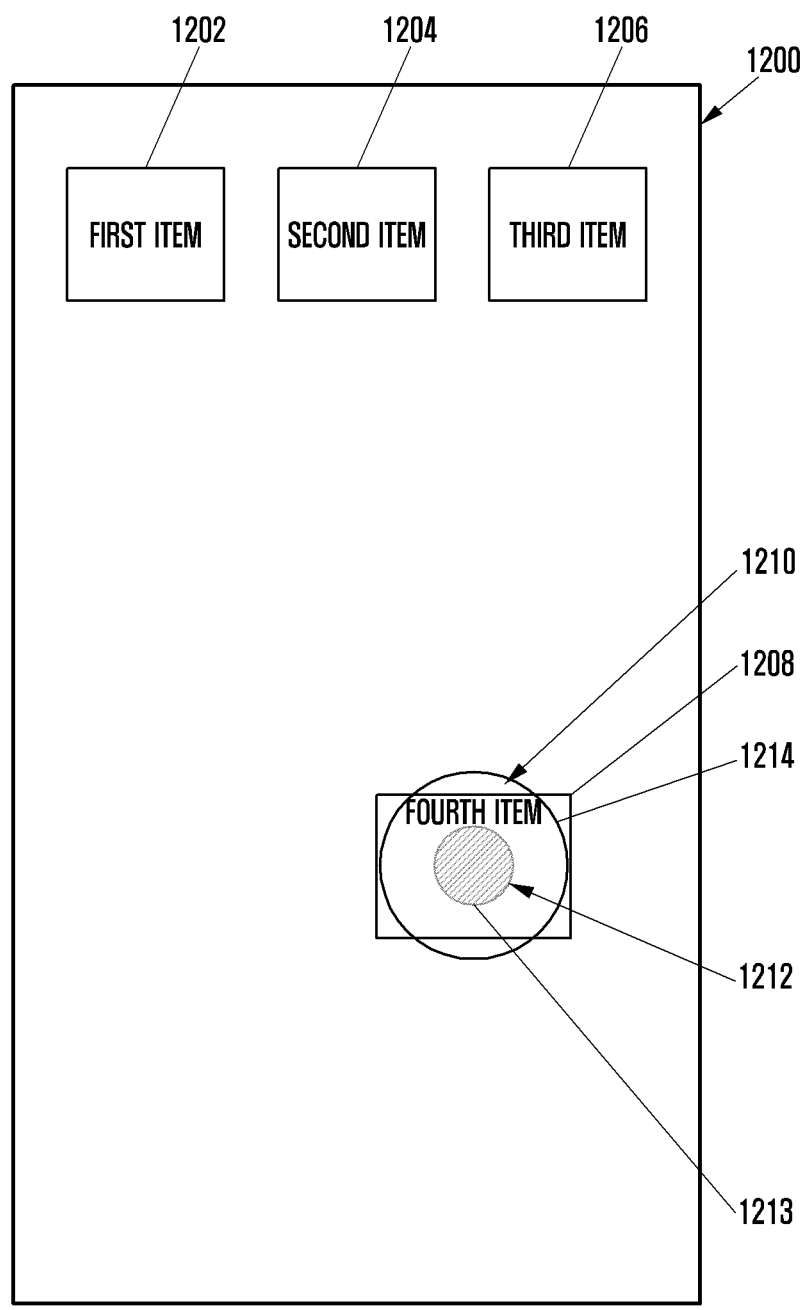
Figure 12I:
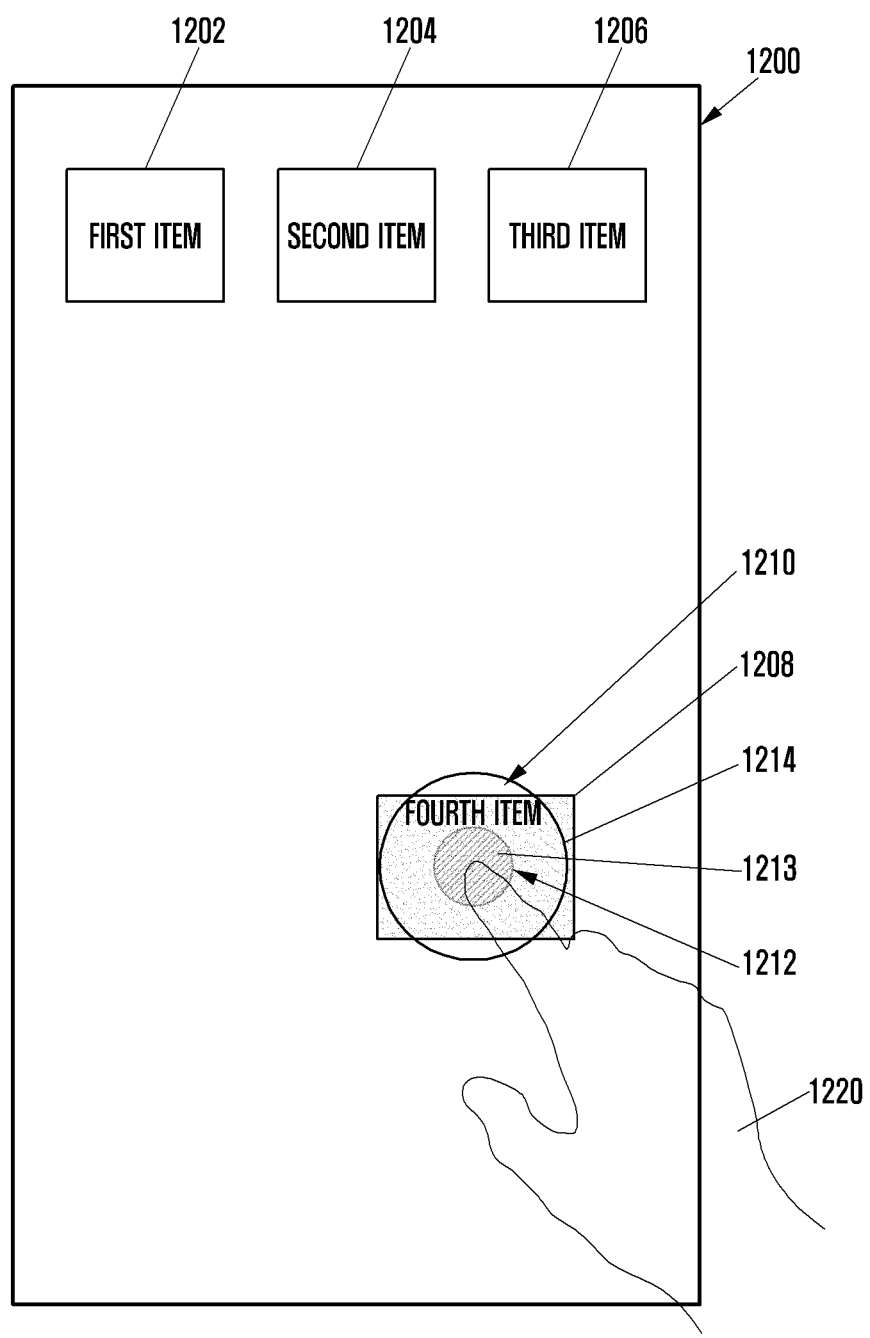

Referring to FIGS. 12H and 12I, the control UI 1210 may be displayed at a predetermined location. More specifically, the control UI 1210 may include the first UI 1212 and the second UI 1214. The first UI 1212 may indicate a reference location where a user input is received and may be moved according to a user input. The second UI 1214 may indicate a relative location according to a movement of the first UI 1212. According to an embodiment of the present disclosure, the first UI 1212 may be displayed with transparency and, more specifically, may be translucently displayed such that an item located in the background can be shown. Further, the first UI 1212 may selectively display a boundary 1213. When the first UI 1212 is displayed, only the boundary 1213 may be displayed and the inside of the first UI 1212 may be completely transparent. Meanwhile, the second UI 1214 may be selectively displayed. Even when the second UI 1214 is not displayed, the input made through the first UI 1212 may perform an operation corresponding to the case where the second UI 1214 is displayed.

According to an embodiment of the present disclosure, an entirety of the control UI 1210 may be displayed with transparency, and a fourth item 1208 may be displayed on the display unit 1200. As described above, by displaying the control UI 1210 with transparency, it is possible to prevent the items displayed on the display unit 1200 from being hidden by the control UI 1210.

When the user touch input 1220 is received when the control UI 1210 and the fourth item 1208 are overlappingly displayed on the display unit 1200, the terminal may perform an operation of selecting the fourth item 1208. Further, when an input of moving the control UI 1210 is received by the terminal, the terminal may move the control UI 1210. When an input of controlling the control UI 1210 is received, the terminal may perform an operation according to the control of the control UI 1210. More specifically, when a hold input for moving the control UI 1210 is received, the control UI 1210 may be selected and the control UI 1210 may be moved according to a drag input. When the drag input for controlling the control UI 1210 is received, the terminal may perform an operation according to the drag input. More specifically, the terminal may perform at least one of the operations according to the input for controlling the control UI 1210.

Figure 13:
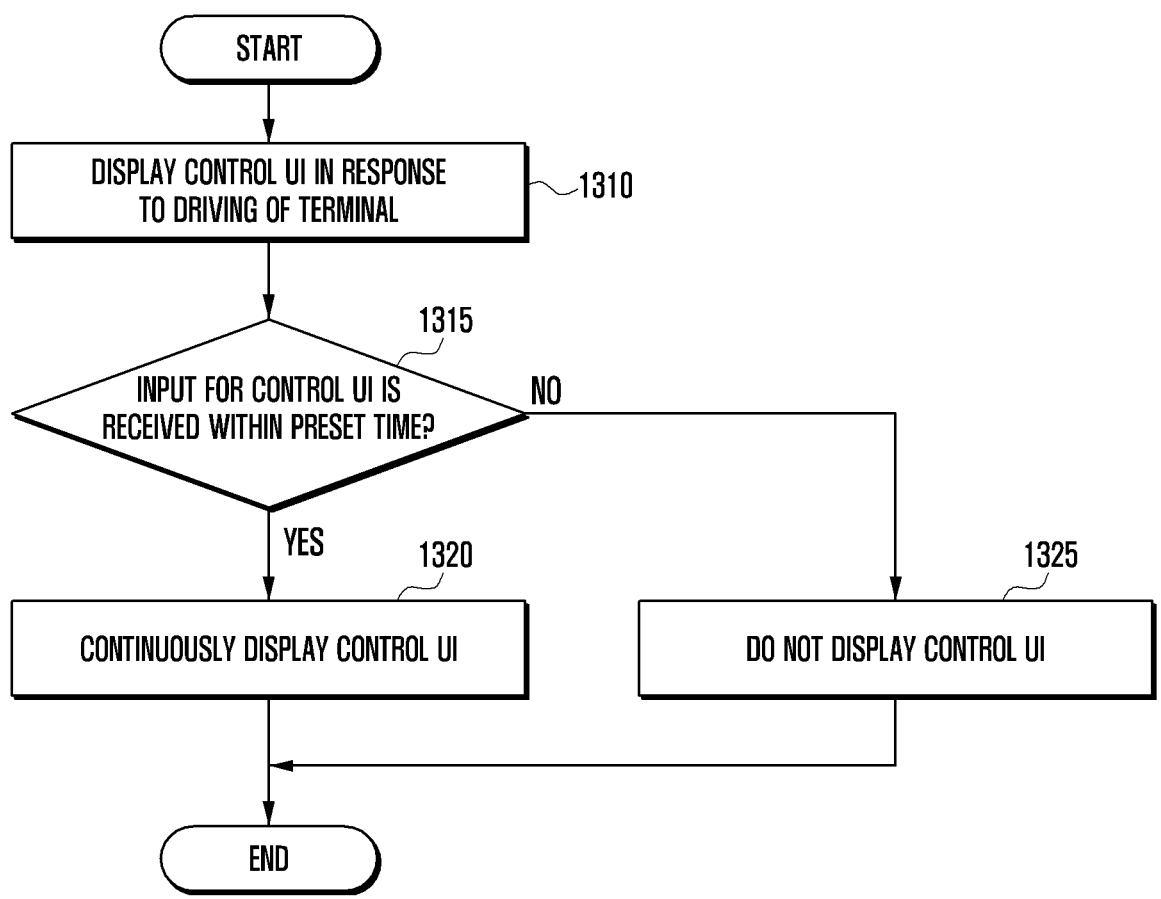
FIG. 13 is a flowchart of a method of displaying a control UI according to an embodiment of the present disclosure.

FIG. 13 is a flowchart of a method of displaying a control UI according to an embodiment of the present disclosure.

In operation 1310, the control UI may be displayed in accordance with driving of the terminal. Although it has been described that the control UI is displayed while driving of the terminal, the control UI may be displayed also when the display unit of the terminal is turned on.

In operation 1315, it may be determined whether an input for the control UI is received within a preset time. According to an embodiment of the present disclosure, the preset time may be configured differently according to a terminal's setting. Further, the input for the control UI may be a touch input corresponding to a location where the control UI is displayed. More specifically, it may be determined whether the touch input is received at the location corresponding to the control UI within 3 to 5 seconds after the control UI is displayed.

When the touch input is received, the control UI may be continuously displayed in operation 1320, and a corresponding function may be performed based on an input made through the control UI. More specifically, when the input is received in operation 1315, the control UI may be always displayed and the control UI may be displayed until the next display unit is turned off.

When the touch input is not received, the control UI displayed in operation 1325 may not be displayed. Thereafter, through a separate user's setting or a method of turning on the display unit again, the control UI may be displayed again.

Figure 14:
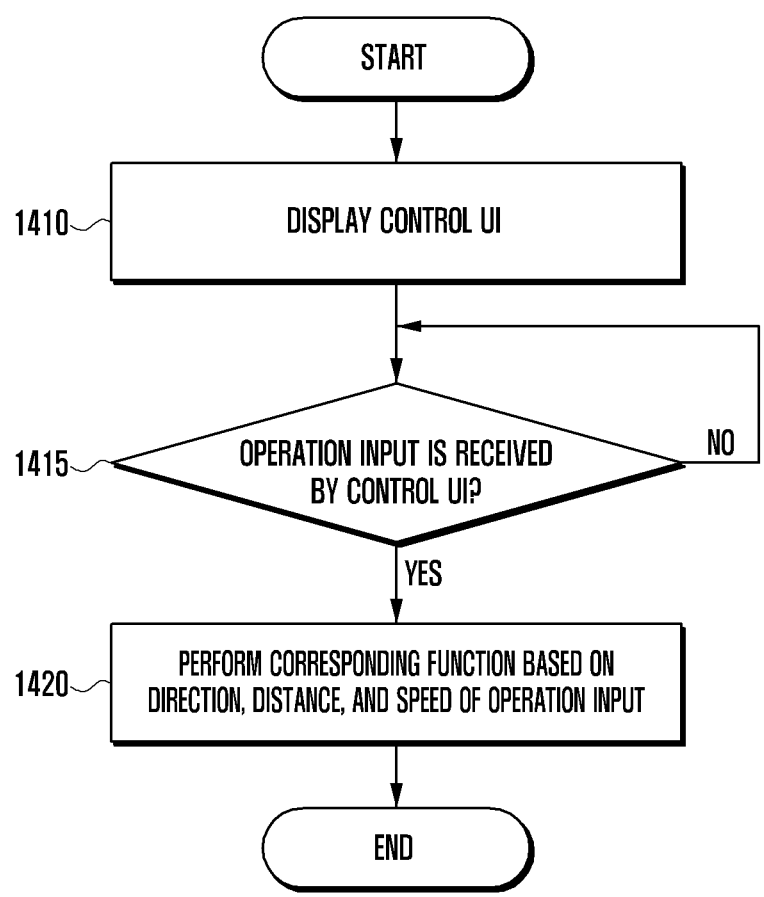
FIG. 14 is a flowchart of a method of providing a UI according to an embodiment of the present disclosure.

FIG. 14 is a flowchart of a method of providing a UI according to an embodiment of the present disclosure.

Referring to FIG. 14, in operation 1410, the terminal may display a control UI on the display unit. More specifically, the control UI may be displayed based on the embodiment of the present disclosure described in FIG. 13.

In operation 1415, the terminal may determine whether an operation input is received by the control UI. More specifically, the operation input may include an input of dragging a part of the control UI in a particular direction.

When the operation input is received, the user terminal may perform a corresponding function based on at least one of a direction, distance, and speed of the operation input in operation 1420. More specifically, when a drag direction is included within a preset range, the corresponding function may be performed. The corresponding function may include at least one of an operation of displaying a cursor for item selection, an operation corresponding to a home key, an operation of returning to a previous operation, and an operation of returning a next operation. Further, the function may include at least one of functions input through other input means of the terminal.

When a drag distance exceeds a preset threshold, an operation corresponding to the drag direction may be performed.

Figure 15:
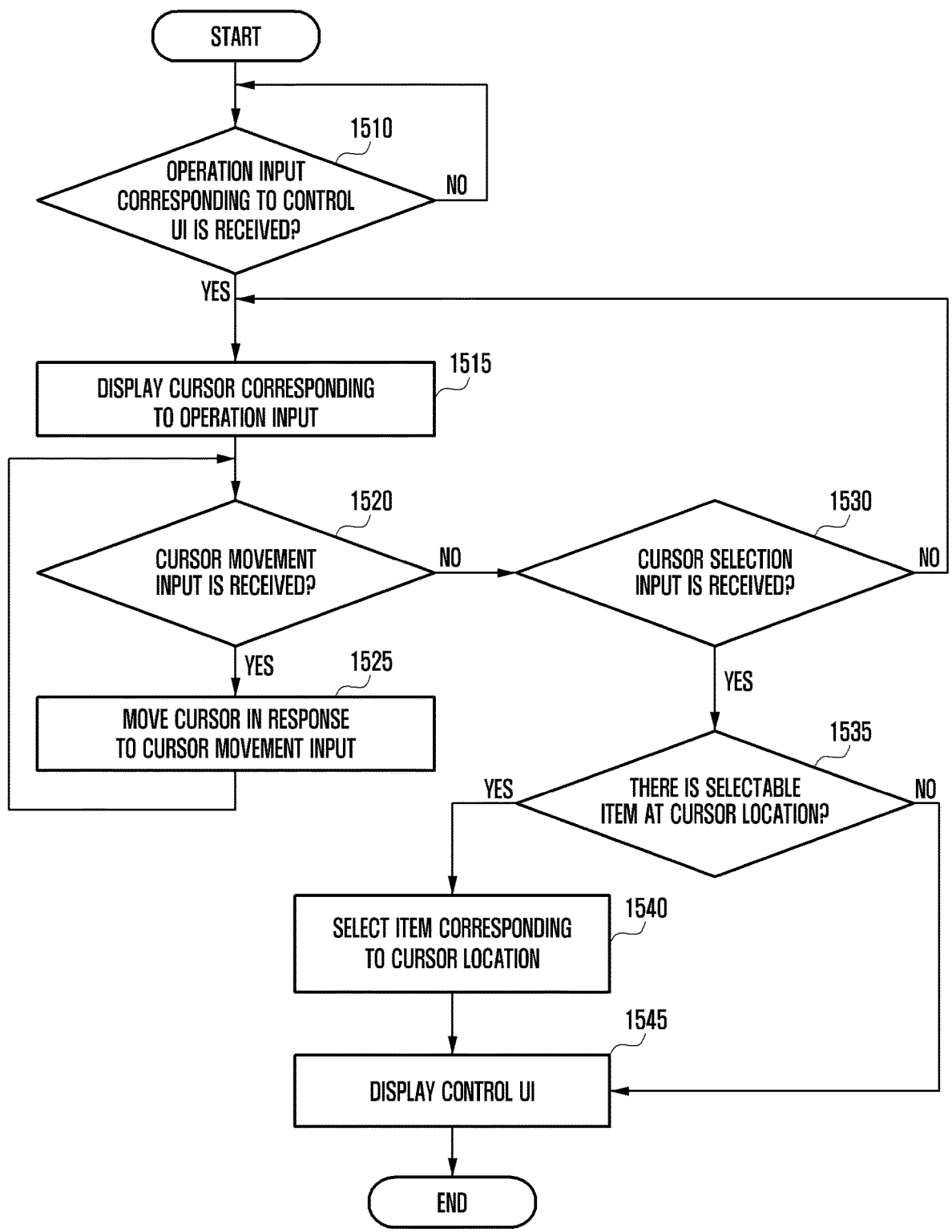
FIG. 15 is a flowchart of a method of providing a UI according to an embodiment of the present disclosure.

FIG. 15 is a flowchart of a method of providing a UI according to an embodiment of the present disclosure.

Referring to FIG. 15, the terminal may determine whether an operation input corresponding to a control UI is received in operation 1510. The operation input may include at least one of the operation inputs according to the aforementioned embodiment of the present disclosure.

When the operation input is received, the terminal may display a cursor UI corresponding to the operation input on the display unit in operation 1515. According to an embodiment of the present disclosure, a location of the displayed cursor UI may be changed according to the operation input. More specifically, when the control UI is dragged in an up direction, the cursor may be displayed at the center of the display unit. When the control UI is dragged in a down direction, the cursor may be displayed on the upper portion of the display unit.

In operation 1520, it may be determined whether a cursor movement input is received. According to an embodiment of the present disclosure, the cursor movement input may include a drag input additionally made after the cursor UI is displayed.

When the cursor movement input is received, the cursor may be moved in response to the cursor movement input in operation 1525. More specifically, the cursor may be moved according to a direction, distance, and speed of the cursor movement input.

When the cursor movement input is not received, it may be determined whether a cursor selection input is received in operation 1530. The cursor selection input may include selecting an item corresponding to a location where the cursor is displayed. More specifically, the cursor selection input may include a case where, when a release input is received at a location corresponding to the control UI, a touch input is additionally received at the corresponding location within a preset time after the release input is received. When the selection input is not received, the terminal may move to operation 1515 and display the cursor UI.

When the selection input is received, it may be determined whether there is a selectable item at a cursor location in operation 1535.

Where there is the selectable item, the item corresponding to the cursor location may be selected in operation 1540.

When there is no selectable item or when the item is selected, the control UI may be displayed again in operation 1545, and the user may additionally execute a corresponding function through an operation input based on the control UI.

Figure 16A:
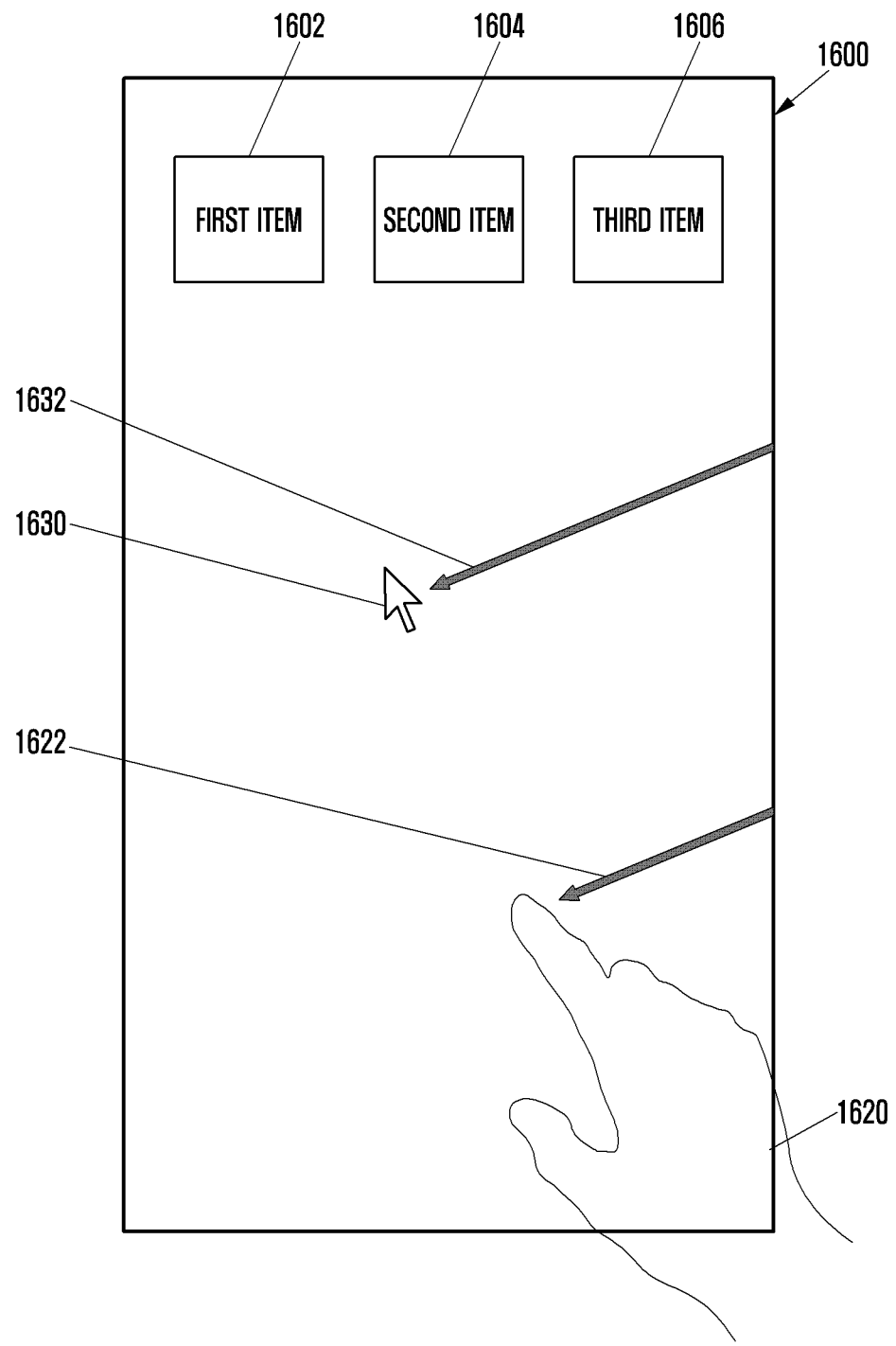
FIGS. 16A and 16B illustrate a method of providing a UI according to various embodiments of the present disclosure.
Figure 16B:
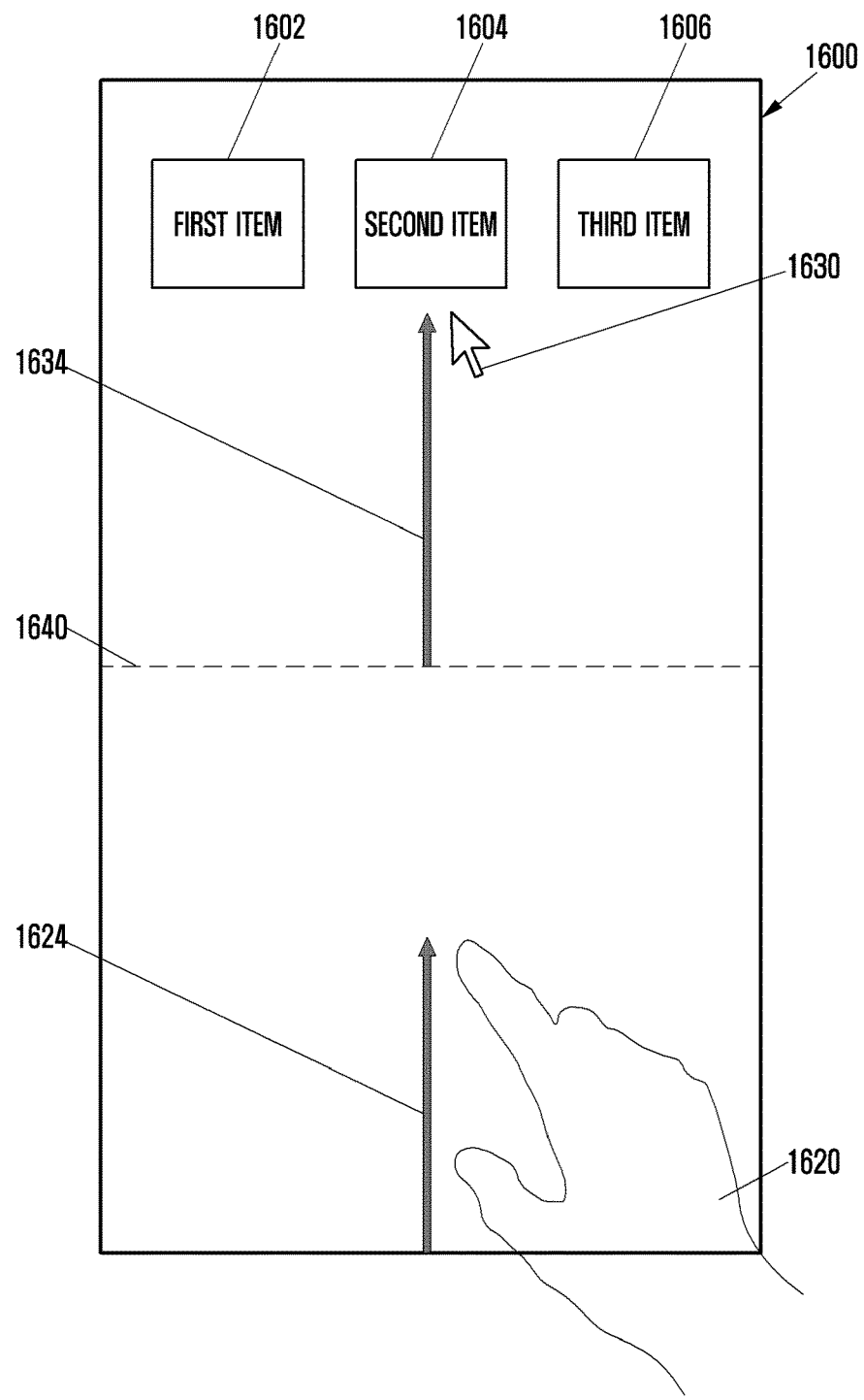

FIGS. 16A and 16B illustrate a method of providing a UI according to various embodiments of the present disclosure.

Referring to FIGS. 16A and 16B, one or more items 1602, 1604, and 1606 may be displayed on a display unit 1600 of the terminal. The displayed items are examples for description of the embodiment of the present disclosure.

Referring to FIG. 16A, when a drag input 1620 starting at a predetermined area is received, a cursor 1630 may be displayed. More specifically, when the drag input 1620 starting at a preset area is received, the cursor 1630 may be displayed at a location corresponding to the location where the drag input 1620 is received. The preset area may include an area near at least one of the four edges of the display unit 1600. The cursor 1630 may move along a corresponding movement trace 1632 in accordance with a trace 1622 of the drag input. A location where the cursor 1630 appears may be determined according to a location where the drag input 1620 starts. According to an embodiment of the present disclosure, the drag input 1620 starts near the right edge of the display unit 1600 and the cursor 1630 is displayed at the upper middle part of the right edge and moves along the movement trace 1632 in accordance with the trace 1622 of the drag input. According to an embodiment of the present disclosure, the trace 1622 of the drag input and the movement trace 1632 of the cursor may be selectively displayed or may not be displayed.

Referring to FIG. 16B, when a drag input 1620 starting at a predetermined area is received, a cursor 1630 may be displayed at a corresponding location. More specifically, when the drag input 1620 is received near a lower edge of the display unit 1600, the cursor 1630 may be displayed at the center of the display unit 1600. The cursor 1630 may be displayed in accordance with the drag input 1620 on a virtual reference line 1640 dividing the display unit 1600 into two parts. The virtual reference line 1640 may not be displayed, and a location of the reference line 1640 may vary according to an embodiment of the present disclosure. The cursor 1630 may move along a corresponding movement trace 1634 in accordance with a trace 1624 of the drag input. A location where the cursor 1630 appears may be determined according to a location where the drag input 1620 starts. According to an embodiment of the present disclosure, after the cursor 1630 is displayed, the cursor 1630 may move according to a user's drag input and, when a user's selection input including a release input is received, an item at a location corresponding to the location of the cursor 1630 may be selected. After the cursor 1630 is displayed, the operation related to the cursor described in another embodiment of the present disclosure may be performed.

Figure 17:
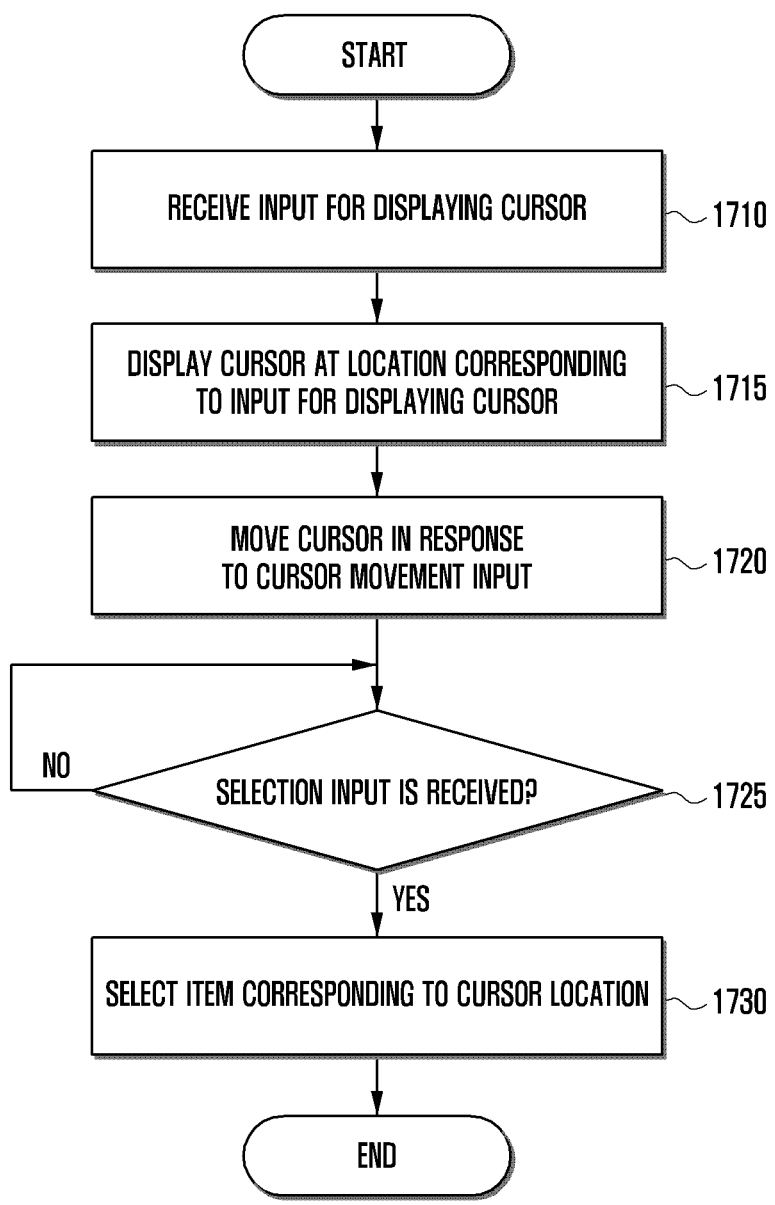
FIG. 17 is a flowchart of a method of providing a UI according to an embodiment of the present disclosure.

FIG. 17 is a flowchart of a method of providing a UI according to an embodiment of the present disclosure.

Referring to FIG. 17, in operation 1710, the terminal may receive an input for displaying a cursor. More specifically, the input for displaying the cursor may include a drag input starting at a predetermined area. The predetermined area may be a preset area on the display unit of the terminal. More specifically, the preset area may include an area near the edges of the display unit of the terminal. As described above, the input for displaying the cursor may include a drag input starting near the edges of the display unit of the terminal.

In operation 1715, the terminal may display the cursor on the display unit of the terminal in response to the input for displaying the cursor. A location where the cursor is displayed may be determined based on a location where the input for displaying the cursor is received. More specifically, a coordinate of the location where the cursor is displayed may be determined in accordance with a coordinate of the input for displaying the cursor. At least one of the coordinates of the location where the cursor is displayed may be the same as the coordinate of the input for displaying the cursor and may correspond to a location generated by adding an offset value to the coordinate of the input for displaying the cursor. The offset value may be selected based on at least one of the size of the display unit, a user's setting, and an input means. More specifically, as the size of the display unit is larger, the offset value may become larger, and the offset value may be differently set according to the input means.

When a cursor movement input is received, the terminal may move the displayed cursor according to the cursor movement input in operation 1720. More specifically, the cursor movement input may include a drag input. When the input for displaying the cursor is the drag input starting at a particular area, the cursor may be displayed according to the drag input and the displayed cursor may be moved in accordance with a trace of the drag input.

In operation 1725, the terminal may determine whether a selection input corresponding to the displayed cursor is received. When the selection input is not received, the cursor may be continuously displayed or the cursor may disappear. According to an embodiment of the present disclosure, the selection input may include a release input and a touch input received within a preset time after the release input.

When the selection input is received, the terminal may perform an operation of selecting an item corresponding to a location where the cursor is displayed in operation 1730.

Throughout the embodiments of the present disclosure, the control UI or the cursor may be displayed based on a user's input through a setting menu of the terminal. More specifically, a setting input for displaying the control UI or the cursor may be received in a menu for setting a state of the terminal.

Each operation described in embodiments of the present disclosure may be selectively performed to implement the embodiments of the present disclosure, and it is apparent that not all operations are necessary to implement the embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of providing a user interface (UI) by an electronic device, the method comprising:
   displaying a first control UI;
   receiving a first drag input via the displayed first control UI;
   in case that the first drag input corresponds to a downward drag input, initiating to display a cursor, from an uppermost side of a touch screen of the electronic device;
   in case that the first drag input corresponds to an upward drag input, initiating to display the cursor at a specific location of the touch screen of the electronic device;
   in response to an input on the displayed first control UI, displaying a management UI on the touch screen, wherein the management UI has at least one of a UI menu for moving a location of the first control UI on the touch screen or a UI menu for concurrently displaying a second control UI with the displayed first control UI;
   in response to an input on the UI menu, displaying the second control UI concurrently with the first control UI;
   in case that a first input for selecting the first control UI is received, displaying a first indicator of a first area and selecting one of a first plurality of items disposed on the first area;
   in case that a second input for selecting the second control UI is received, displaying a second indicator of a second area which is different from the first area and selecting one of a second plurality of items disposed on the second area; and
   in case that a third input for selecting the second control UI is received, displaying the second indicator of the second area and selecting another one of the second plurality of items disposed on the second area,
   wherein a selection order of the items is based on a preset order determined based on at least one of locations of the items displayed and use frequency of the items,
   wherein the location of the first control UI is different from a location of the first area, and
   wherein a location of the second control UI is different from a location of the second area.

2. The method of claim 1, further comprising:
   receiving a cursor movement input; and
   moving the cursor in response to the cursor movement input,
   wherein the receiving of the cursor movement input comprises receiving a second drag input, and
   wherein the moving of the cursor comprises moving the cursor in accordance with at least one of a direction, distance, or speed of the second drag input.

3. The method of claim 1, further comprising:
receiving a selection input; and
selecting an item at a location corresponding to the cursor in response to the selection input,
wherein the selection input includes a release input and a touch input received within a preset time after the release input.

4. The method of claim 1, further comprising deleting the displayed first control UI if a corresponding input is not received by the displayed first control UI within a preset time.

5. The method of claim 1,
wherein the displaying of the first control UI comprises displaying the first control UI to overlap an item,
wherein the method further comprises, if a touch input is received by the first control UI, selecting the item, which overlaps the first control UI, in response to the touch input, and
wherein the displaying of the first control UI comprises displaying the first control UI to have transparency.

6. The method of claim 1,
wherein a visual characteristic of the first control UI and a visual characteristic of the first area are the same, and
wherein a visual characteristic of the second control UI and a visual characteristic of the second area are the same.

7. An electronic device for providing a user interface (UI), the electronic device comprising:
a touch screen configured to display and to receive a touch input; and
at least one processor configured to:
display a first control UI on the touch screen,
receive a first drag input corresponding to the displayed first control UI through the touch screen,
in case that the first drag input corresponds to a downward drag input, initiate to display a cursor from an uppermost side of the touch screen,
in case that the first drag input corresponds to an upward drag input, initiate to display the cursor at a specific location of the touch screen,
in response to an input on the displayed first control UI, display a management UI on the touch screen, wherein the management UI has at least one of a UI menu for moving a location of the first control UI on the touch screen or a UI menu for concurrently displaying a second control UI with the displayed first control UI,
in response to an input on the UI menu, display the second control UI, concurrently with the first control UI,
in case that a first input for selecting the first control UI is received, display a first indicator of a first area and selecting one of a first plurality of items disposed on the first area,
in case that a second input for selecting the second control UI is received, display a second indicator of a second area which is different from the first area and selecting one of a second plurality of items disposed on the second area, and
in case that a third input for selecting the second control UI is received, displaying the second indicator of the second area and selecting another one of the second plurality of items disposed on the second area,
wherein a selection order of the items is based on a preset order determined based on at least one of locations of the items displayed and use frequency of the items,
wherein the location of the first control UI is different from a location of the first area, and
wherein a location of the second control UI is different from a location of the second area.

8. The electronic device of claim 7, wherein the at least one processor is further configured to:
receive a cursor movement input through the touch screen, and
move the cursor UI in response to the cursor movement input.

9. The electronic device of claim 7, wherein the at least one processor is further configured to:
receive a second drag input, and
move the cursor in accordance with at least one of a direction, distance, or speed of the second drag input.

10. The electronic device of claim 7,
wherein the at least one processor is further configured to:
receive a selection input, and
select an item at a location corresponding to the cursor in response to the selection input, and
wherein the selection input includes a release input and a touch input received within a preset time after the release input.

11. The electronic device of claim 7, wherein, if a corresponding input is not received by the displayed first control UI within a preset time, the at least one processor is further configured to delete the displayed first control UI.

12. The electronic device of claim 7,
wherein the at least one processor is further configured to:
display the first control UI to overlap an item, and
if a touch input is received by the first control UI, select the item which overlaps the first control UI, and
wherein the at least one processor displays the first control UI to have transparency.

13. A method of providing a user interface (UI) by an electronic device, the method comprising:
displaying a first control UI;
receiving a first input for displaying a cursor via the first control UI;
in case that the first input corresponds to a downward drag, initiating to display the cursor from an uppermost side of a touch screen of the electronic device;
in case that the first input corresponds to an upward drag, initiating to display the cursor at a specific location of the touch screen of the electronic device;
moving the displayed cursor in response to the first input or a second input;
in response to an input on the displayed first control UI, displaying a management UI on the touch screen, wherein the management UI has at least one of a UI menu for moving a location of the first control UI on the touch screen or a UI menu for concurrently displaying a second control UI with the first control UI;
in response to an input on the UI menu, displaying the second control UI concurrently with the first control UI;
in case that a third input for selecting the first control UI is received, displaying a first indicator of a first area and selecting one of a first plurality of items on the touch screen of the electronic device is selected;
in case that a fourth input for selecting the second control UI is received, displaying a second indicator of a second area and selecting one of a second plurality of items different from the first plurality of items on the touch screen of the electronic device is selected; and in case that a fifth input for selecting the second control UI is received, displaying the second indicator of the second area and selecting another one of the second plurality of items, wherein a selection order of the items is based on a preset order determined based on at least one of locations of the items displayed and use frequency of the items, wherein the location of the first control UI is different from a location of the first area, and wherein a location of the second control UI is different from a location of the second area.

14. An electronic device for providing a user interface (UI), the electronic device comprising:
a touch screen configured to display and to receive a touch input; and
at least one processor configured to:
display a first control UI,
receive a first input for displaying a cursor through the first control UI displayed on the touch screen,
in case that the first input corresponds to a downward drag, initiate to display the cursor from an uppermost side of the touch screen,
in case that the first input corresponds to an upward drag, initiate to display the cursor at a specific location of the touch screen of the electronic device,
move the displayed cursor in response to the first input or a second input,
in response to an input on the first control UI, display a management UI on the touch screen, wherein the management UI has at least one of a UI menu for moving a location of the first control UI on the touch screen or a UI menu for concurrently displaying a second control UI with the first control UI,
in response to an input on the UI menu, display the second control UI concurrently with the first control UI,
in case that a third input for selecting the first control UI is received, display a first indicator of a first area and selecting one of a first plurality of items on the touch screen of the electronic device is selected,
in case that a fourth input for selecting the second control UI is received, display a second indicator of a second area and selecting one of a second plurality of items different from the first plurality of items on the touch screen of the electronic device is selected, and
in case that a fifth input for selecting the second control UI is received, displaying the second indicator of the second area and selecting another one of the second plurality of items, wherein a selection order of the items is based on a preset order determined based on at least one of locations of the items displayed and use frequency of the items, wherein the location of the first control UI is different from a location of the first area, and wherein a location of the second control UI is different from a location of the second area.

* * * * *